(12) United States Patent
Yamauchi

(10) Patent No.: US 7,539,557 B2
(45) Date of Patent: May 26, 2009

(54) AUTONOMOUS MOBILE ROBOT

(75) Inventor: Brian Yamauchi, Boston, MA (US)

(73) Assignee: iRobot Corporation, Bedford, MA (US)

( * ) Notice: Subject to any disclaimer, the term of this patent is extended or adjusted under 35 U.S.C. 154(b) by 226 days.

(21) Appl. No.: 11/618,742

(22) Filed: Dec. 30, 2006

(65) Prior Publication Data
US 2007/0156286 A1 Jul. 5, 2007

Related U.S. Application Data

(60) Provisional application No. 60/754,635, filed on Dec. 30, 2005.

(51) Int. Cl.
*G06F 19/00* (2006.01)
(52) U.S. Cl. .................. 700/245; 700/246; 700/258; 700/259; 700/262; 701/2; 701/45; 701/46; 701/301; 340/5.71; 340/825.72; 340/937
(58) Field of Classification Search ................ 700/245, 700/246, 258, 259, 262; 701/2, 45, 46, 301; 340/5.71, 825.72, 937; 382/103, 104; 348/149
See application file for complete search history.

(56) References Cited

U.S. PATENT DOCUMENTS

| | | | | |
|---|---|---|---|---|
| 4,751,658 A | * | 6/1988 | Kadonoff et al. ............ 701/301 |
| 5,006,988 A | * | 4/1991 | Borenstein et al. ............ 701/25 |
| 5,040,116 A | * | 8/1991 | Evans et al. .................. 701/28 |
| 5,319,611 A | * | 6/1994 | Korba ........................... 367/98 |
| 5,684,695 A | * | 11/1997 | Bauer ........................... 701/23 |

OTHER PUBLICATIONS

Yamauchi, B., "PackBot: A Versatile Platform for Military Robotics," May 10, 2004.
Yamauchi, B., "(TARDEC) Wayfarer: Autonomous Urban Reconnaissance Using Small UGVs" (13 pages) Jun. 24, 2004.
Yamauchi, B., "(Brief) Wayfarer: Autonomous Urban Reconnaissance Using Small UGVs" (19 pages) Jun. 24, 2004.
Yamauchi, B., "(Kickoff) Wayfarer: Autonomous Urban Reconnaissance Using Small UGVs" (30 pages) Nov. 25, 2003.

\* cited by examiner

*Primary Examiner*—Khoi H. Tran
*Assistant Examiner*—McDieunel Marc
(74) *Attorney, Agent, or Firm*—Fish & Richardson P.C.

(57) ABSTRACT

A mobile robot is equipped with a range finder and a stereo vision system. The mobile robot is capable of autonomously navigating through urban terrain, generating a map based on data from the range finder and transmitting the map to the operator, as part of several reconnaissance operations selectable by the operator. The mobile robot employs a Hough transform technique to identify linear features in its environment, and then aligns itself with the identified linear features in order to navigate through the urban terrain; while at the same time, a scaled vector field histogram technique is applied to the combination of range finder and stereo vision data to detect and avoid obstacles the mobile robot encounters when navigating autonomously. Also, the missions performed by the mobile robot may include limitation parameters based on distance or time elapsed, to ensure completion of the autonomous operations.

13 Claims, 45 Drawing Sheets

AUTONOMOUS MOBILE ROBOT

CLAIM TO PRIORITY

This is a non-provisional patent application of Application No. 60/754,635 to Brian YAMAUCHI, filed Dec. 30, 2005, the entire contents of which are hereby incorporated by reference into this application.

BACKGROUND

In the field of mobile robots, mobile robots have been increasingly used in hostile environments (such as, for example, in battle conditions or in rescue operations) for tasks such as ordinance or explosives handling or disposal, field reconnaissance, terrain mapping, and various other procedures in which a considerable risk to life or safety would exist if a person were to perform the task. As a non-limiting example, remotely controlled mobile robots equipped with video cameras have been used to scout hostile positions in environments such as caves or other non-urban terrain. However, limitations of such teleoperated mobile robots include restriction of the operative range of such robots to line-of-sight or areas substantially proximal to the tele-operator, because of real-time wireless communications issues (for example, limited wireless bandwidth availability and/or transmission power for transmitting live camera signals to a teleoperator station) presented by robots that cannot operate autonomously but instead rely entirely on continuous real-time remote control. As a result, risks to the safety of the teleoperator may be heightened because of the necessity to remain rather close to such a remote-controlled mobile robot during operation.

Furthermore, urban warfare is becoming increasingly important in many military operations. For example, combat in cities tends to generate increased risk factors to military forces, such as high risk of "friendly fire" and non-combatant casualties. However, urban combat may be increasingly common because of political and sociological reasons, and adversaries may make extensive use of guerrilla warfare and other unconventional tactics in heavily developed areas such as cities, industrial areas, and critical infrastructure such as paved roadways or neighborhood streets. At the same time, military forces may be required to take extreme care to minimize civilian casualties and other collateral damage.

Under these conditions, in order to maintain situational awareness, aerial and satellite reconnaissance can provide valuable high-level information about terrain and troop movements; however, even UAVs and other low-flying aircraft are limited in their ability to provide real-time information to ground troops about what lies around the next corner or on the next block. Soldiers currently perform most dangerous reconnaissance tasks themselves, potentially placing themselves at great risk in hostile urban environments.

Recently, however, mobile robot platforms are increasingly commonly being deployed by military forces for reconnaissance and other tasks in dangerous environments. As noted above, non-autonomous tele-operated mobile robots have the potential to reduce the risk to military warfighters in urban environments, but they are limited by both radio range, interference and the need for a full-time operator. In urban environments, for example, radio signal attenuation caused by buildings or radio interference may substantially reduce the operational range of such non-autonomous, remote-controlled robots. In addition, the need for a robot operator to devote continuous attention to operating the robot throughout the duration of an operation increases the manpower requirements associated with robotic reconnaissance.

SUMMARY

In view of the above, man-portable mobile robots (also referred to herein as "unmanned ground vehicles" or "UGVs") may be enabled to perform fully-autonomous or semi-autonomous reconnaissance missions in urban, industrial or other such developed environments. The mobile robots may be able to explore beyond the range of radio communications required for non-autonomous robots, generate detailed maps of complex urban terrain, record or transmit video and infrared image data, and return to provide up-to-date reconnaissance information for military warfighters.

Substantial academic research in the field of robotics has previously been conducted on the subjects of mapping and localization using mobile robots. However, the previous research has typically attempted to elucidate complex, monolithic, "kitchen sink"-type general approaches for autonomous robot navigation, while the few robot systems based thereon that have actually been constructed have been significantly limited in their real-world robustness and utility. One reason for this is because the complex algorithms and control processes contemplated by academic researchers often require computational or sensory capabilities that are unrealistic for a man-portable military-use mobile robot system due to expense, weight, and fragility of necessary components.

Rather than attempting to solve the unbounded, abstract question of robot navigation in the general case, presently discussed are autonomous, teleoperable mobile robots capable of performing specific reconnaissance behaviors that are currently useful to military warfighters in the near term. These behaviors may include, for example, Route Reconnaissance (in which the mobile robot is provided with one or more waypoints to be traversed while recording a map of the mobile robot's environment as it travels the path defined by the waypoints); Perimeter Reconnaissance (in which the mobile robot circumnavigates a building or other structure by identifying and following the walls of the building, while recording or transmitting a map of the terrain along the perimeter of the building); and Street Reconnaissance (in which the mobile robot travels a particular distance down a road or street, and returns to its initial location, while recording a map of the road).

As such, instead of necessarily using excessive computational or sensory resources to solve the general problems of complex machine vision and navigation in robots, an alternative approach (as discussed herein) instead considers a narrow, but deep, focus on useful urban reconnaissance tasks.

In view of the above, a mobile robot is discussed herein which is capable of autonomously performing navigational tasks and/or other functions. The mobile robot may perform, for example, perimeter-tracking and/or street traversal reconnaissance in autonomous or semi-autonomous operation, inter alia.

Such an autonomous mobile robot may use range-finding or proximity sensors, optical sensors or machine vision techniques to identify linear features in the environment, such as roads, walls, parked automobiles, or buildings, for example.

In addition, in accordance with one non-limiting example, Scaled Vector Field Histogram (SVFH) techniques may be used to detect obstacles positioned along the mobile robot's path. SVFH may also be used to provide evasive maneuvering for steering around such obstacles and reaching a clear heading, inter alia.

In accordance with another aspect, a mobile robot may be positioned along a street or roadway, determine the general direction of the street using range-finding sensors and Hough transform techniques, and then navigate along the street out to a particular distance from its starting location, for example. The mobile robot may then turn back and return to its starting location, and may transmit map or other reconnaissance data gathered during its traversal of the street, while traversing the street.

Thus, in accordance with various aspects, by tailoring the defined task of the mobile robot to useful, yet readily definable goals, the mobile robot can be constructed without necessarily including costly levels of sensor sensitivity and/or computational, memory or bandwidth capacity, for example. Rather, the mobile robot may be equipped with a one or more range-finding sensors such as LIDAR, radar, or sonar ranging sensors, and preferably also includes a stereo vision system, global positioning satellite receiver, inertial navigation system, odometer, inter alia.

The obstacle avoidance system enables the mobile robot to avoid collisions with a wide range of obstacles in both outdoor and indoor environments. This system may combine range data from a 360-degree planar LIDAR system with three-dimensional (3D) depth map data provided by a stereo vision system, the combination of which is then analyzed using a Scaled Vector Field Histogram algorithm, for example. Also, a linear feature identification process may be carried out using a Hough transform algorithm applied to the range data. Data from the range sensors, obstacle avoidance, and the Hough transform may be transmitted to a a teleoperation console that presents the information to the operator graphically and in real-time, for example.

DETAILED DESCRIPTION

Figure 1:
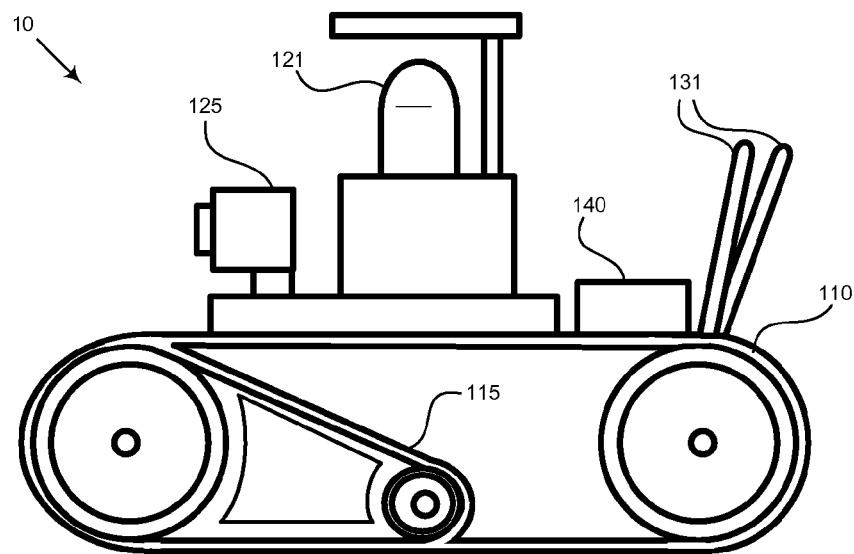
FIG. 1 is a profile view of a mobile robot in accordance with the present discussion.
Figure 2:
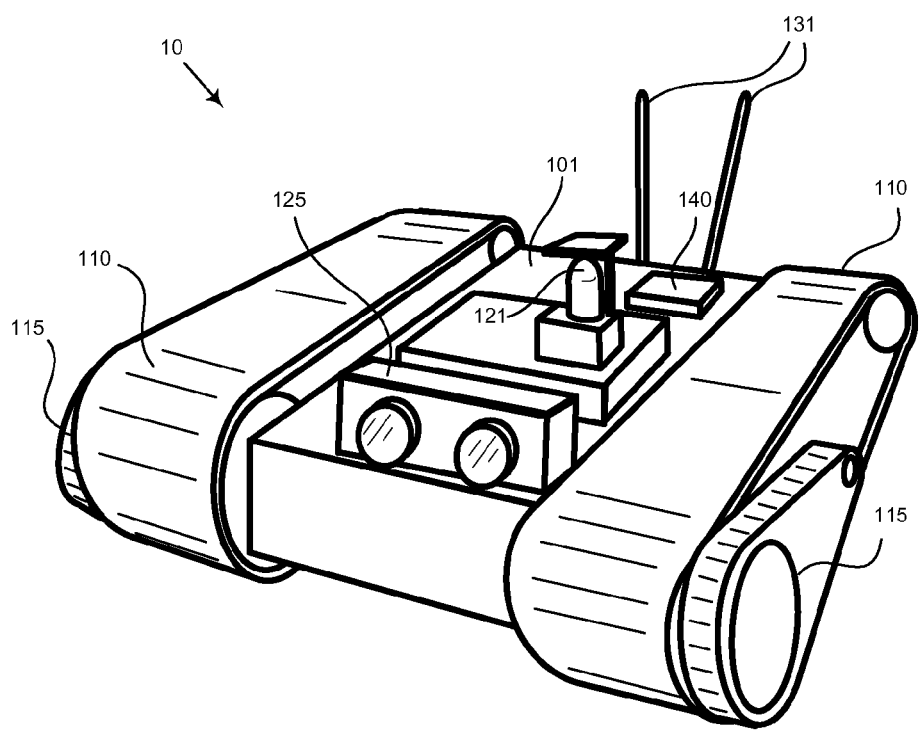
FIG. 2 is an oblique overhead view of the mobile robot.

FIGS. 1 and 2 illustrate a mobile robot 10 that can autonomously navigate urban environments, while generating a map of the area around the path traveled by the mobile robot 10, in accordance with a first embodiment. The mobile robot 10 includes a range-finding system 121 that can scan the environment surrounding the mobile robot and detect reflective surfaces of objects such as walls, automobiles, trees, furniture or the like. This range-finding data is used to generate and maintain an occupancy grid map of the mobile robot's environment along the mobile robot's path of travel, which can be conveyed to the operator of the mobile robot 10. Furthermore, by identifying patterns in the range-finding data corresponding to linear arrangements or features, structures such as streets, fences, or rectangular buildings may be used as navigational landmarks for orienting the mobile robot's direction of travel.

Robot Hardware

The mobile robot 10 includes a control unit 140 having an onboard processor for executing control software, processing sensor input and commands from an operator, and controlling the components and subsystems of the mobile robot 10. In accordance with one embodiment, the control software includes sets of computer software corresponding to various robot behaviors and routines, and also include operation routines that orchestrate high-level missions or operations in response to commands received from the operator. For example, the control software may include routines for a follow-perimeter operation, a follow-street operation, and a follow-waypoints operation that can be selected by the operator on a teleoperation console, as well as various concurrent behaviors or routines such as an obstacle avoidance behavior or a stasis detection behavior that function automatically during operation of the mobile robot 10.

The chassis 101 of the mobile robot 10 may include a payload bay into which the processor 140 or other components, such as the stereo vision system 125 or range finder 121, may be detachably installed.

Figure 7:
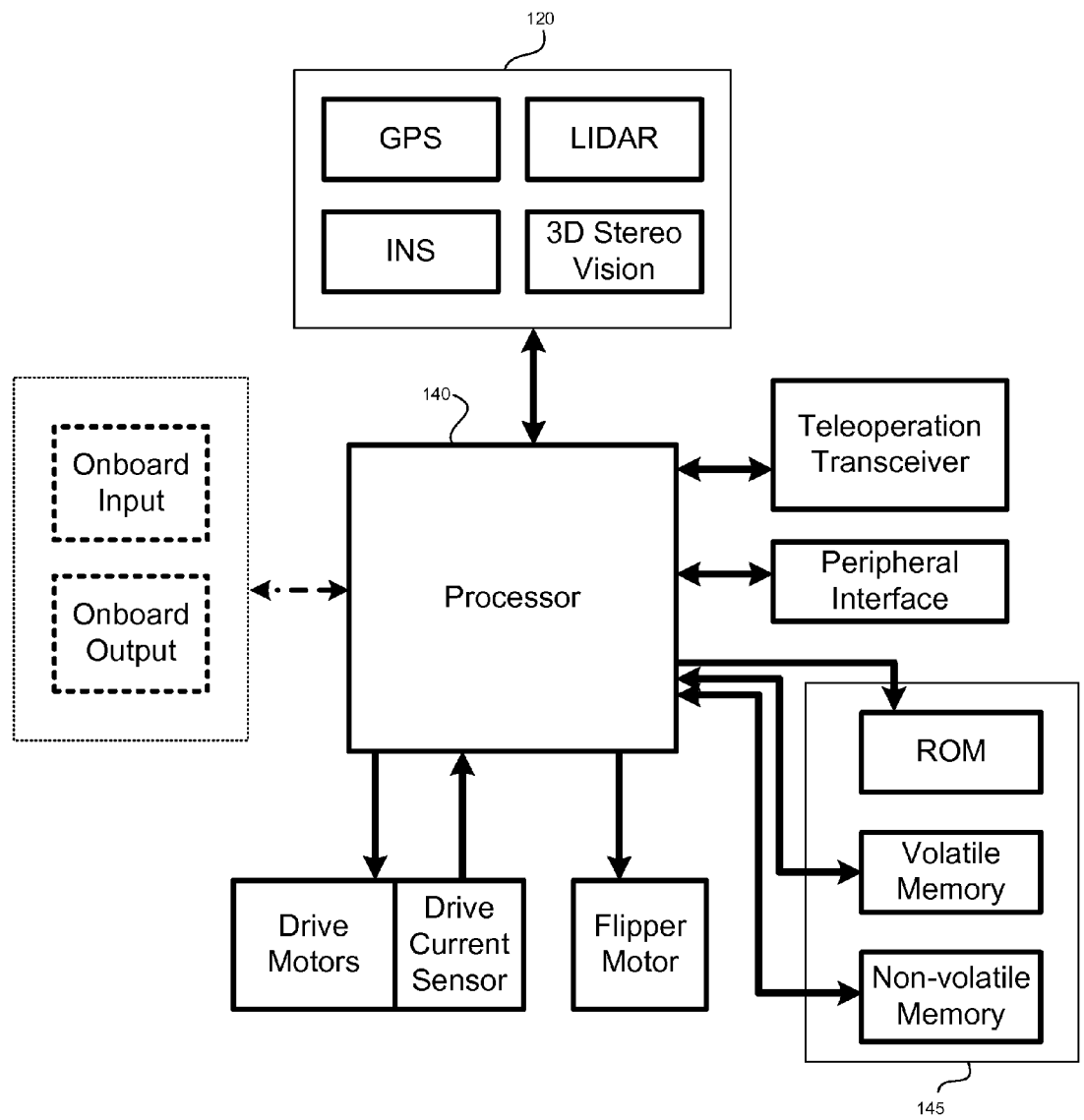
FIG. 7 is a diagram illustrating an example hardware organization of the mobile robot.

FIG. 7 illustrates a computer hardware organization for the mobile robot 10, in which the processor 140 exchanges data with various peripheral devices and arbitrates communication between them. In this example, the teleoperation transceiver permits the processor 140 to receive commands from the teleoperation console 21 or transmit map data, inter alia, to the teleoperation console 21 during a reconnaissance operation. A peripheral interface may include a USB port into which a USB memory stick may be placed, and onto which the mobile robot 10 can record a map for later manual retrieval by the operator.

Reconnaissance Operation "Leash" Constraints

In order to ensure that the mobile robot 10 does not stray too far from its intended reconnaissance target or continue indefinitely, a "leash" constraint may be established for the robot operations, which ensures that the missions performed by the mobile robot have clearly defined limits or parameters. For example, a distance leash of 200 meters may be specified by the operator prior to initiating a follow-street operation, such that the mobile robot will halt its outgoing autonomous navigation down a street once it has traveled 200 meters away from its starting position, and return to the starting point (see, for example, the distance leash method illustrated in FIG. 38). Alternatively, the leash may be a time leash, in which the robot proceeds with an operation for the duration of a period of time specified by the operator, and then halts and returns once the period of time has elapsed (see, for example, the time leash method illustrated in FIG. 39).

By defining mission parameters using a leash, the operator of the mobile robot is assured that the mobile robot 10 will return to its starting position regardless of whether other "end conditions" trigger the conclusion of an operation. Accordingly, the mobile robot 10 is of greater usefulness because of this operation-constraining capability.

Alternatively, in accordance with other embodiments, the operator may elect not to specify a leash, or even to override an inherent leash included in the control software.

When operating autonomously, the mobile robot 10 performs a mapping behavior that generates and updates the occupancy grid map. Once generated, the occupancy grid map can be transmitted to a teleoperation console 21 by any appropriate mode of communication, such as Wireless Ethernet, or via a tether connection such as a USB cable between the mobile robot 10 and the teleoperation console 21.

Missions/Operations

Figure 29:
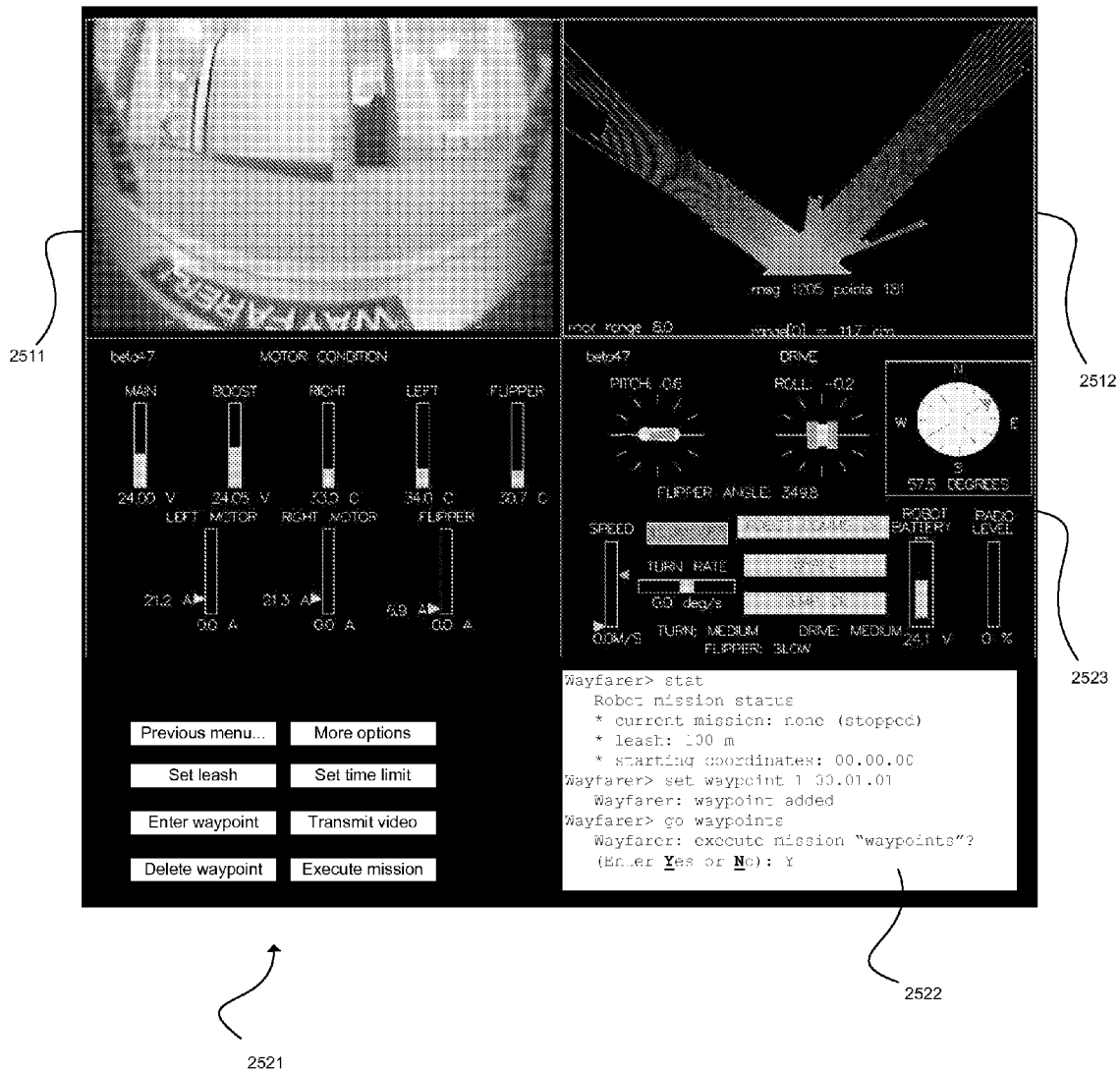
FIG. 29 is an example screen shot of a computer-based teleoperation console presenting a graphical user interface to the operator and displaying a video feed, LIDAR map, robot sensor monitor, and command line interface.

In order to perform useful reconnaissance, in accordance with one embodiment, the mobile robot 10 is physically light enough to be carried and transported by hand to a starting location. The operator can quickly initiate one of the various autonomous missions or operations that the mobile robot 10 can perform, such as follow-street, by pushing a button or switch on the chassis 101 of the mobile robot 10 or by issuing a command from the teleoperation console 21. Alternatively, for example, the operator can manually steer the mobile robot 10 to a starting position using the teleoperation console 21 to remotely control the mobile robot 10, and then initiate the autonomous operation by entering a command on the teleoperation console 21 (see FIG. 29, which illustrates a command to start a follow-waypoints operation being entered into a command line interface 2522 of the teleoperation console 21).

Follow-Street

Figure 8:
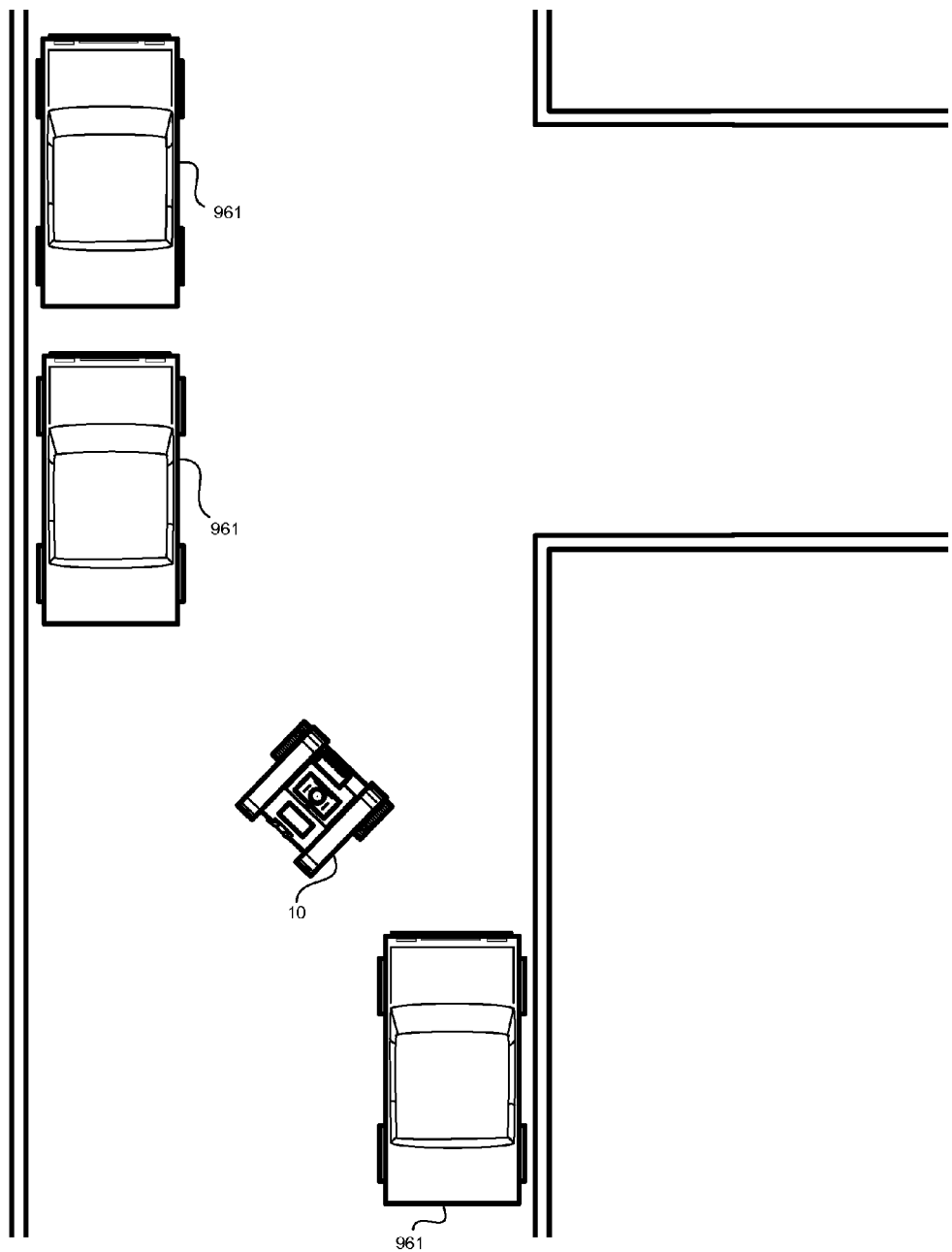
FIG. 8 is a plan view of a mobile robot performing an autonomous route-following operation.

FIG. 8 illustrates a mobile robot 10 performing a follow-street operation on a roadway having parked cars 961 on the side of the road. The mobile robot 10 in this example uses LIDAR to detect the parked cars 961 as well as both the right and left edges of the roadway, and selects a linear path corresponding to the direction of the road by performing Hough transform analysis of the LIDAR range-finding data. The follow-street behavior attempts to find a respective Hough line on both the right and left sides of the street, and selects a heading for the mobile robot 10 corresponding to an average of the detected right and left Hough lines.

Figure 37:
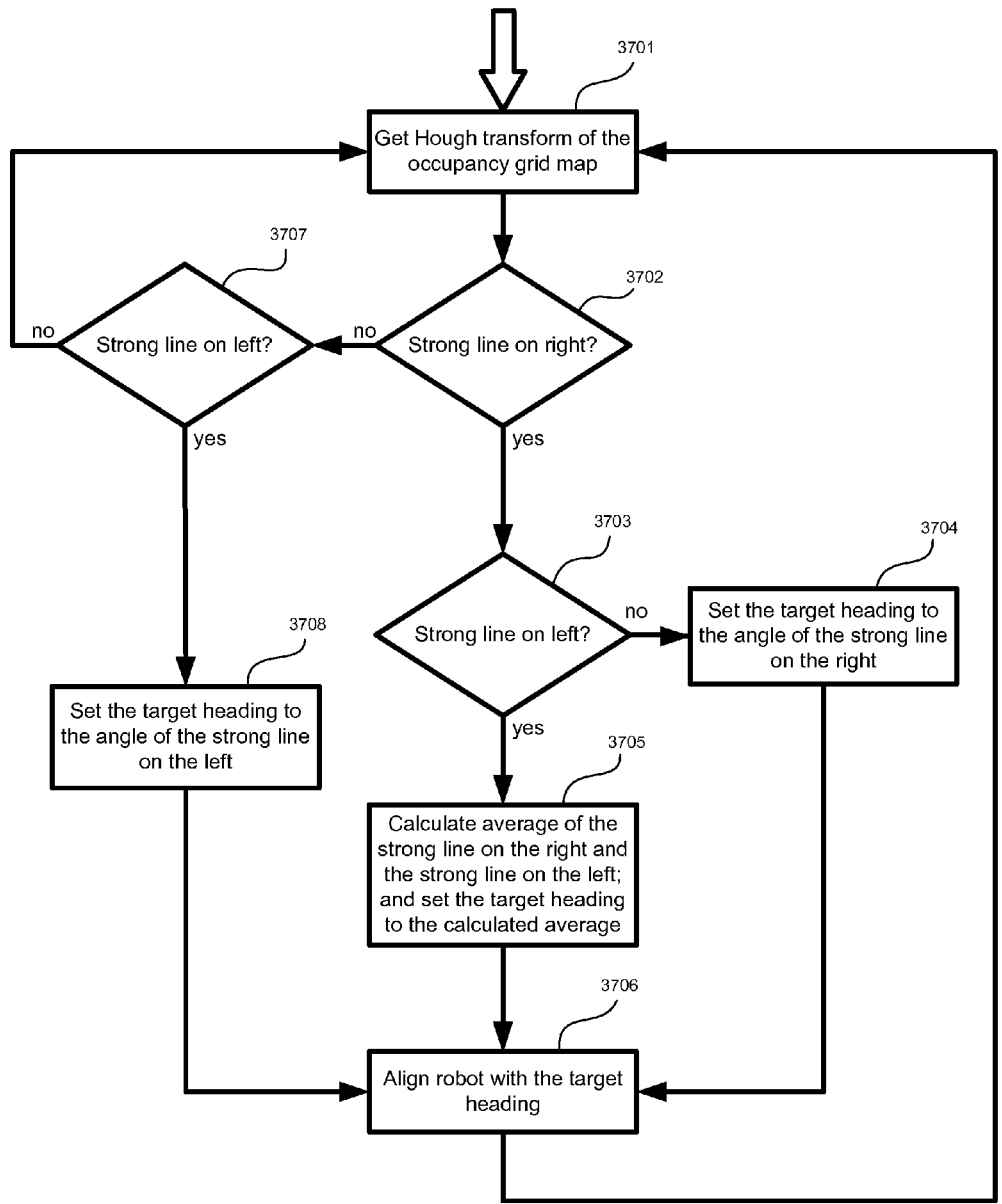
FIG. 37 is a flow chart illustrating a method for controlling a mobile robot to autonomously perform a follow-street operation.

FIG. 37 illustrates a method for performing the follow-street routine, in which an initial step 3701 performs a Hough transform on the data provided from the range finder 121 to identify two Hough strongest lines—one on the right side and one on the left side of the mobile robot 10. At step 3702 the routine determines whether a Hough strongest line has been identified on the right side; if so, the routine proceeds to step 3702, while if not, the routine proceeds to step 3707. Both steps 3703 and 3707 then make a similar determination whether a Hough strongest line has been identified on the left side.

Further regarding the follow-street operation illustrated in FIG. 37, if the results of steps 3702 and 3707 are both "no"—that is, no Hough strongest line was identified for either the left or the right side—then the routine loops back to the initial step 3701 without altering the heading or velocity of the mobile robot 10 (and resultingly, the mobile robot 10 will continue forward at whatever velocity and heading it had before that iteration of the follow-street routine). On the other hand, if a Hough strongest line was identified for only the left side, then step 3708 sets the target heading for the mobile robot 10 to the strongest line on the left side; while if only the right side had a Hough strongest line, step 3704 sets the target heading to the strongest line on the right side. If respective strongest lines were identified for both the right and left sides, then step 3705 calculates an average vector based on the right and left Hough strongest lines and establishes this average as the target heading for the mobile robot 10. Then, after any of steps 3704, 3708 or 3706, the routine steers the mobile robot 10 toward alignment with the target heading at step 3706 before looping back to step 3701.

Figure 38:
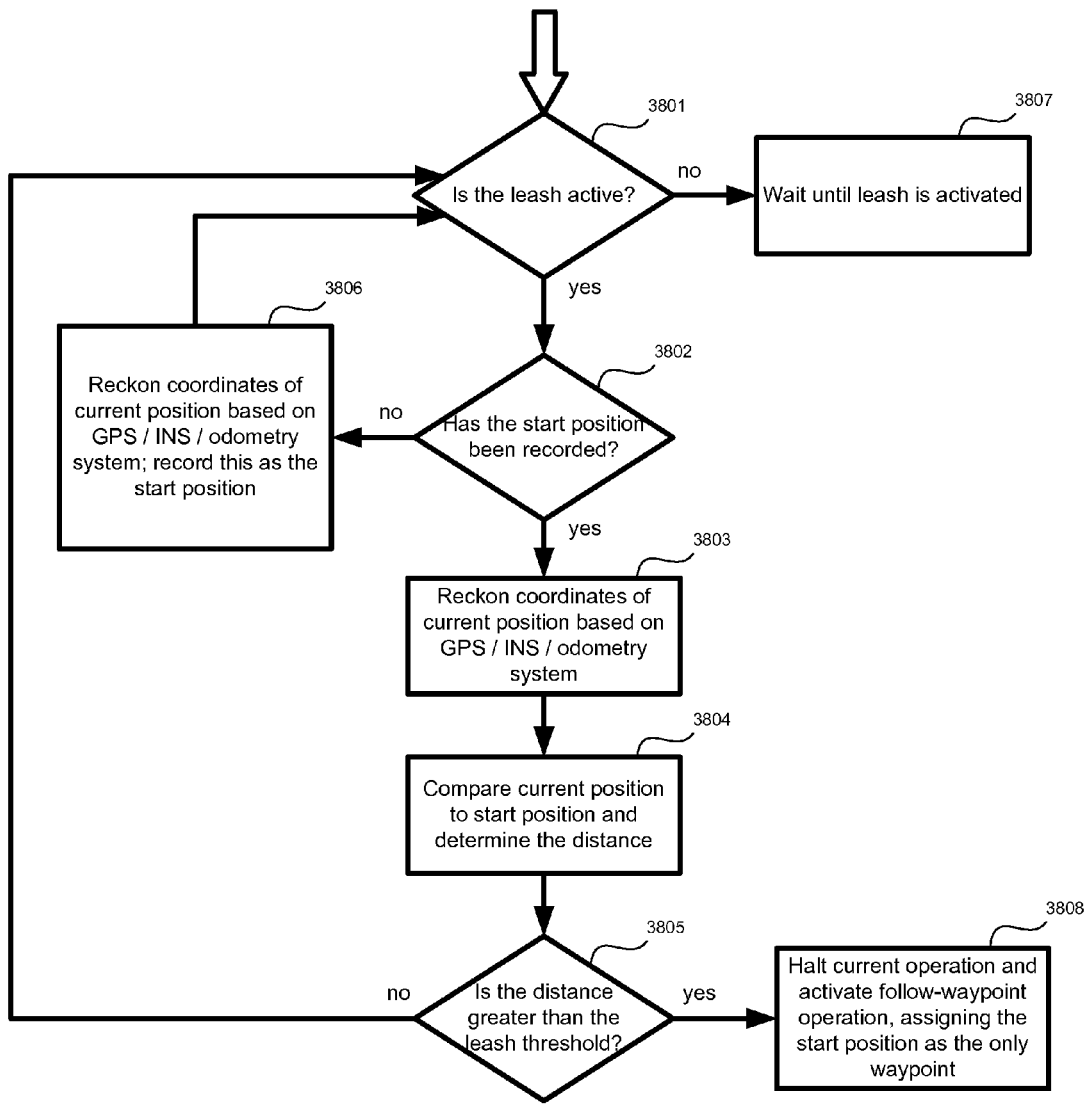
FIG. 38 is a flow chart illustrating a distance-based "leash" method for controlling a mobile robot to terminate an autonomous navigation operation when the distance of the mobile robot from its position at the beginning of the operation reaches a threshold.

The follow-street operation typically is performed in combination with a distance leash routine that specifies the threshold distance to which the robot should continue down the street. As illustrated in FIG. 38, the distance leash routine may execute on the processor 140 concurrently with the follow-street operation. At an initial step 3801, the distance leash routine checks whether the leash routine is active (by, for example, checking a boolean flag in the memory store of the processor 140) and, if not, enters a waiting state at step 3807.

If the distance leash routine is active, however, the routine proceeds to check whether the start position has been recorded at step 3802—if not, then this is the first iteration of the distance leash routine, and the routine records the mobile robot's current position as the starting position at step 3806 before returning to step 3801.

The distance leash routine then reckons the current position of the mobile robot 10 at step 3803 based on localization or positional data supplied from the GPS, INS and/or odometric systems, calculates the mobile robot's distance from the starting position at step 3804, and determines whether the mobile robot 10 has traveled beyond the threshold distance at step 3805. If the mobile robot's distance from the starting position is less than the distance threshold, the routine returns to step 3801. On the other hand, when the mobile robot 10 reaches the threshold distance away from the starting position, the distance leash routine terminates the follow-street operation and returns the mobile robot 10 back to the starting position, by automatically activating a follow-waypoints operation using only the coordinates of the starting position as the sole waypoint at step 3808.

Figure 39:
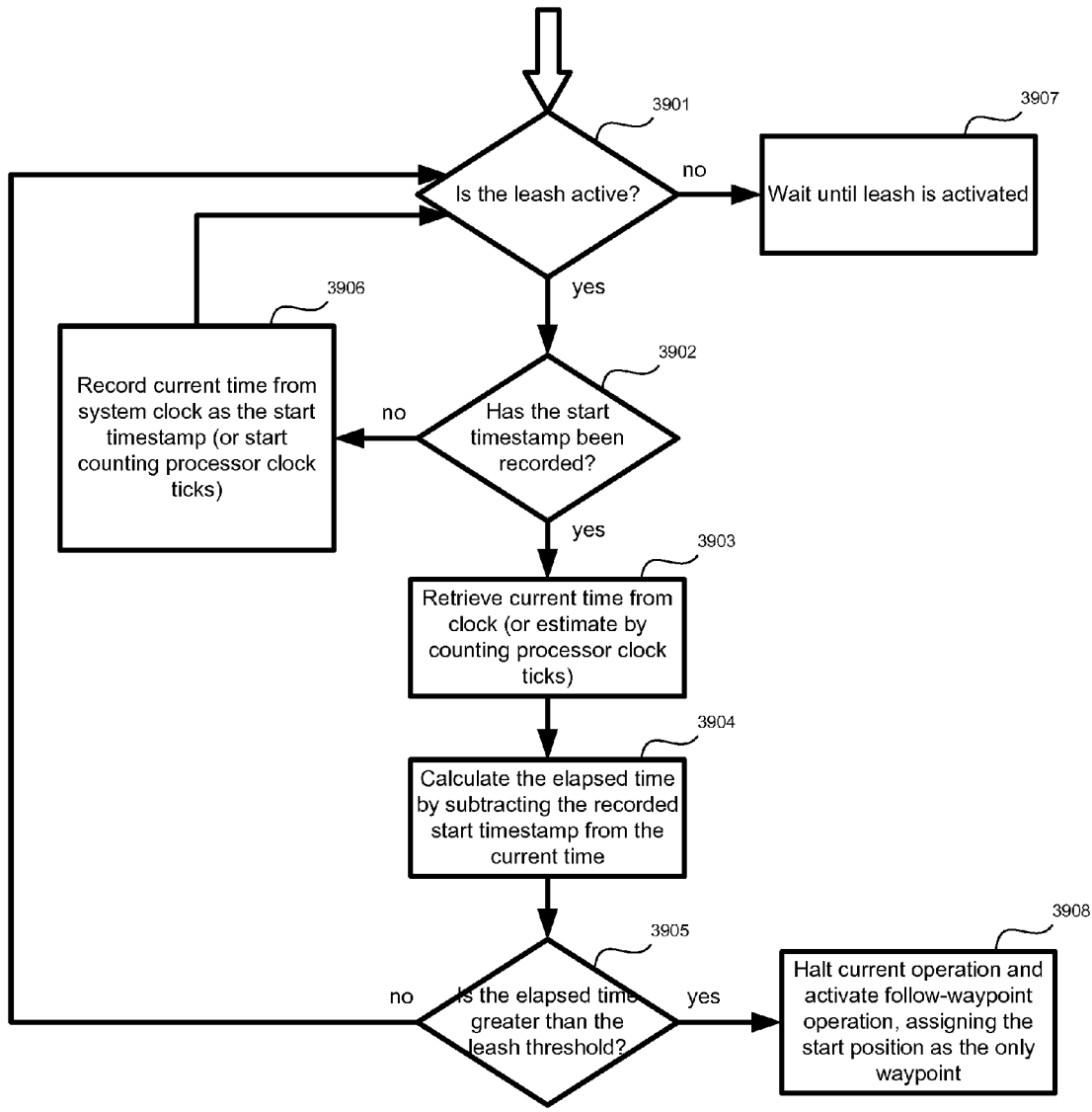
FIG. 39 is a flow chart illustrating a time-based "leash" method for controlling a mobile robot to terminate an autonomous navigation operation when a threshold period of time has elapsed.

Similarly, a time leash may be used that operates similarly to the distance leash, but which tracks the time elapsed since a starting time of the operation, instead of distance traversed by the mobile robot 10. As illustrated in FIG. 39, each of steps 3901 through 3908 may be substantially similar to the corresponding steps exemplified in the distance leash method of FIG. 38, but in which timestamps are substituted for positional coordinates.

The follow-street behavior uses the Hough transform to detect linear features in the 360-degree planar LIDAR range data, in accordance with one alternative embodiment. Each line hypothesis with at least a minimum number of points is then classified based on whether it is on the right or left side of the mobile robot 10, in which $$\text{side}(L) = \begin{cases} \text{left} & \text{if } \theta_{\text{left min}} < \theta_L < \theta_{\text{left max}} \\ \text{right} & \text{if } \theta_{\text{right min}} < \theta_L < \theta_{\text{right max}} \\ \text{none} & \text{otherwise} \end{cases},$$

where L is a line, side(L) is the side of line L, $\theta_L$ is the orientation of line L, $\theta_{\text{left min}}$ and $\theta_{\text{left max}}$ bracket the region of interest on the left side and $\theta_{\text{right min}}$ and $\theta_{\text{right max}}$ do the same for the right side. Currently $\theta_{\text{left min}}=0$, $\theta_{\text{left max}}=\theta_{\text{right min}}=\pi$, and $\theta_{\text{right max}}=2\pi$, so all lines except those orthogonal to the robot's current heading are classified as being on the left or right.

The line headings are used to update separate accumulator arrays for the left and right sides of the robot. As before, these accumulator arrays are used to filter out transient lines generated by the Hough transform and produce a more stable desired heading.

The value of the accumulator bins at time t is given by:

$$a_{\text{left},i,t} = (1-\lambda)a_{\text{left},i,t-1} + \lambda \sum_{\forall j: i\beta < \theta(H_j) < (i+1)\beta, \text{side}(H_j) = \text{left}} v(H_j)$$

$$a_{\text{right},i,t} = (1-\lambda)a_{\text{right},i,t-1} + \lambda \sum_{\forall j: i\beta < \theta(H_j) < (i+1)\beta, \text{side}(H_j) = \text{right}} v(H_j),$$

where $\alpha_{\text{left},i,t-1}$ is the left accumulator bin value at the previous timestep, $\alpha_{\text{right},i,t-1}$ is the right accumulator bin value at the previous timestep, $\lambda$ is the decay rate (between 0 and 1), H is the set of lines detected by the Hough transform, $H_j$ is the jth line from this set, ν(Hj) is the number of points voting for this line, θ(Hj) is the orientation of the line, and β is the bin size. Note that, as before, all of these orientations are in world coordinates, not robot-relative coordinates (although any suitable alternative coordinate system may be utilized, such as compartmentalized regions, polar coordinates, or any other such coordinate scheme, for example).

The selected heading corresponding to the maximum bin in each accumulator is given by:

$$\theta_{left}=(i+0.5)\beta:\forall j:\alpha_{left,i,t}\geq\alpha_{left,j,t}$$

$$\theta_{right}=(i+0.5)\beta:\forall j:\alpha_{right,i,t}\geq\alpha_{right,j,t}$$

The behavior then computes the average of the left and right headings as defined by:

$$\theta_{desired} = \theta_{left} + \frac{\Delta(\theta_{left}, \theta_{right})}{2}$$

$$\Delta(\theta_{left}, \theta_{right}) = \begin{cases} \theta_{right} - \theta_{left} & \text{if } -\pi < \theta_{right} - \theta_{left} \leq \pi \\ \theta_{left} - \theta_{right} & \text{otherwise} \end{cases}.$$

Follow-street then sends $\theta_{desired}$ as the desired heading to the SVFH obstacle avoidance behavior. If follow-street is only able to detect strong lines (with at least a minimum number of points) on one side of the robot, it attempts to align itself with the strongest line. If follow-street is unable to detect any lines on either side of the robot, it sends a command to SVFH to move straight forward. In all cases, SVFH avoids obstacles and attempts to drive the robot along the closest open direction to the desired heading.

Follow-Perimeter

Figure 9:
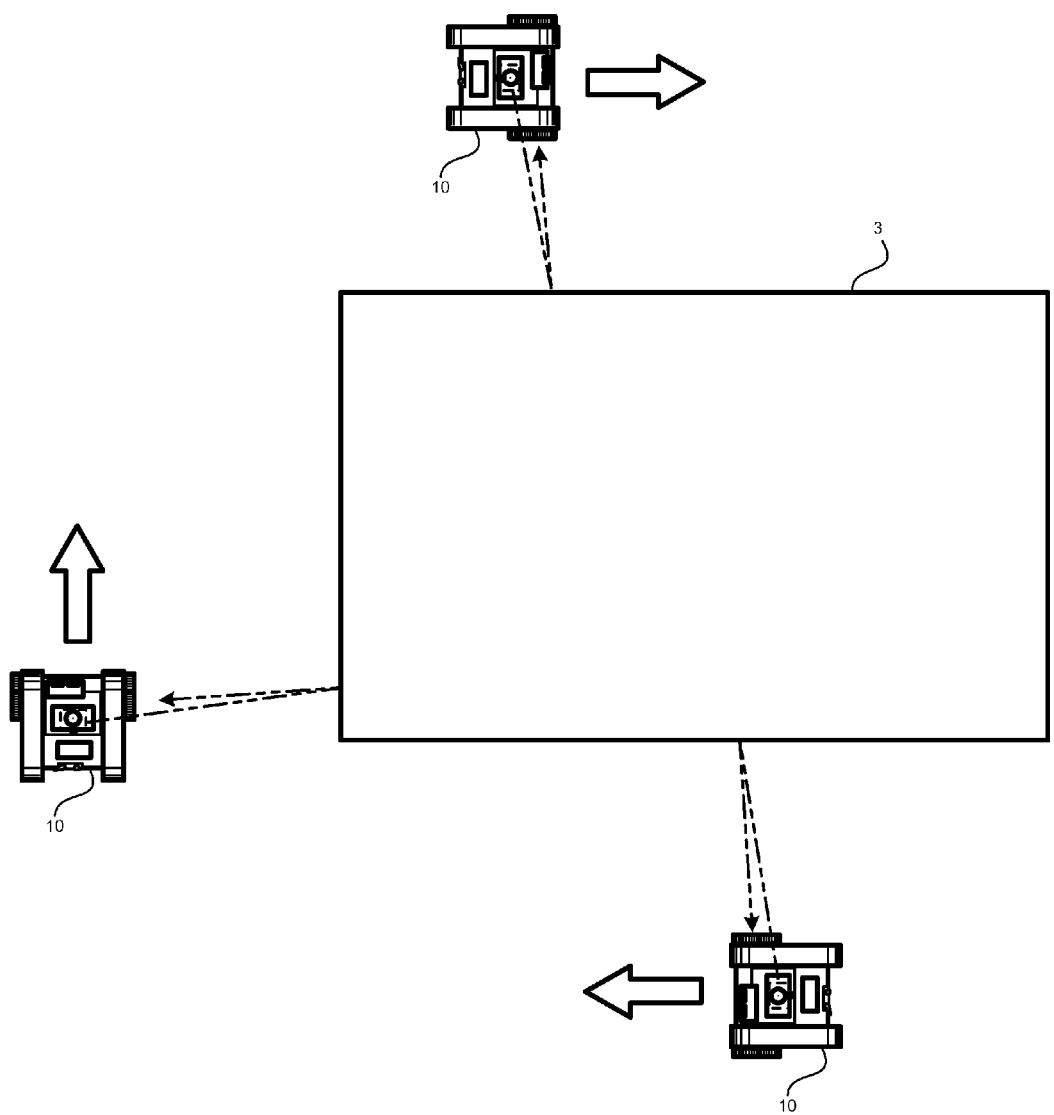
FIG. 9 is a composite plan view of a structure and a mobile robot at several locations around the structure, illustrating the performance of an autonomous perimeter-following operation.

FIG. 9 illustrates a mobile robot 10 performing a follow-perimeter operation around a rectangular building 3, in which the mobile robot 10 is shown at three locations along the traversed path around the building 3. During a follow-perimeter operation, the robot uses Hough transform analysis of the LIDAR data, similar to the follow-street behavior, but also employs a heading-voting method to smoothly and correctly navigate around corners, avoiding unstable turning behavior that could otherwise occur when the mobile robot 10 encounters a sharp corner. Furthermore, the follow-perimeter routine may record the coordinates of its starting position when a perimeter-following operation is initiated, and determine whether the mobile robot 10 has completed a circuit around the navigation target by periodically comparing the current position of the mobile robot 10 to the starting position.

Figure 35:
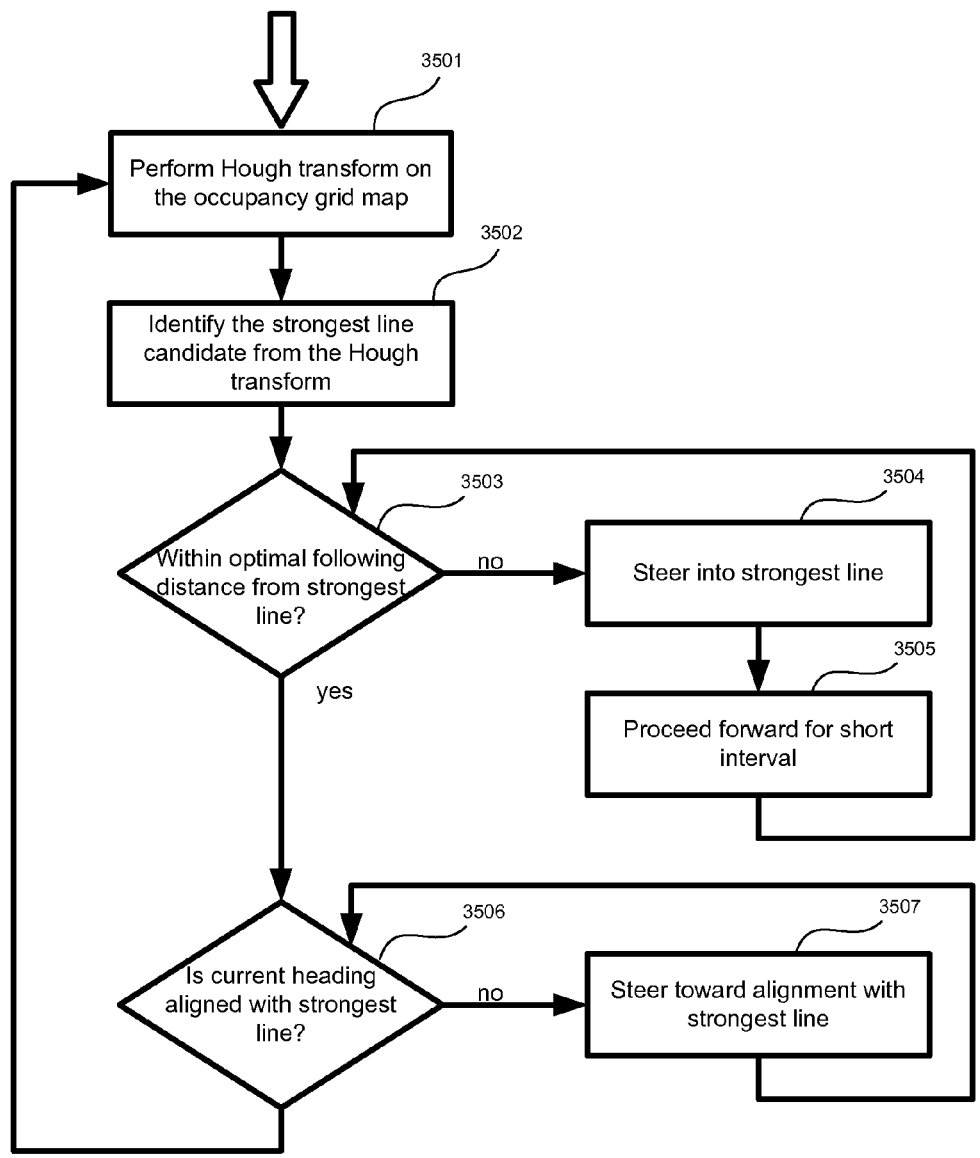
FIG. 35 is a flow chart illustrating a method for controlling a robot to perform an autonomous follow-perimeter operation.

FIG. 35 also illustrates a method for performing one aspect of a follow-perimeter routine, in which the mobile robot 10 approaches the Hough strongest line until it reaches a specified distance, at which point the mobile robot 10 proceeds in alignment with the Hough strongest line. At step 3501, the Hough transform is performed to identify the strongest line based on the data provided by the range finder 121, at step 3502. At step 3503, it is determined whether the current distance from the Hough strongest line is at the desired distance; if not, the routine steers toward the Hough strongest line at step 3504, proceeds forward for a distance at step 3505, and then loops back to step 3501. Otherwise, at step 3506, the routine determines whether the mobile robot's current heading is aligned with the Hough strongest line. If so, the routine returns to step 3501; but if not, the routine steers toward alignment with the Hough strongest line at step 3507 before looping back to step 3506.

Figure 40:
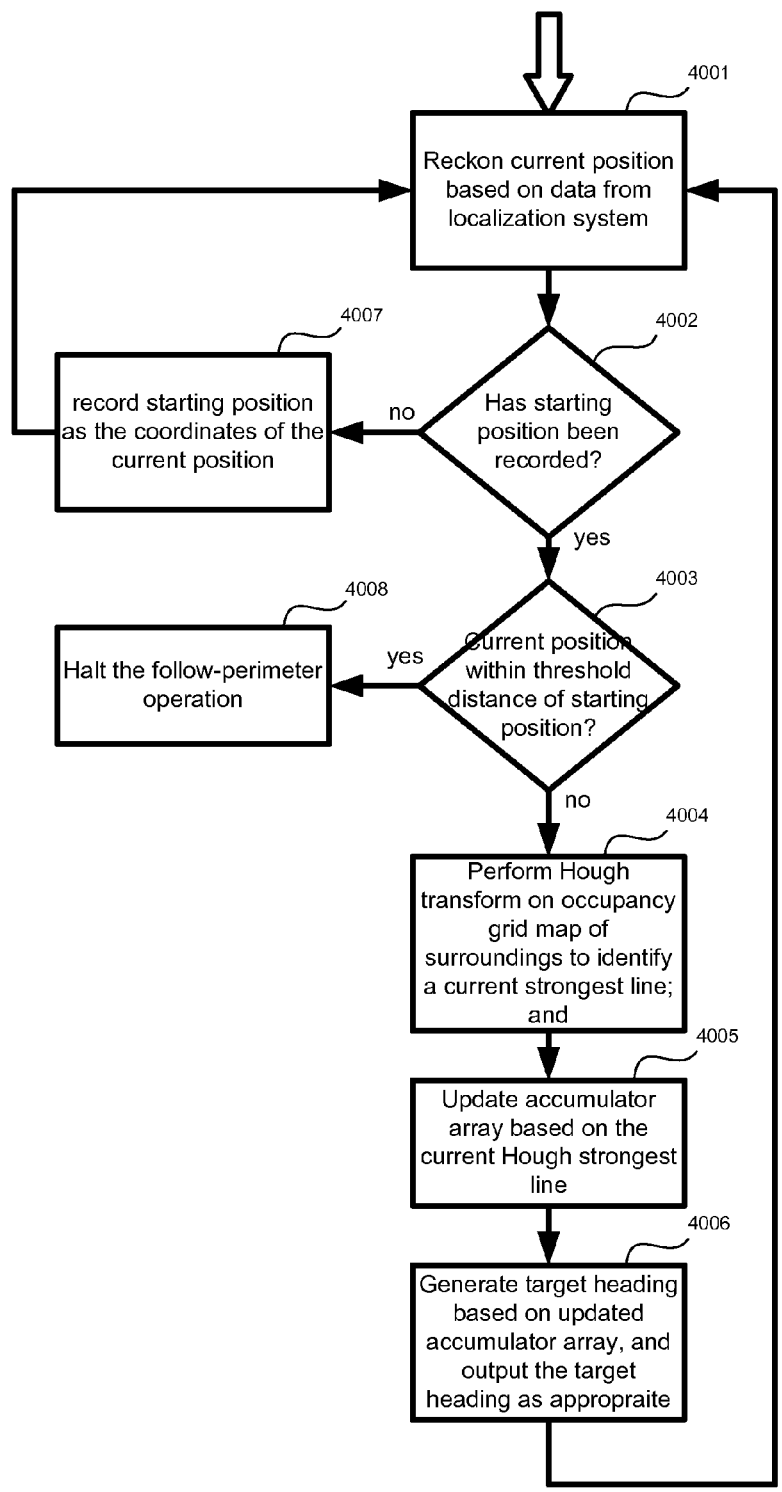
FIG. 40 is a flow chart illustrating a follow-perimeter method that employs accumulator bins to smoothly follow the perimeter of a structure, even when sharp corners may be present.

Also, with regard to additional aspects of the follow-perimeter operation, FIG. 40 illustrates a method in which the follow-perimeter routine reckons the mobile robot's current position at step 4001, and determines whether a starting position has already been recorded at step 4002. If not, step 4007 records the coordinates of the mobile robot's current position as the starting position, and loops back to step 4001. Otherwise, step 4003 checks whether the current position is within the threshold distance of the starting position; and, if so, halts the follow-perimeter operation at step 4008 because it has completed a circuit around the perimeter of the navigation target.

Further in view of FIG. 40, if the result of step 4003 is "no," the follow-perimeter routine then performs a Hough transform on the occupancy grid map at step 4004 to ascertain a strongest line to follow, and updates the accumulator array with the current Hough strongest line at step 4005. Then, step 4006 outputs a target heading based on the updated accumulator array, before returning to step 4001.

In order to ensure smooth following around the perimeter of a navigation target, the follow-perimeter behavior generates and continuously updates an accumulator array of target headings over time, wherein at each iteration of the routine, the effect of older target headings to the accumulator array decays until they no longer effect the currently generated target heading. Nonetheless, the hysteresis effect of more recent previous headings on the accumulator array dampen any sudden shifts in the current target heading relative to the immediately previous target heading, so that unstable steering caused by oscillation is avoided even when the mobile robot 10 encounters a sharp corner along the perimeter being traversed.

As an example, the follow-perimeter routine may select one of 72 bins each corresponding to 5 degrees, among the full possible range of 360 degrees of orientation. The value of an accumulator bin $\alpha_i$ at time t is then given by:

$$\alpha_{i,t}=(1-\lambda)\alpha_{i,t-1}+\lambda\Sigma_{\forall j:i\beta<\theta(H_j)<(i+1)\beta}\nu(H_j)$$

in which $\alpha_{i,t-1}$ is the accumulator bin value at the previous timestep, λ is the decay rate (between 0 and 1), H is the set of lines detected by the Hough transform, $H_j$ is the jth line from this set, ν(Hj) is the number of points voting for this line, q(Hj) is the orientation of the line, and β is the bin size, and in which the coordinates are all provided as global coordinates, rather than robot-relative coordinates. By continuously updating the accumulator bins using an algorithm based on this equation, steering and perimeter tracking is improved, while steering oscillation is reduced.

The follow-perimeter behavior may generate a desired heading based on the relative orientation and desired range to the tracked wall. For example: for left wall following, $$\theta = \theta_w + k(r_w - r_d) \text{ if } k(r_w - r_d) < \frac{\pi}{4},$$

$$\theta = \theta_w + \frac{\pi}{4} \text{ if } k(r_w - r_d) \geq \frac{\pi}{4}.$$

For right wall following, $$\theta = \theta_w - k(r_w - r_d) \text{ if } k(r_w - r_d) < \frac{\pi}{4},$$

$$\theta = \theta_w - \frac{\pi}{4} \text{ if } k(r_w - r_d) \geq \frac{\pi}{4},$$

where θ is the behavior's desired heading in radians (relative to the robot's current heading), $\theta_w$ is the orientation of the wall in radians (relative to the robot's current heading), $r_w$ is the range to the wall in meters, $r_d$ is the desired range to the wall in meters, and k is a constant (for example, $\pi/8$).

This desired heading may then be passed to the SVFH obstacle avoidance behavior. The SVFH behavior then selects the obstacle-free heading that is closest to the desired heading output by follow-perimeter. This allows the mobile robot 10 to reactively steer around obstacles that are located next to walls, and then resume wall-following automatically when the obstacle is no longer present.

Follow-Waypoints

Figure 10:
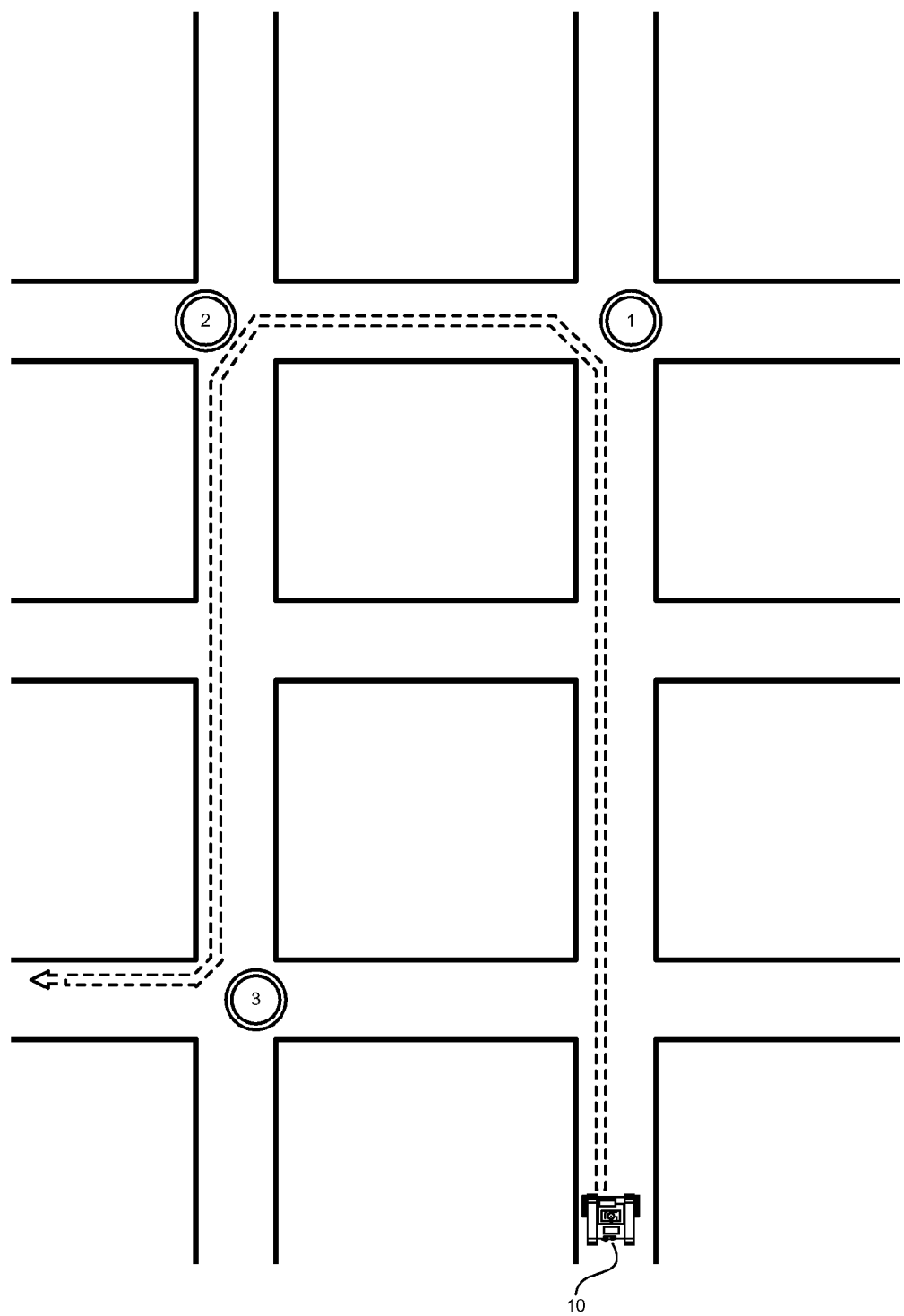
FIG. 10 is a plan view of a network of streets and three waypoints located at various intersections, illustrating the path traveled by a mobile robot when performing a waypoint-following operation.

FIG. 10 illustrates a network of streets and intersections being traversed by a mobile robot 10 performing a follow-waypoints operation. Three waypoints 1, 2 and 3 are located at three different street intersections, and the path the mobile robot will traverse to reach each waypoint in succession is shown by the double dotted arrow.

Figure 34:
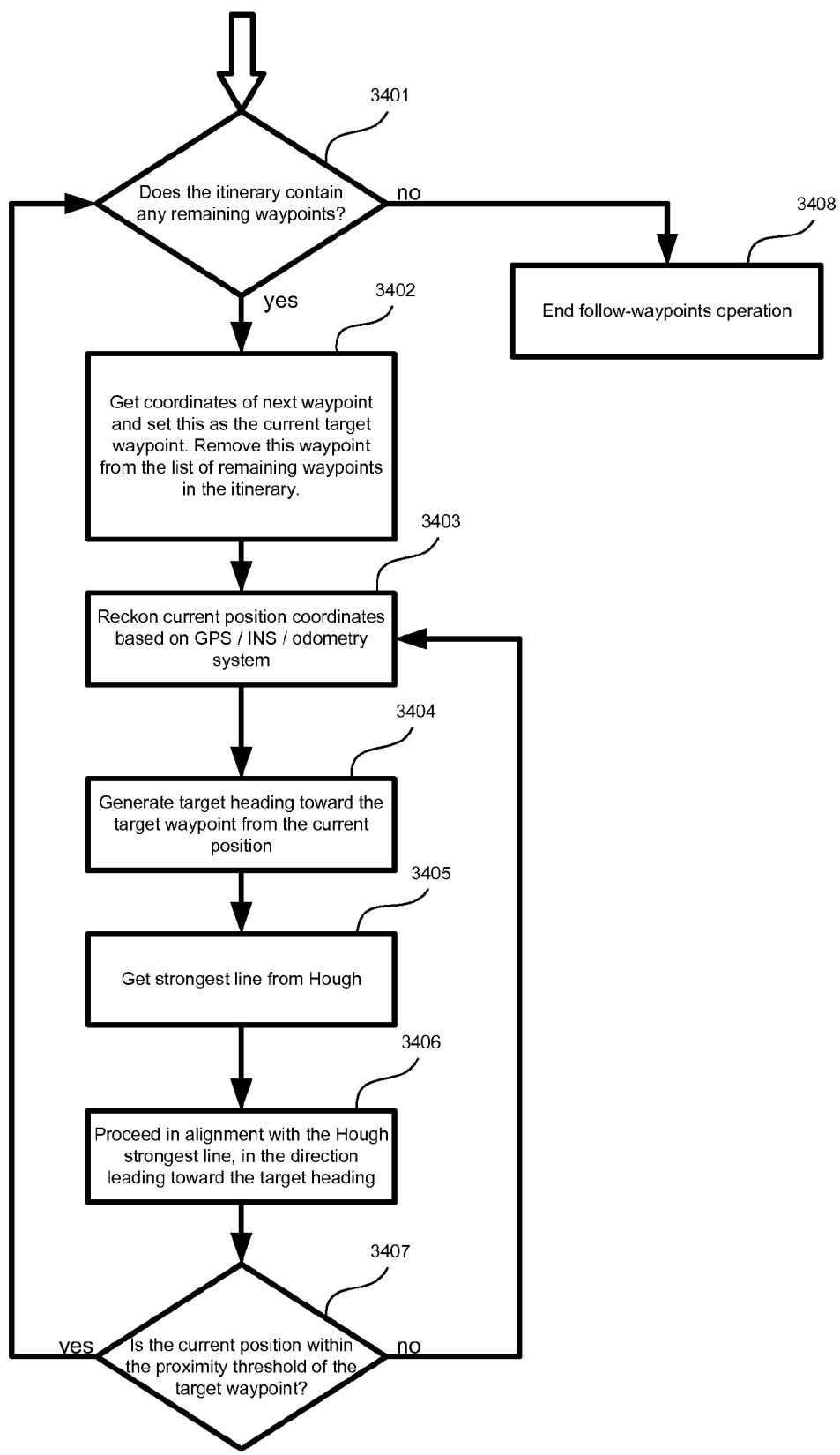
FIG. 34 is a flow chart illustrating a method for controlling a robot to perform autonomous waypoint navigation.

Further, FIG. 34 illustrates a method for performing a follow-waypoints navigation routine, in which one or more waypoints defining an itinerary are supplied to the routine. For example, data representing the coordinates of each waypoint along the itinerary may be stored sequentially in an array or other suitable data structure in the memory store of the processor 140, such as a queue or linked list, which the follow-waypoints routine can then access. As the waypoints are each retrieved from the memory store and processed by the follow-waypoints routine in the appropriate order, they are removed from the set of remaining waypoints one by one until the robot reaches the final waypoint in the itinerary, at which time the robot halts the follow-waypoints operation.

When navigating toward each waypoint, the mobile robot 10 may identify linear features in its environment, such as streets or buildings, and follow them toward the waypoint. Further, the mobile robot 10 may consider a waypoint as "reached" when the mobile robot 10 moves within a threshold distance (for a non-limiting example, the threshold distance may be set to a radius of ten meters around the precise coordinates of the waypoint, or any other suitable distance) of the waypoint, improving operational efficiency and minimizing the possible effects of mapping or localization errors.

When an iteration of the routine is executed, step 3401 initially checks whether any waypoints remain to be processed and if not, the routine has achieved its purpose (there being no further waypoints left to process) and the follow-waypoints operation halts at step 3408. Otherwise, the coordinates of the next remaining waypoint are retrieved, removed from the set of remaining waypoints, and used as the current target waypoint at step 3402. Step 3403 determines the coordinates of the current position of the mobile robot 10 based on data from the localization system (such as the GPS, INS, and/or odometry systems), and step 3404 correspondingly generates a target heading toward the target waypoint from the current position of the mobile robot 10. At step 3405 a Hough transform is performed on the data from the range finder 121 to identify a strongest line to be used as a path to follow toward the target waypoint at step 3406. Step 3407 determines whether the distance from the mobile robot 10 to the target waypoint is less than the threshold distance: if so, then the current target waypoint is considered "achieved" and the routine loops back to step 3401; if not, then the routine instead loops back to step 3403 to continue seeking the current target waypoint.

Mapping

When the mobile robot 10 navigates through terrain in order to perform reconnaissance, the mapping behavior may automatically run concurrently with other behaviors in order to generate and transmit a map of the traversed terrain.

Figure 36:
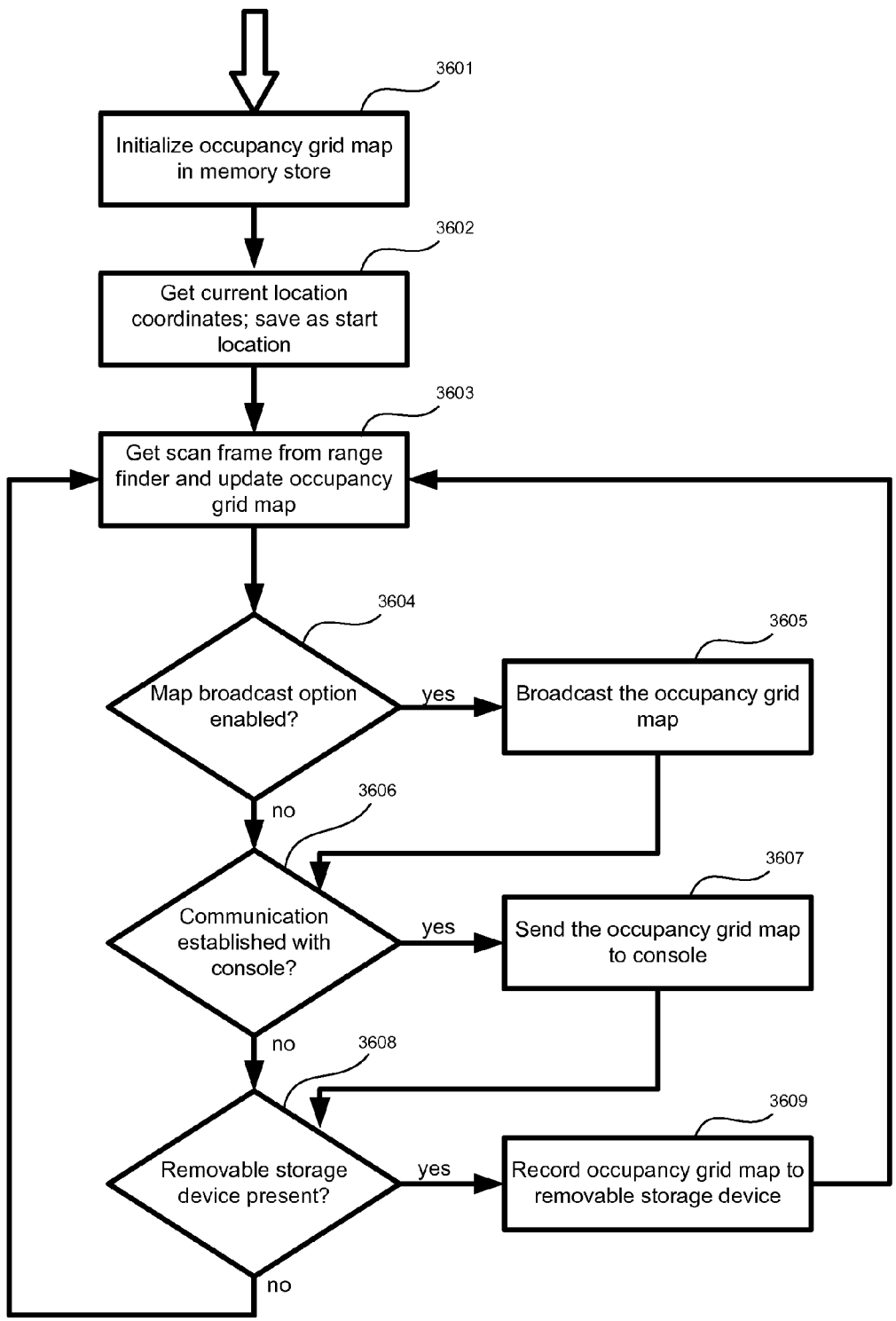
FIG. 36 is a flow chart illustrating a method for controlling a mobile robot to autonomously perform LIDAR mapping of the mobile robot's surroundings as the mobile robot traverses terrain.

FIG. 36 illustrates a mapping method for controlling the mobile robot 10 to generate and transmit maps of the terrain the mobile robot 10 passes through based on data from the range finder 121. At step 3601, an occupancy grid map is initialized and established in the memory store of the processor 140; and at step 3602, the robot's current location is ascertained. At step 3603 a frame of range finder data is used to update the occupancy grid map.

At step 3604, the mapping routine determines whether the map should be transmitted in a broadcast manner; if so, step 3605 then broadcasts the map data to the teleoperation console 21 and proceeds to step 3606, which determines whether communication is currently possible, by any method (for example, by a secure WiFi link or a USB cable connection), with the teleoperation console 21. If so, then step 3607 sends the map to the teleoperation before proceeding to step 3608. At step 3608 the routine determines whether a detachable storage medium is accessible; and, if so, the routine records the map to the storage medium at step 3609 before returning to step 3603.

The autonomous navigation behaviors, other than the waypoints operation, do not necessarily rely on any estimate of the robot's absolute position in order to navigate through their environments. Rather, the reactive follow-perimeter behavior may operate directly off the Hough transform estimates of the position of nearby walls relative to the robot, without the use of any absolute position information, for example. However, even more accurate localization may be obtained to build accurate maps of the environment.

For example, a hybrid compass/odometry localization technique may be used, in which the compass is used to determine the robot's orientation, and odometry is used to determine the distance translated between updates. The robot's new position may be determined using the following equations:

$$\Delta_t = \sqrt{(x_t - x_{t-1})^2 + (y_t - y_{t-1})^2}$$

$$x'_t = \Delta_t \cos \theta_t$$

$$y'_t = \Delta_t \sin \theta_t$$

where $(x_t, y_t)$ is the odometry position at time t, $\theta_t$ is the compass heading at time t, $\Delta_t$ is the distance traversed between time t−1 and time t, and $(x'_t, y'_t)$ is the hybrid compass/odometry position estimate for time t.

Pure odometry may tend to rapidly accumulate error in the estimate of the robot's orientation, while hybrid data integrated from multiple localization systems (such as a GPS, INS, or compass-tracking system) can provide highly accurate maps because of the significant improvement in localization precision.

Figure 13:
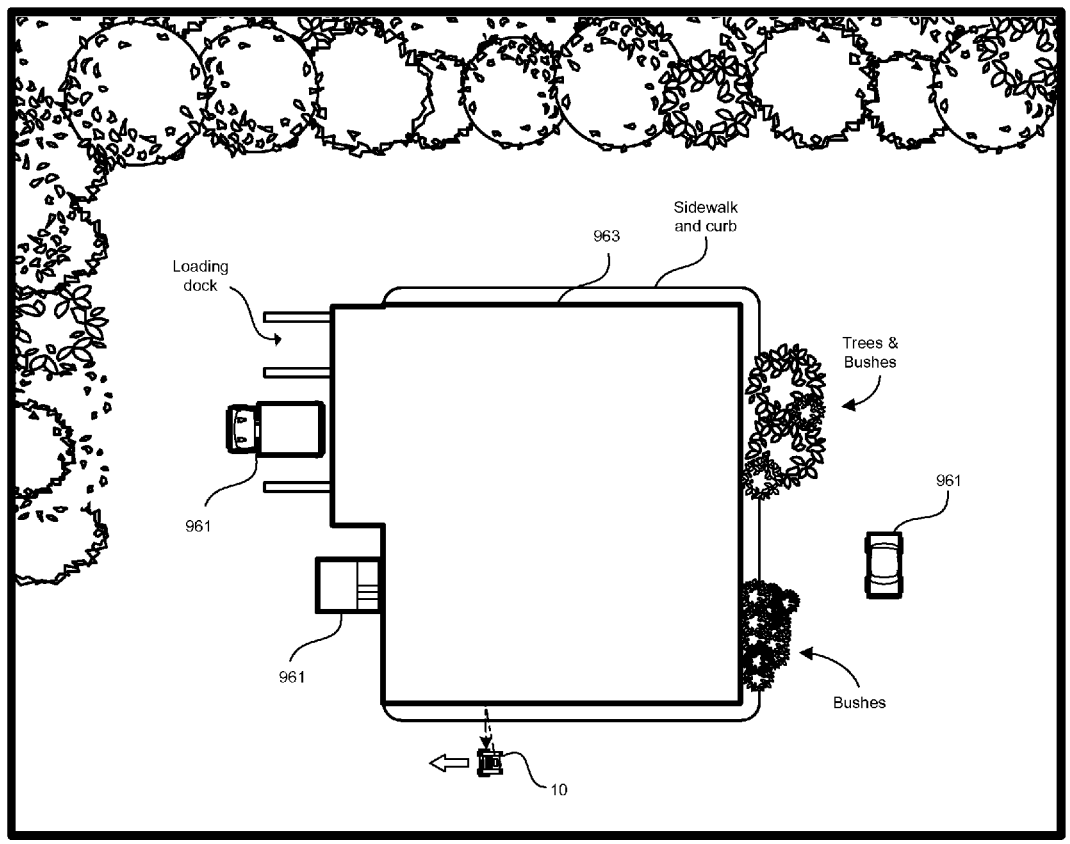
FIG. 13 is a plan view of a semi-urban building and the environment surrounding the building.
Figure 32:
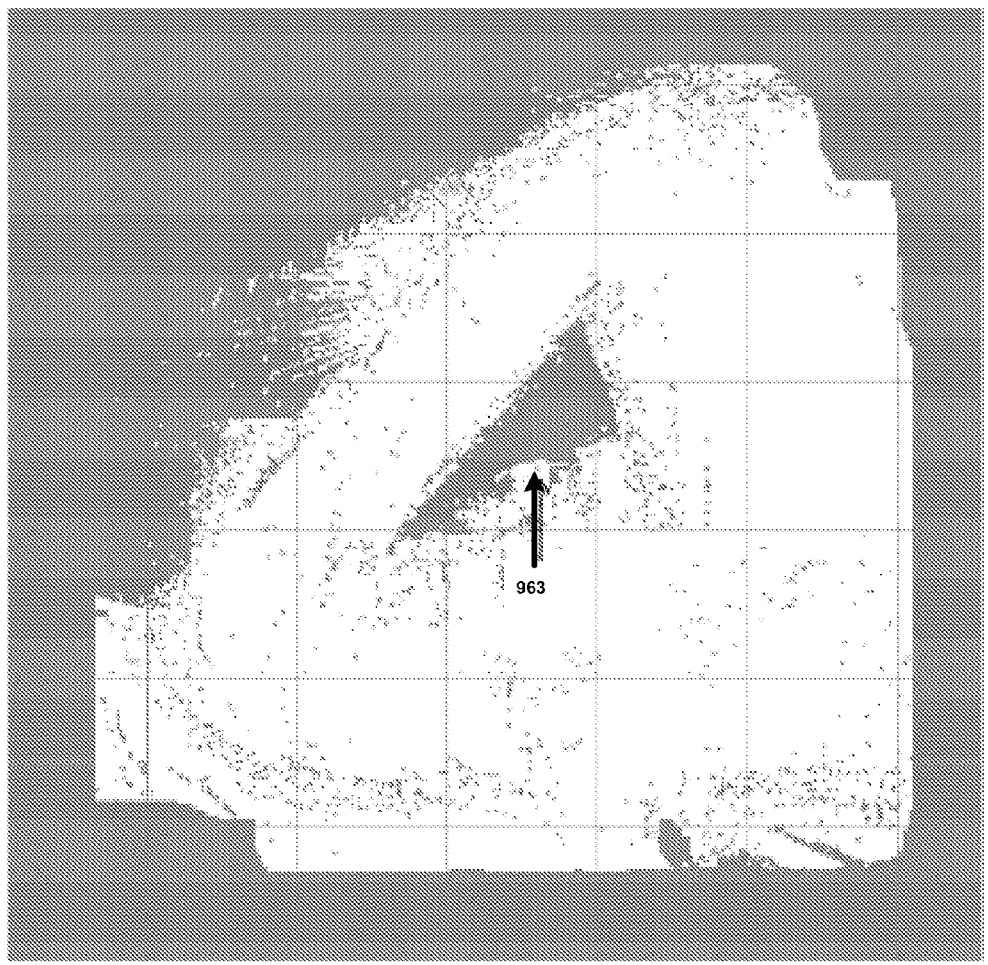
FIG. 32 is an example plan-view of a map generated by a mobile robot performing a follow-perimeter operation around the building shown in FIG. 13 using only uncorrected odometric positional information.
Figure 33:
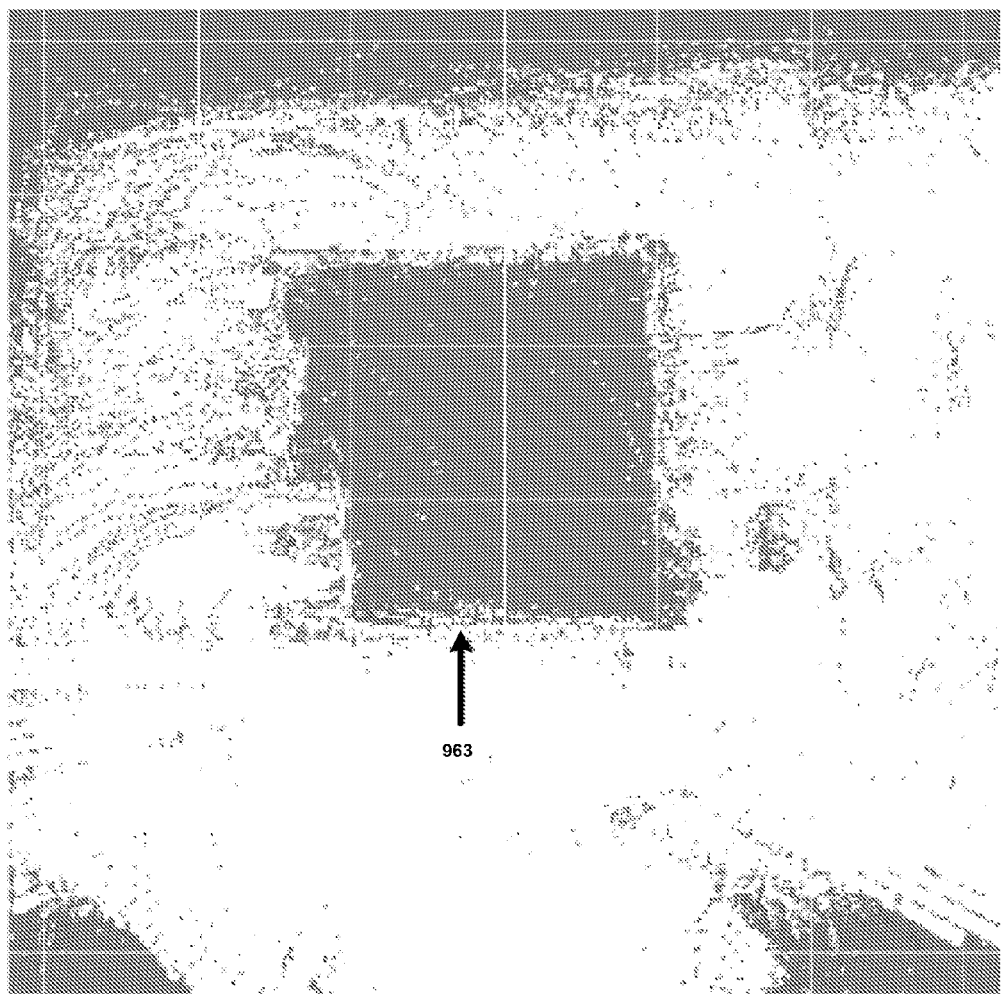
FIG. 33 is another example occupancy grid map corresponding to the building shown in FIG. 13, generated by a mobile robot integrating positional information from both odometry and also a global positioning satellite system.

As examples of the difference in accuracy between localization based only on odometry versus hybrid localization integrating data from odometric in combination with GPS, INS or other such positioning systems, FIGS. 32 and 33 are both maps generated by a mobile robot 10 circumnavigating the same building (specifically, the building 963 shown in FIG. 13). FIG. 32 was generated by a map routine using only odometric localization data, and demonstrates a significant warping of the resulting map, in which the building 963 appears to have a triangular outline, quite different from the generally rectangular outline shown by the building 963 in FIG. 13. On the other hand, FIG. 33—which was generated based on both odometric GPS localization data—shows a clear rectangular image that corresponds more closely to the actual outline of the building 963.

In contrast, use of a compass can enable the mobile robot to reliably determine the robot's position to within a few degrees, and the hybrid compass/odometry localization method may be able to determine the robot's position accurately to within a few meters throughout the perimeter reconnaissance.

Teleoperation Console

Figure 3:
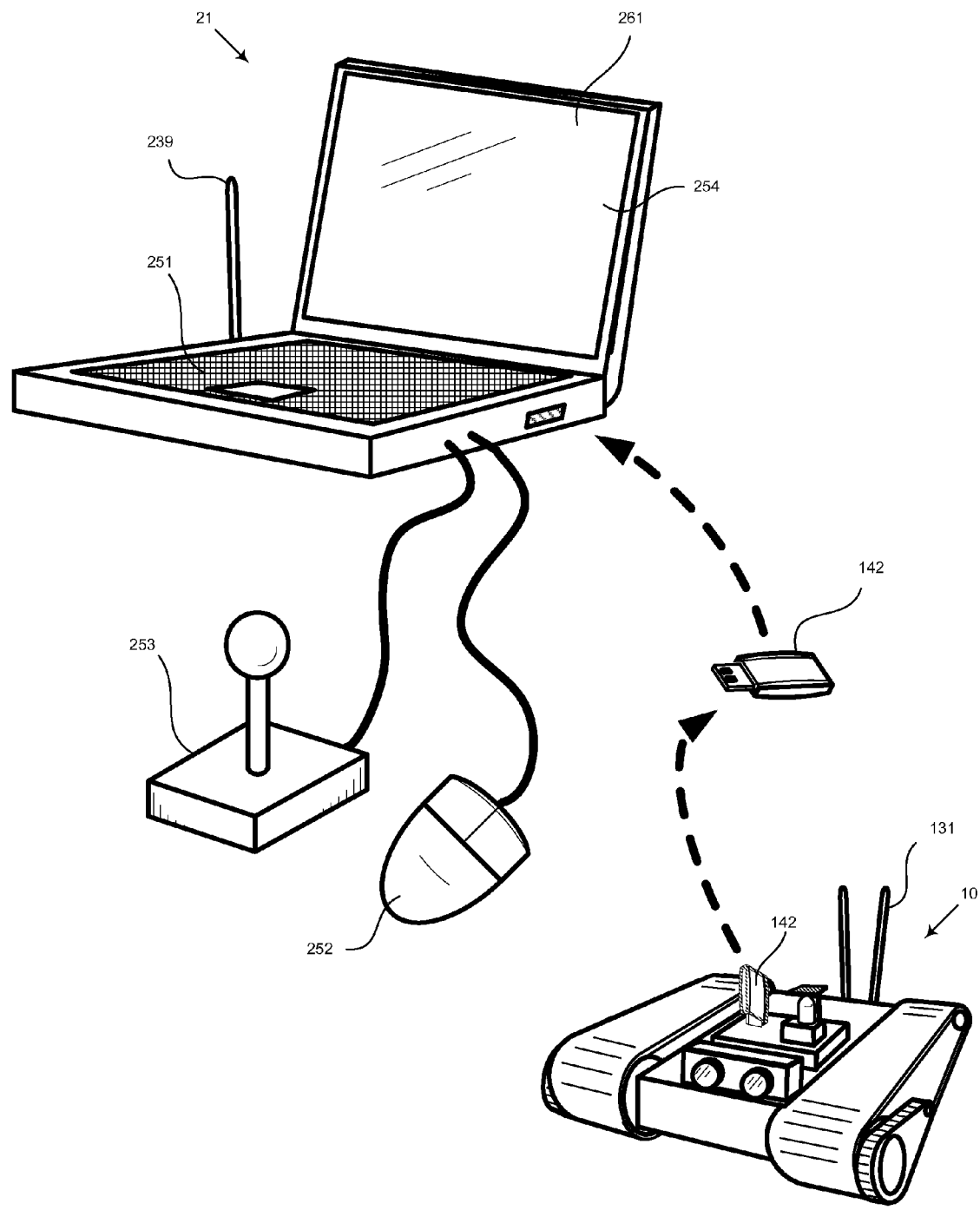
FIG. 3 is a diagram illustrating an example of a computer-based teleoperation console and a removable media device being transferred from a mobile robot to the teleoperation console.

As illustrated in FIG. 3, for example, the teleoperation console 21 may include a computer system having a raster display 261 for presenting the occupancy grid map to the operator, as well as input systems such as a keyboard 251, mouse 252 and joystick 253. The occupancy grid map may be transmitted wirelessly from the teleoperation antenna 131 of the mobile robot 10 via the antenna 239 of the teleoperation console 21. Alternatively, the mobile robot 10 may store the occupancy grid map on a detachable memory storage device 142 (which may be a USB memory stick, a Flash RAM or SD/MMC memory chip, or the like) that the operator can retrieve when the mobile robot completes an autonomous operation and access using the teleoperation console 21 or other suitable device.

Figure 4:
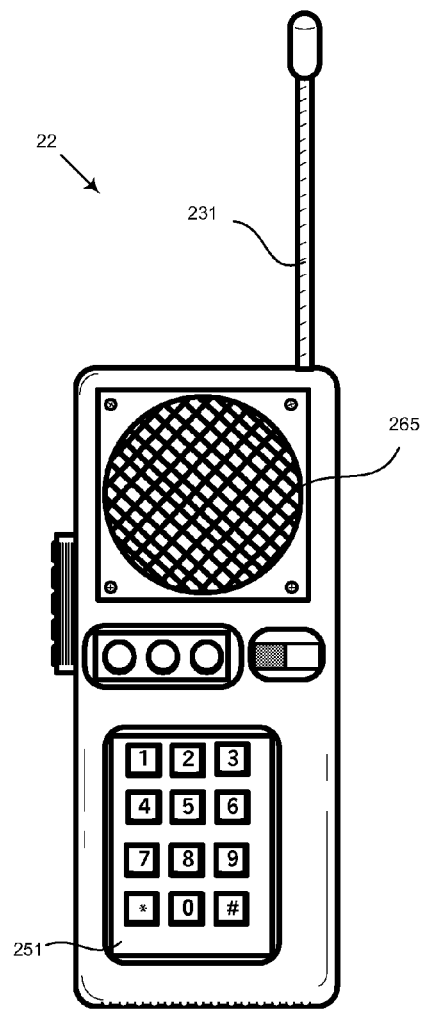
FIG. 4 is a direct view of an alternative teleoperation console.
Figure 5:
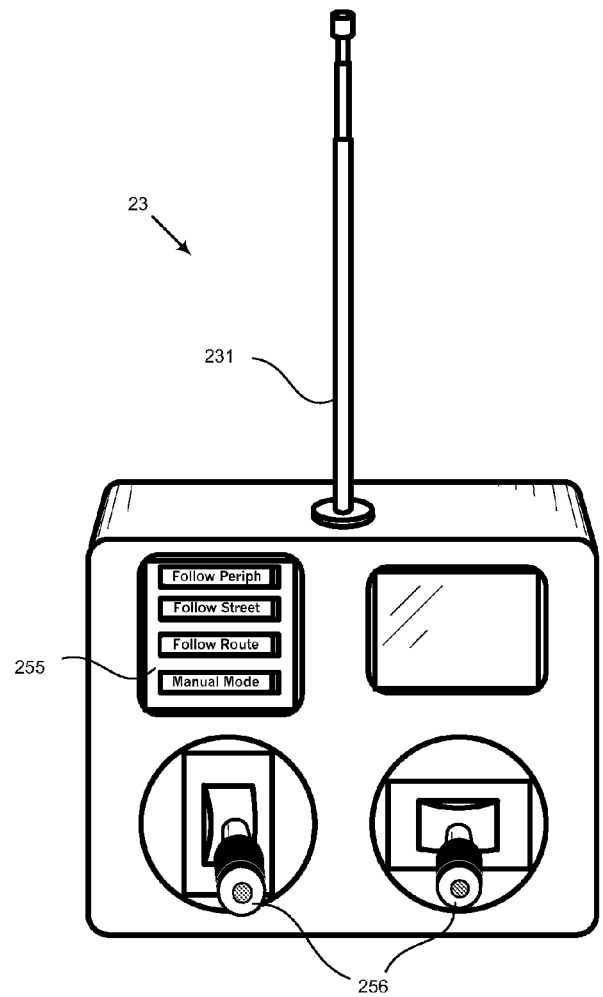
FIG. 5 is a direct view of another alternative teleoperation console.

FIGS. 4 and 5 illustrate two alternative teleoperation console implementations. In FIG. 4, a walkie talkie-style teleoperation console 22 includes a numeric keypad 251 for entering numeric codes corresponding to robot operation commands, and a speaker 265 that can output audible tones or messages from the mobile robot 10 (which may indicate operation status such as "operation complete" or "robot is stuck," inter alia, via distinctive tones or synthesized speech). The walkie talkie can be tuned to a radio frequency used to communicate with the mobile robot, and the codes entered by the operator onto the keypad 251 can be encoded as dual-tone multifrequency (DTMF) signals recognizable by the mobile robot 10 and transmitted to the mobile robot 10 over a radio channel (as a non-limiting example, entering a three-digit numeric sequence such as "111" or "456" into the keypad 251 may command the mobile robot 10 to perform an operation such as a follow-perimeter or follow-street operation that is assigned to the entered sequence, inter alia).

FIG. 5 illustrates a remote control-type teleoperation console 23, which includes X-axis and Y-axis joysticks 256 for directly steering the mobile robot 10, as well as mission-selection buttons 255 for choosing an autonomous operation to be performed by the mobile robot 10.

Range-Finder

The range-finding system may include a scanning light source (for example, an infrared laser that is continuously rotated so as to scan and detect reflective surfaces of objects positioned anywhere around the mobile robot) and corresponding detector or other LIDAR (light detection and ranging) system 121, as shown in FIGS. 1 and 2.

Figure 14:
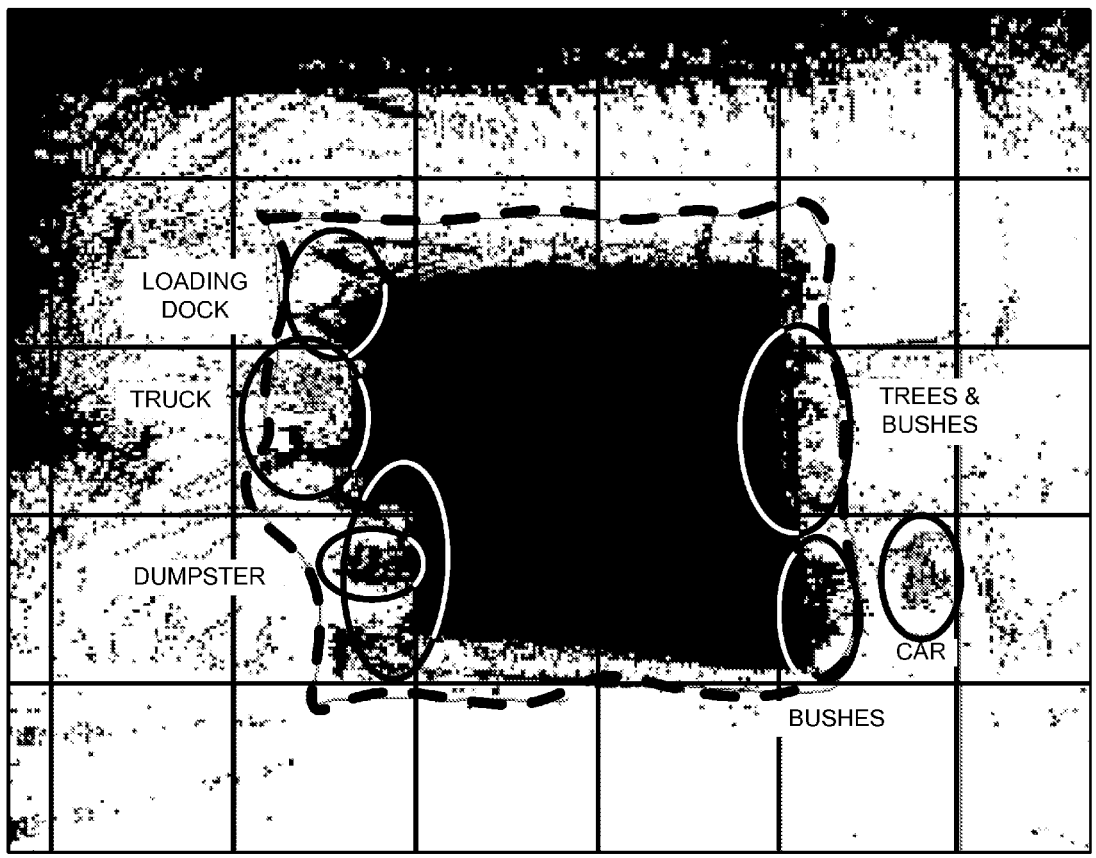
FIG. 14 is a example terrain map generated by a mobile robot that performed a follow-perimeter operation around the building of FIG. 13.
Figure 27:
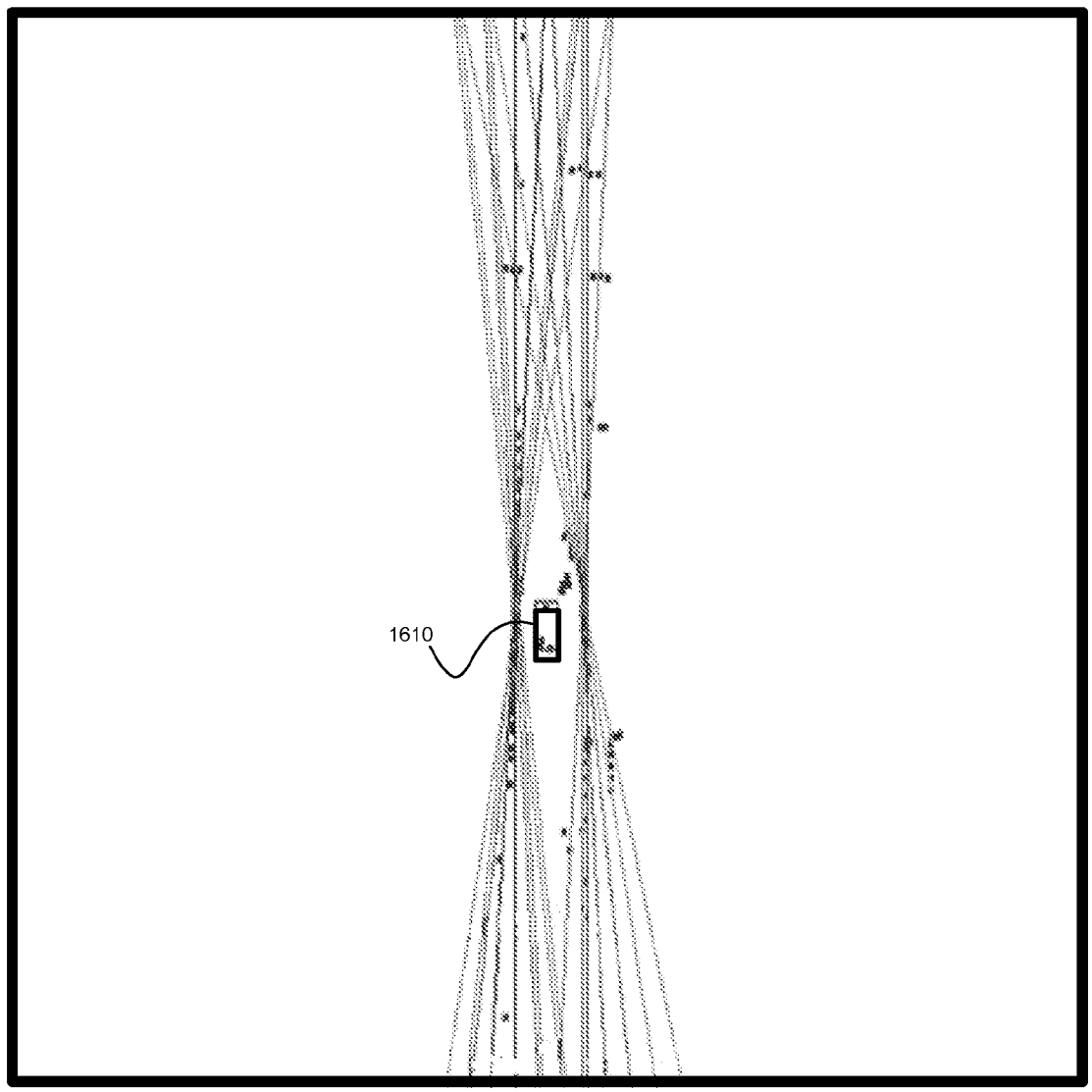
FIG. 27 is an example occupancy grid map illustrating a large number of strong-line candidates identified by a Hough transform process executed on a mobile robot navigating a corridor.

Data from the range-finding system 121 typically includes patterns or clusters of dots, in which each dot indicates that an object was detected by the range-finder at the location corresponding to the dot (see, for example, FIG. 14, which illustrates an occupancy grid map generated by a mobile robot circumnavigating the building 963 shown in FIG. 13). In order to identify linear features, and to select an appropriate heading to follow among various linear features that may be identified, the mobile robot 10 analyzes the range-finding data using a Hough transform. As illustrated in FIG. 27, the Hough transform may identify several line candidates. Using the Hough technique, one strongest-line can be selected from among multiple line candidates, as illustrated by the Hough strongest line 1606 in FIG. 28.

Depending on the mode or operation selected, the mobile robot 10 may then steer so as to proceed in alignment with the Hough strongest line 1606 from the occupancy grid map.

Obstacle Avoidance and SVFH

Various obstacles may be encountered lying along the path of the mobile robot 10 as it operates autonomously. Therefore, the mobile robot 10 includes an obstacle detection and avoidance behavior for identifying and evading obstacles. In accordance with one embodiment, the mobile robot 10 includes a 3D stereo vision system 125 that employs binocular cameras and machine vision methods for generating a depth map (see FIG. 30) that is used together with the range-finding data from the range-finder 121 to detect obstacles. The mobile robot 10 may employ a scaled vector field histogram technique to integrate the obstacle data from the stereo vision system 125 and range-finder 121, to identify clear headings and blocked paths, and to select an appropriate heading for steering the mobile robot 10 around obstacles and toward the desired navigation target.

In accordance with one embodiment, the target heading generated by the navigation behaviors (e.g., follow-street or follow-perimeter) is first passed to the SVFH obstacle avoidance behavior, which may modify the target heading in response to an obstacle detected along the target heading.

Automatic Flipper Deployment

Figure 6A:
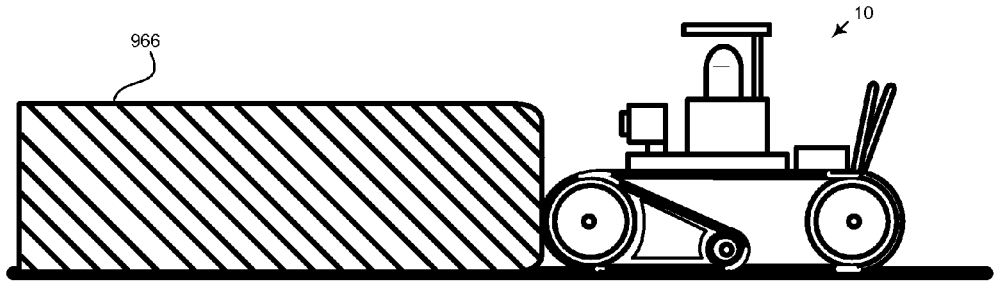
FIGS. 6A, 6B and 6C illustrate a mobile robot surmounting a curb.
Figure 6B:
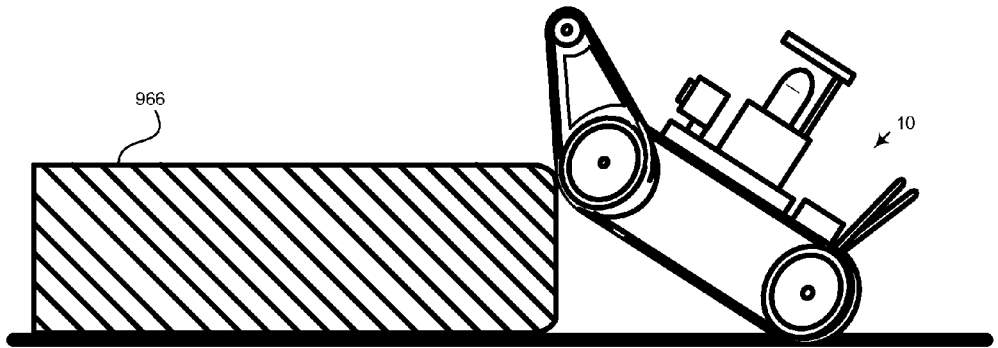
Figure 6C:
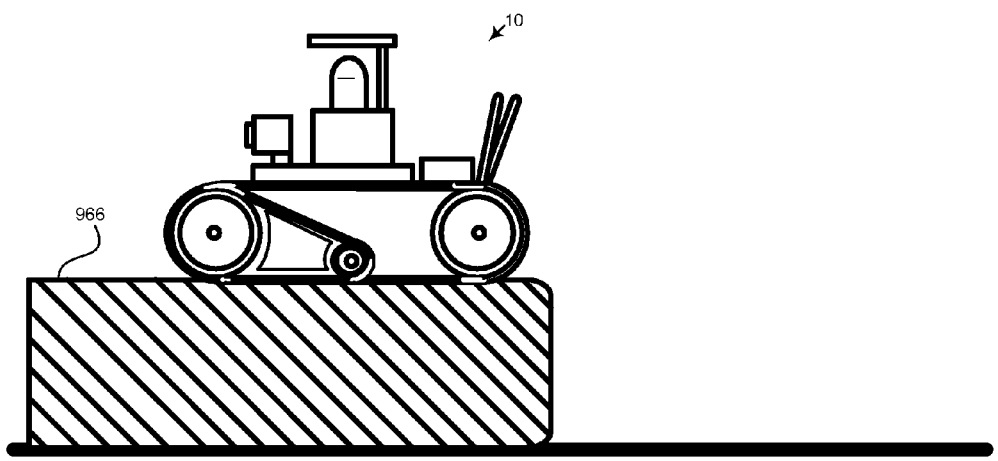

In accordance with another embodiment, the mobile robot includes a pair of treaded flippers 115 positioned adjacent the main treads 110 of the mobile robot's drive system, to assist in surmounting low-lying obstacles. The current supplied to the drive motors that propel the treads 110 are monitored by an ammeter, which reports the drive motor current to the processor 140 (see FIG. 7). When the mobile robot 10 abuts an obstacle such as a sidewalk curb that prevents forward movement (as illustrated in FIG. 6A), the drive motor current will rise as the drive motors attempt to drive the treads 110 while the mobile robot 10 cannot proceed because of the obstacle. The treads may then be automatically deployed by a stasis detection behavior running concurrently on the processor 140, which monitors the drive motor current and drives the flipper motor to engage the flippers 115 when the drive current exceeds a particular threshold (see FIG. 6B). Once the flippers 115 have lifted the treads 110 above the curb, the mobile robot 10 can then proceed over the obstacle (as illustrated in FIG. 6C).

Hardware/Software Organization

Figure 11:
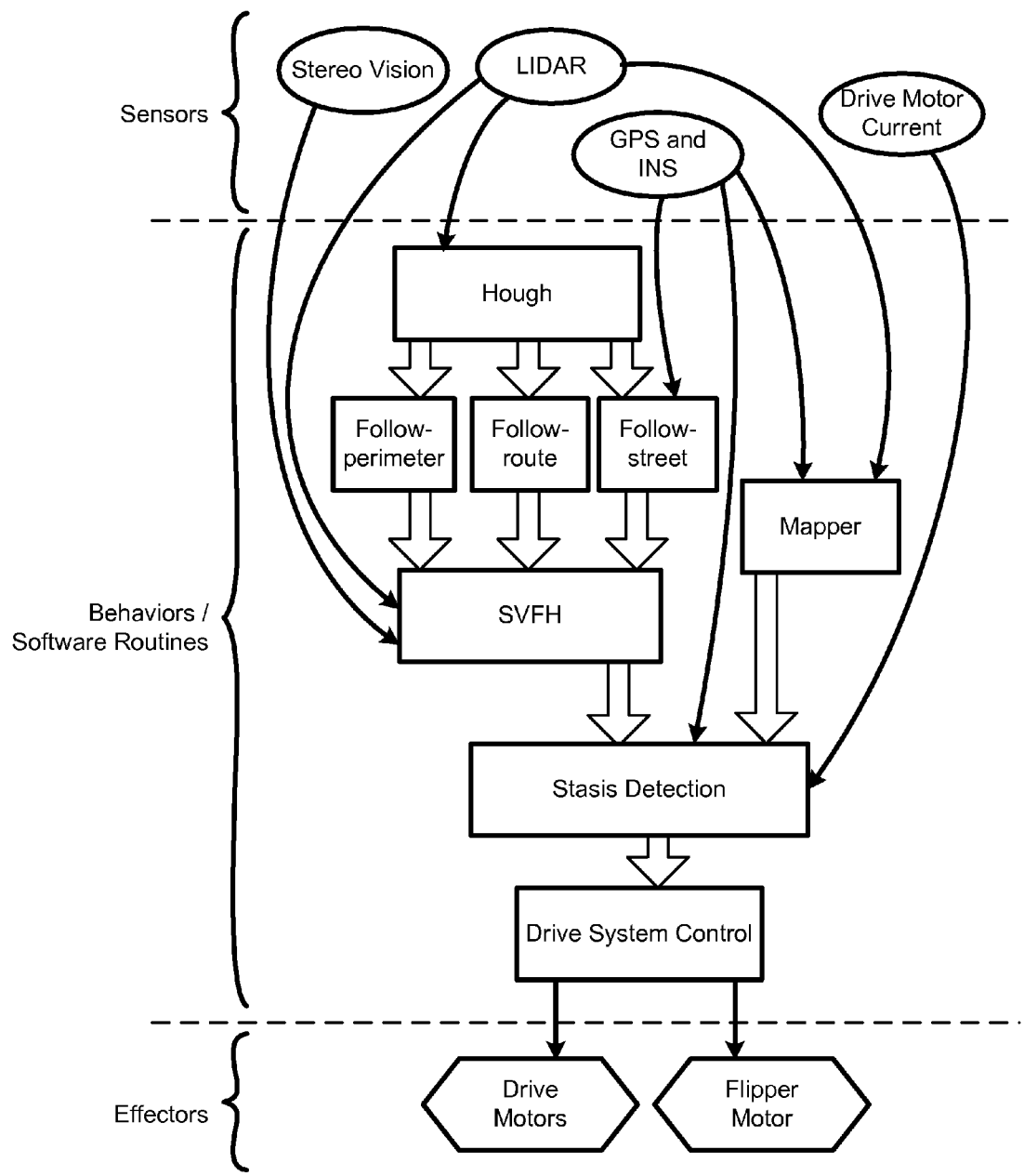
FIG. 11 is a software organization diagram illustrating an example software organization for the mobile robot.

FIG. 11 shows data flow among system components segregated into functional groups. At the top of FIG. 11, the sensors of the mobile robot 10, such as the stereo vision, LIDAR, GPS or INS systems supply information to behaviors and routines executing on the processor 140. The drive motor current sensor, which may include an ammeter on the chassis 101, supplies appropriate information to the stasis detector so that the stasis detector routine can deploy the flippers automatically when the drive motor current indicates collision with an obstacle.

Figure 12:
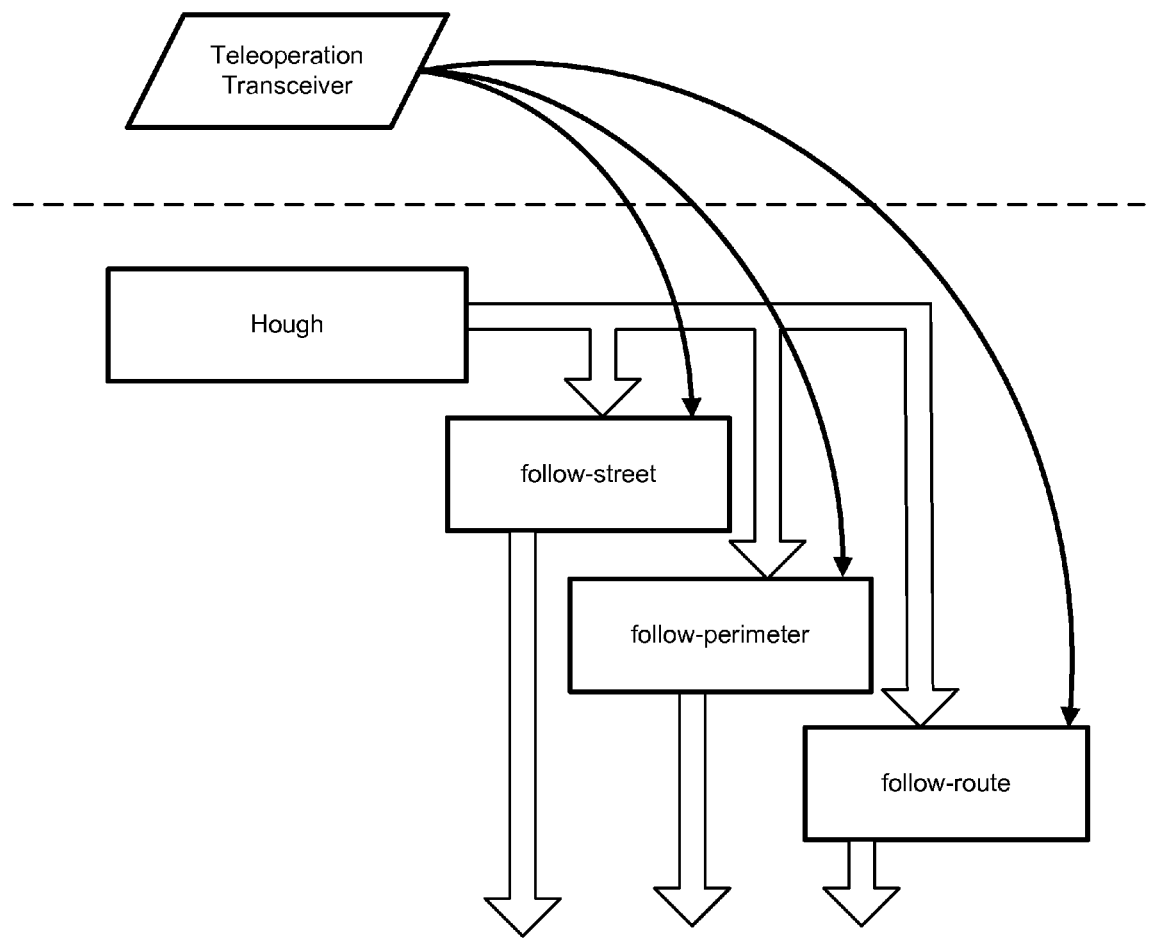
FIG. 12 is a software organization diagram illustrating information flow between a Hough transform software component and three reconnaissance operation software modules.

Further, FIG. 12 illustrates a detail of information flow between a Hough transform routine and the three mission routines (the follow-street, follow-perimeter and follow-waypoints routines). In addition the Hough transform information, the teleoperation transceiver may provide instructions to the mission routines, such as a distance leash to be used during a follow-street mission or a command to abort a mission, for example.

Figure 26:
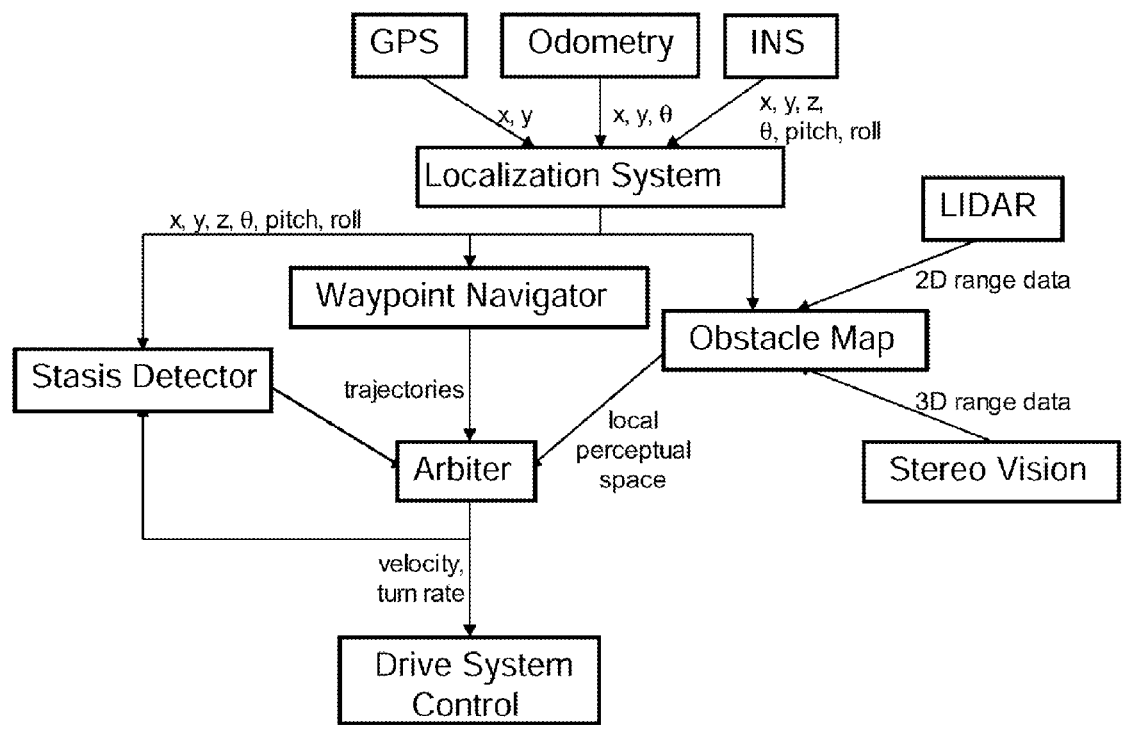
FIG. 26 is a software organization diagram illustrating an alternative software organization for the mobile robot, which includes an arbiter routine and a waypoint navigation routine.

FIG. 26 illustrates an alternative software organization for a mobile robot that navigates autonomously using waypoint navigation. The mobile robot control software includes a localization subsystem for reckoning the mobile robot's position in world coordinates based on positional data received from a GPS receiver, an odometry tracker, and an inertial navigation system. The localization information includes the robot's coordinates in the global X, Y, and Z planes, and may also specify the robot's attitude (θ) pitch and roll orientations relative to the ground plane.

This localization information is used made available to a waypoint navigator routine, an obstacle map routine, and a stasis detector routine. Each of these routines outputs to an arbiter routine, which processes the incoming data and outputs velocity and turn rate commands to the drive system control routine for causing the drive system to appropriate steer and propel the robot toward a navigation goal.

As discussed, the follow-waypoints routine uses the localization information to select a target trajectory for the mobile robot 10—for example, by comparing the robot's global coordinates to the coordinates of the next waypoint in the mission information provided to the robot prior to undertaking the waypoint navigation, and calculating the angle between the mobile robot's current heading and the next waypoint. In accordance with the software organization illustrated in FIG. 26, the target trajectory is then passed on to the arbiter routine, which converts the target trajectory information into velocity and turn rate commands suitable for the drive system control routine to control the drive system to move the mobile robot across the terrain toward the appropriate heading and with the appropriate speed.

The mapping routine receives input from the range finder 121 and the stereo vision system 125, and constructs a grid occupancy map based on this input. The occupancy grid map is supplied to the arbiter or SVFH obstacle detection routine, where it is used in combination with the target trajectory to adjust the actual steering and/or velocity commands issued to the drive system control routine.

As a result, when detectable obstacles are encountered along the path between the mobile robot and its navigation target, the arbiter or SVFH obstacle detection routine can deduce their presence and location from the occupancy grid map and alter the steering or velocity of the mobile robot so as to swerve around the obstacles. Further, the follow-waypoints routine need not receive the occupancy grid map nor take it into account, because the arbiter automatically processes the occupancy grid map and evades such obstacles when encountered, and resumes steering toward the target trajectory when no obstacles are imminent.

In accordance with one embodiment, the stasis detection behavior routine also receives the localization information regarding the mobile robot's global coordinates and can determine whether the robot is not proceeding appropriately. For example, the stasis detector may periodically compare the mobile robot's coordinates to a previous set of coordinates from a previous time and, if the two sets of coordinates are not sufficiently distant, the routine may then supply appropriate notice to the arbiter and appropriate stasis-escape or cul-de-sac avoidance actions may then be performed.

Hough Transform

Hough transform techniques may be employed to detect walls and road orientations for various navigation behaviors. The Hough transform is a computer vision technique that works by transforming image point coordinates into votes in the parameter space of possible lines. Each point corresponds to a vote for all of the lines that pass through that point. By finding the strongest points in the parameter space, the Hough Transform can determine the parameterized equations for the strongest lines in the image. This library of Hough transform software routines may be integrated with the local obstacle map constructed from the laser and stereo vision range data.

The Hough transform is able to reliably find linear features in the range image and determine their location and orientation. Using the Hough transform in both outdoor and indoor environments, a mobile robot employing the Hough transform may reliably detect exterior building walls, interior hallway walls, street curbs, and rows of parked cars, for example.

In accordance with at least one non-limiting example, the Hough transform processes range data from the LIDAR and calculates the strongest line orientations and offsets relative to the robot's current position. This system is highly accurate and reliable in determining the location and orientation of walls indoors and shows promising levels of accuracy and reliability outdoors.

Figure 28:
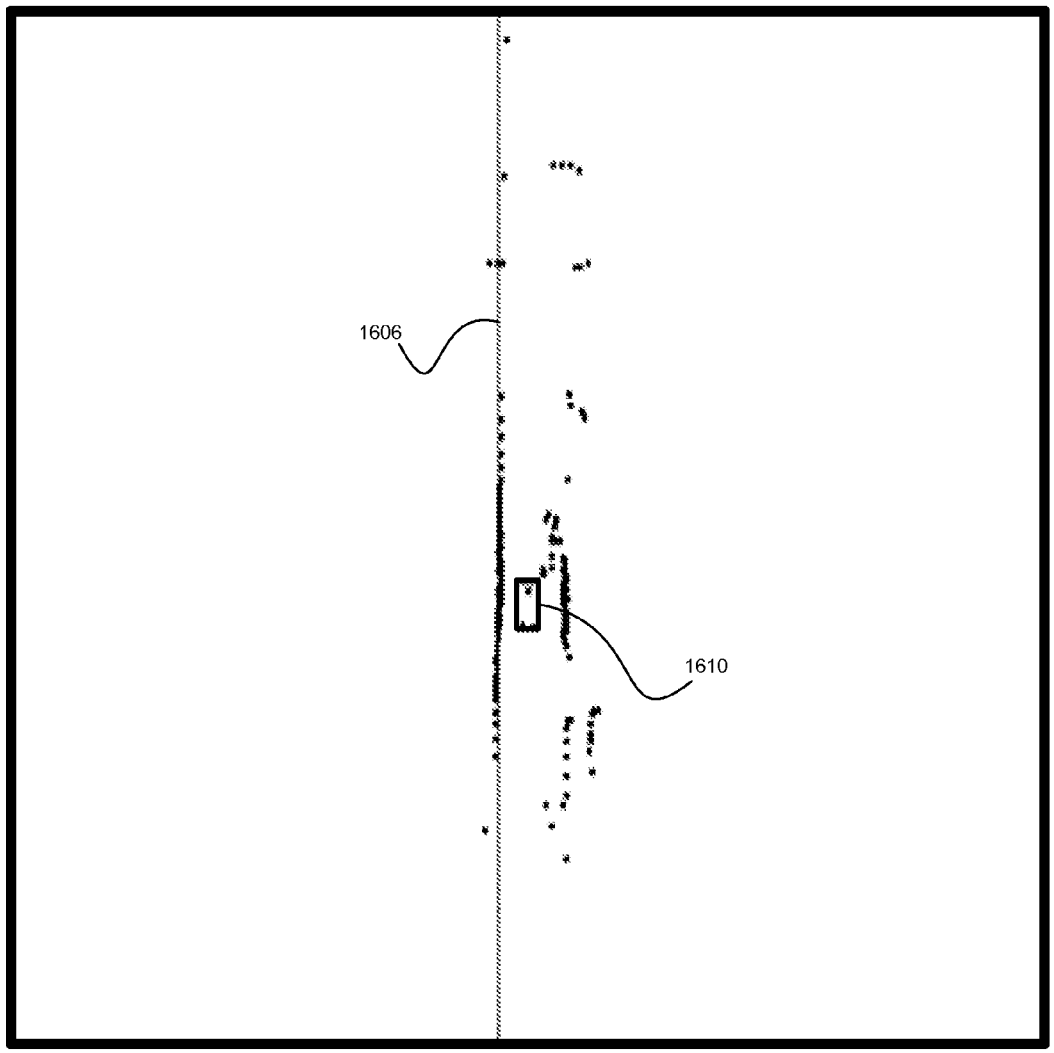
FIG. 28 is a an occupancy grid map corresponding to FIG. 27, further illustrating one strongest-line selected by the Hough transform process of the mobile robot.

For example, FIG. 27 shows multiple Hough line candidates for the mobile robot 10 when positioned in a hallway (in which the outline 1610 of the mobile robot 10 is positioned between the line clusters). As illustrated in FIG. 28, despite the presence of obstacles and an open doorway along the right wall, the Hough transform is able to detect the correct orientation of the right wall by selecting the strongest line 1606.

If, for example, the robot may become tilted so that it was not parallel to the ground, the laser plane would intersect the ground. In some cases, this may generate a "false positive" (spurious) potential line that could confuse the perimeter following behavior. To deal with this problem, a range filter may be deployed, which uses the sensor data from the mobile robot's pan/tilt sensor to project the laser points into 3D (see the organization diagram of FIG. 26, for example, illustrating the flow of pan/tilt data). Then, the points in 3D that are located below the robot (relative to the gravity vector) are removed from the laser scan before this scan is passed to the Hough transform. When the robot is tilted, the laser plane will intersect the ground at some point below the robot (assuming the robot is not directly adjacent to the ground), and so these points will have a negative z-coordinate value relative to the robot. In simple urban terrain, the mobile robot can just ignore these points. In more complex terrain, the mobile robot may be instructed to explicitly avoid these points.

This filter can work effectively to allow the robot to ignore spurious range readings that hit the ground because of the tilt of the robot, for example. This may enable the robot to successfully follow building walls without being distracted by the spurious ground hits. In addition, when the robot traverses over curbs, this can prevent the obstacle avoidance behavior from erroneously perceiving the ground as an obstacle and undesirably turning to avoid it, for example.

SVFH Obstacle Detection and Avoidance

To enable the mobile robot to avoid obstacles in cluttered environments, a range analysis technique known as Scaled Vector Field Histogram (SVFH) may be used. In the standard VFH technique, an occupancy grid is created in which each "/square" or "cell" of the grid is filled with a probability that an obstacle exists at that point, and a polar histogram of the obstacle locations is created, relative to the robot's current location. Individual occupancy cells are mapped to a corresponding wedge or "sector" of space in the polar histogram. Each sector corresponds to a histogram bin, and the value for each bin is equally to the sum of all the occupancy grid cell values within the sector.

The polar histogram bin values mapped to their bearings relative to the robot's heading. A bin value threshold is used to determine whether the bearing corresponding to a specific bin is open or blocked. If the bin value is under this threshold, the corresponding direction is considered clear. If the bin value meets or exceeds this threshold, the corresponding direction is considered blocked. Once the VFH has determined which headings are open and which are blocked, the robot then picks the heading closest to its desired heading toward its target/waypoint and moves in that direction.

A bin value threshold is used to determine whether the bearing corresponding to a specific bin is open or blocked. If the bin value is under this threshold, the corresponding direction is considered clear. If the bin value meets or exceeds this threshold, the corresponding direction is considered blocked.

Figure 15:
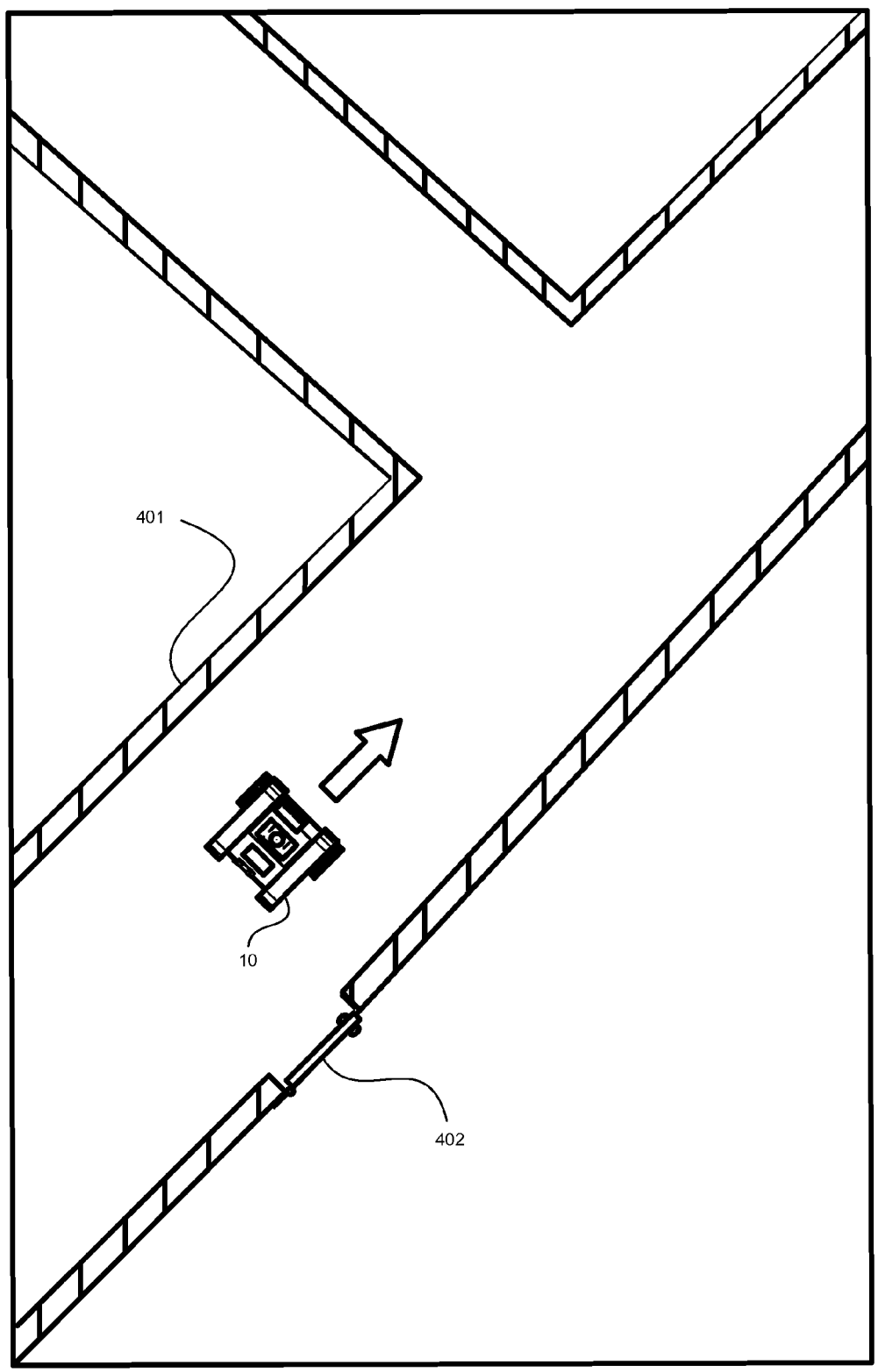
FIG. 15 is a plan view of a mobile robot navigating a corridor within a building, in which a door is closed on the right side wall.
Figure 16:
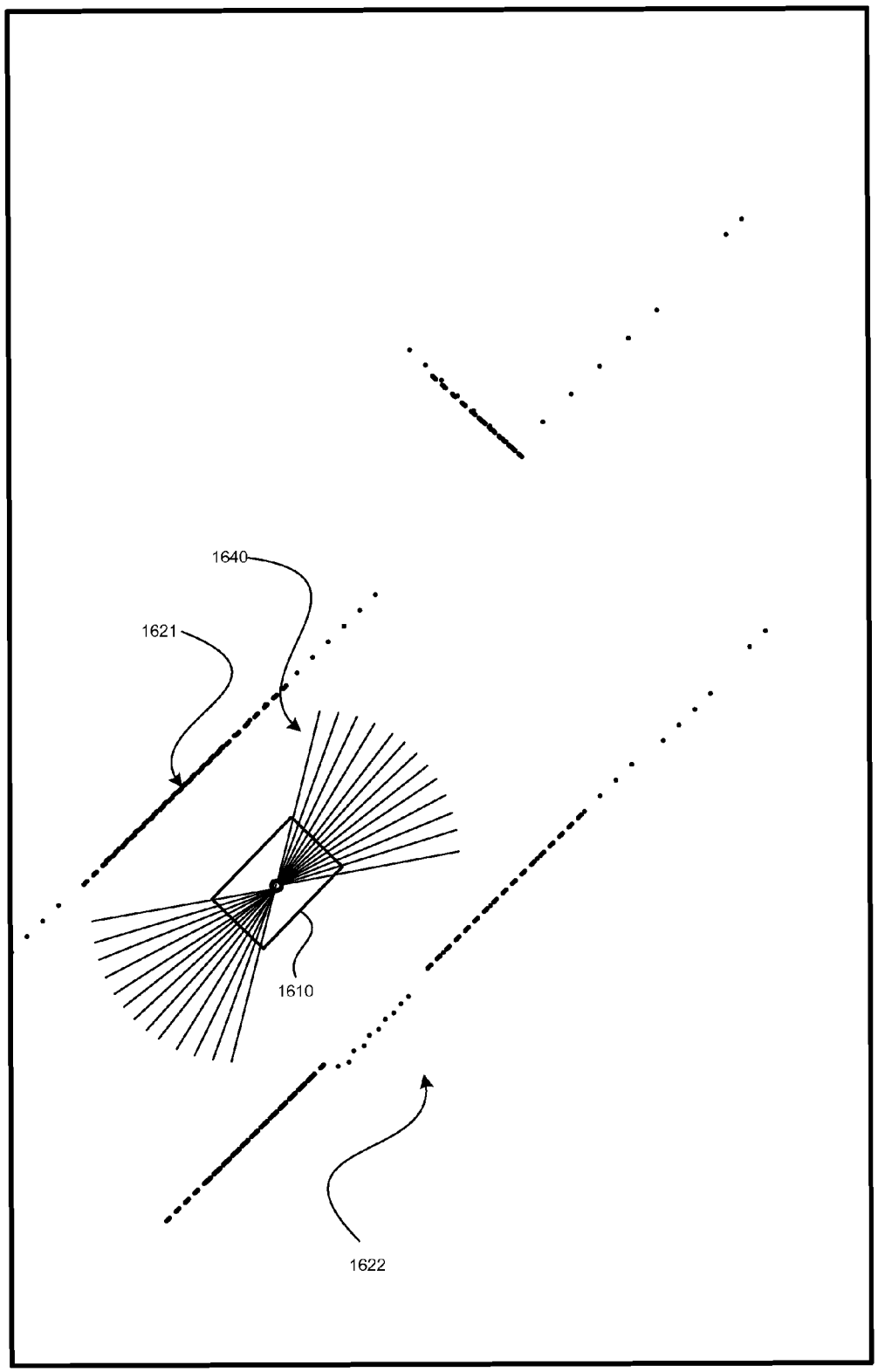
FIG. 16 is an example plan-view occupancy grid map generated by the mobile robot navigating the corridor as shown in FIG. 15, illustrating SVFH clear-path bins extending toward the obstacle-free paths available along the length of the corridor.
Figure 17:
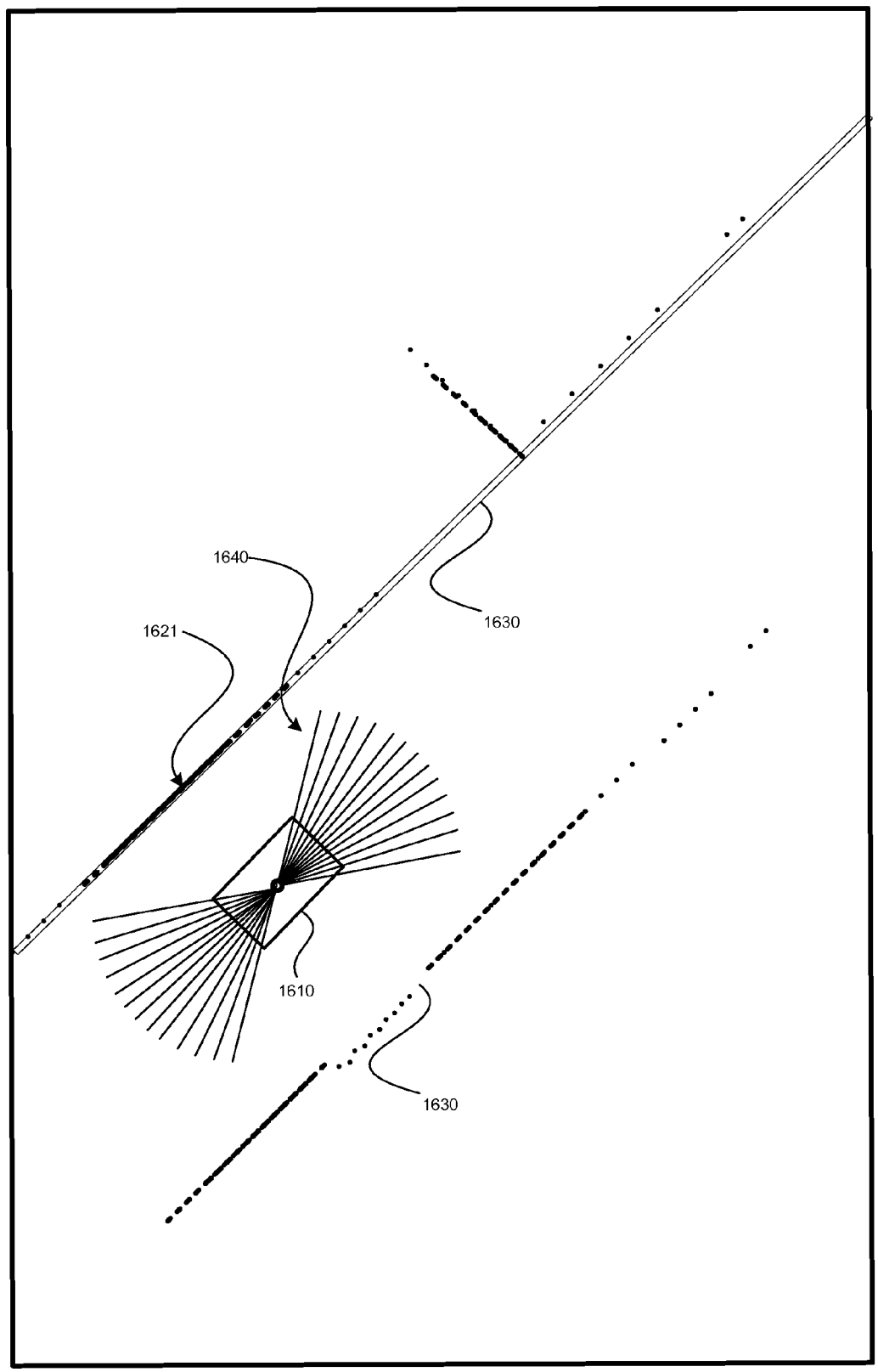
FIG. 17 is an example plan-view occupancy grid map as illustrated in FIG. 16, further showing a strongest-line identified by an SVFH routine on the mobile robot.
Figure 18:
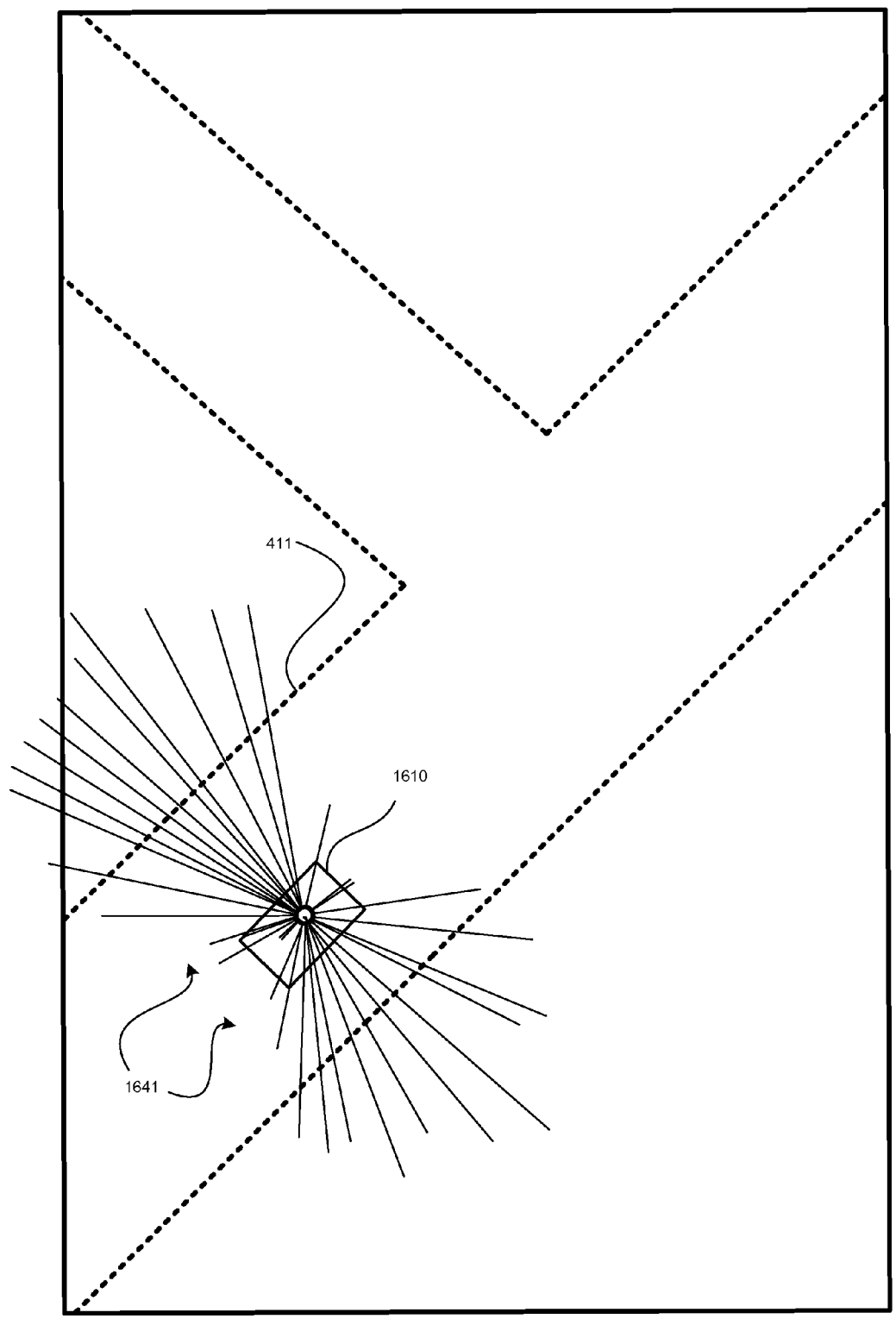
FIG. 18 is a plan view map of the mobile robot and corridor of FIG. 15, illustrating SVFH blocked-path lines extending toward the directions surrounding the mobile robot that are blocked by obstacles.

FIGS. 15 through 18 illustrate a mobile robot 10 navigating through a hallway, facing the direction indicated by the thick arrow in FIG. 15. Walls 401 and a closed door 402 on either side of the robot are detected by the range finder 121 and show up as a distinctive pattern of SVFH blocked-path bins 1641 extending toward the blocked directions (see FIG. 18), while the SVFH clear-path bins 1640 extend toward the obstacle-free path directions (see FIG. 16).

Once the VFH has determined which headings are open and which are blocked (see, for example, FIG. 18, in which the fan of bins extending out from the right and sides of the mobile robot outline 1610 indicate that these directions are not open, because of the presence of walls in those directions), the mobile robot 10 then picks the heading closest to its desired heading toward its target/waypoint and moves in that direction.

SVFH extends the VFH algorithm such that the occupancy values are spread across neighboring bins. That is, because an obstacle that may be easily avoided at long range may require more drastic avoidance maneuvers at short range, the bin values of the SVFH technique are updated to reflect this increased importance.

The extent of the spread is given by:

$$\theta = k/r,$$

where k is the spread factor (0.4 in the current SVFH), r is the range reading, and θ is the spread angle in radians. For example: if k=0.4 and r=1 meter, then the spread angle is 0.4 radians (23 degrees). So a range reading at 1 meter for a bearing of 45 degrees will increment the bins from 45−23=22 degrees to 45+23=68 degrees. For a range reading of 0.5 degrees, the spread angle would be 0.8 radians (46 degrees), so a range reading at 0.5 meters will increment the bins from 45−46=−1 degrees to 45+46=91 degrees. In this way, the SVFH causes the robot to turn more sharply to avoid nearby obstacles than to avoid more distant obstacles.

As a non-limiting example, the SVFH algorithm may be implemented on a mobile robot using 360-degree range data from the infrared laser range finder 121. The range finder preferably provides a 360-degree range scan with 2 degree resolution at 5 Hz, for example. The range values from each scan are used to compute a new SVFH. The range finder may provide range data out to, for example, 12 meters, but truncated range values (for example, out to 2 meters instead of the available 12 meters) may be used to compute the SVFH, in order to reduce complexity and computational requirements.

Figure 19:
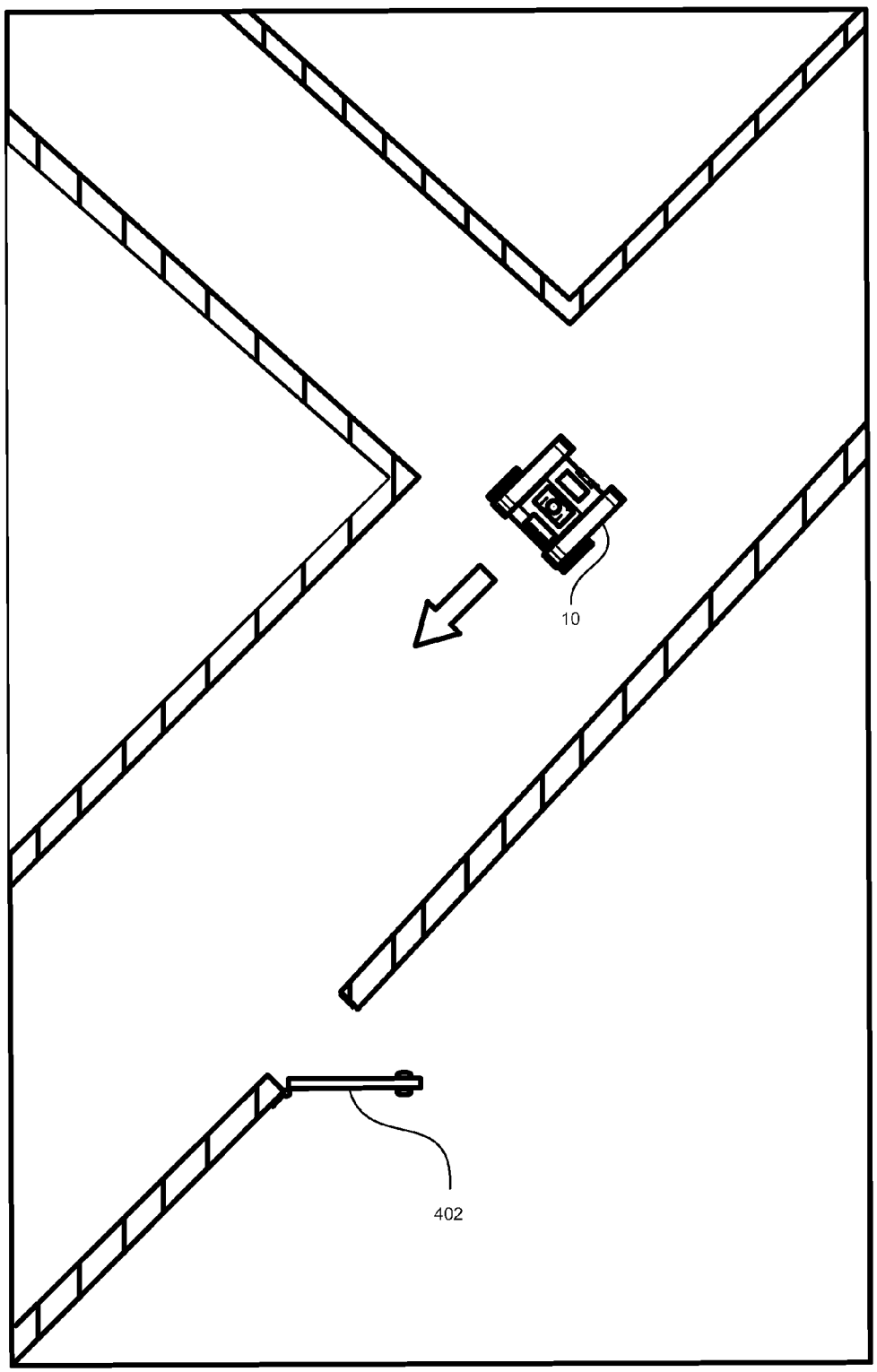
FIG. 19 is a plan view of a mobile robot navigating the corridor shown in FIG. 15, but with the opposite heading, and in which the door in the hallway is open.
Figure 20:
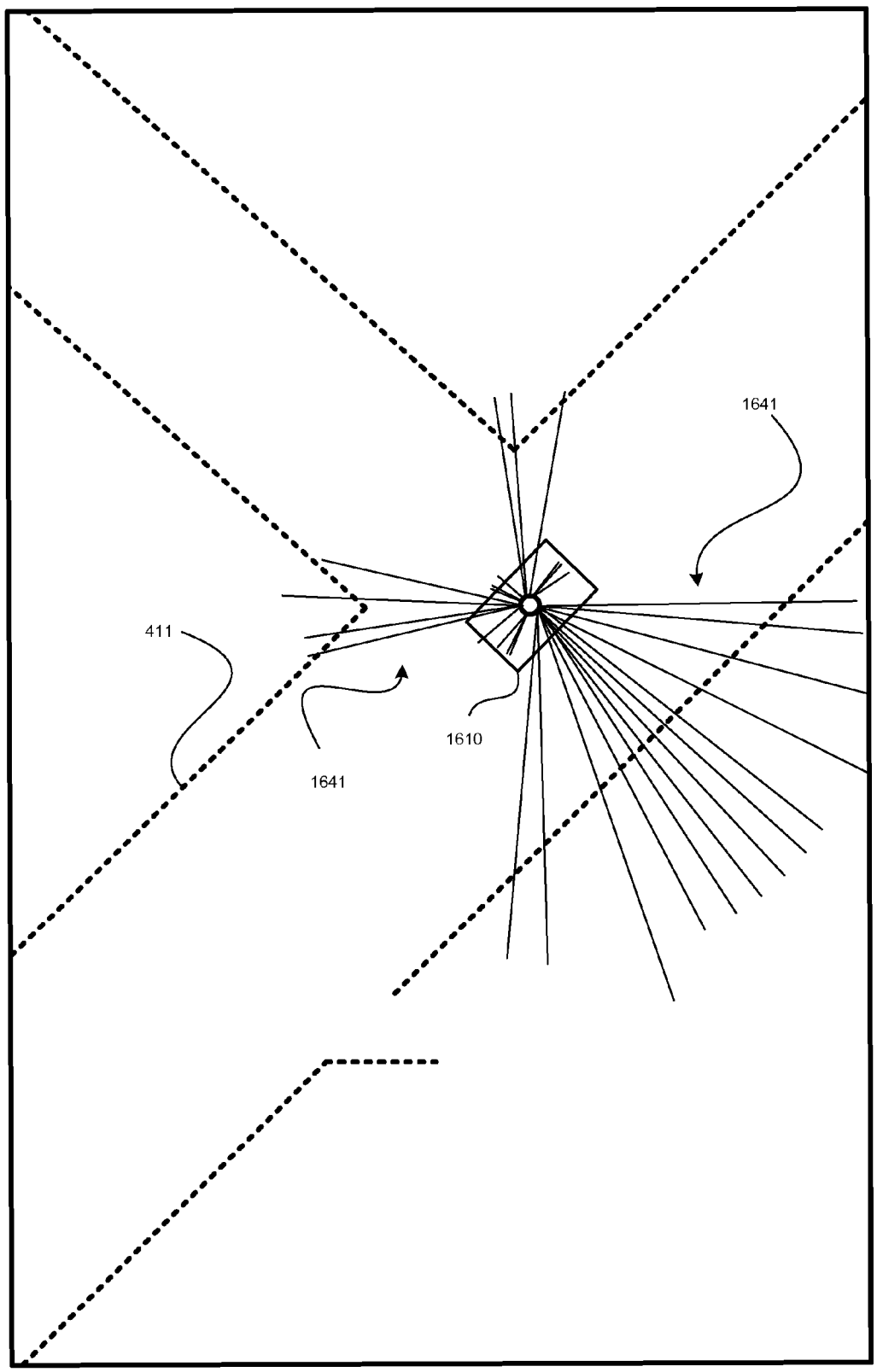
FIG. 20 is an example plan-view map corresponding to the scene illustrated in FIG. 19, and showing the SVFH blocked-path bins used by the mobile robot to identify walls or other obstacles that should be avoided.

FIG. 19 shows a mobile robot 10 positioned at an intersection of two hallways, and FIG. 20 shows example SVFH blocked-path bins when the robot arrives at the hallway intersection, as shown on a real-time teleoperation console 21. Vectors 1641 representing SVFH blocked-path bin values have lengths that are proportional to the value of the bin associated with the corresponding direction. Long vectors correspond to a large number of nearby range readings within the bin sector. Short vectors correspond to a small number of range readings near the limit of the range window (2 meters). If no vector is present in a given direction, this means that no obstacles are within the range window in that direction.

Figure 21:
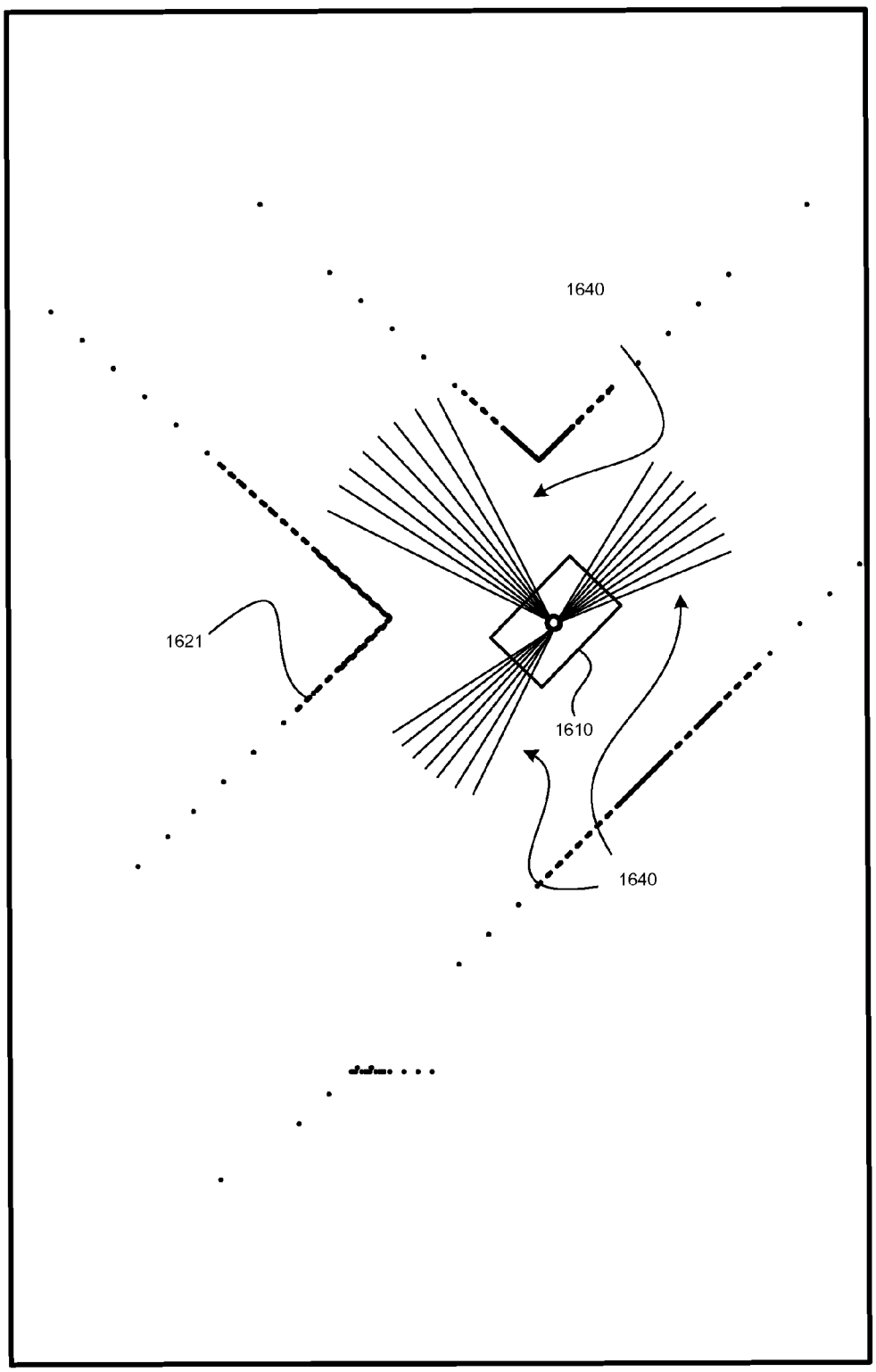
FIG. 21 is a an example plan-view occupancy grid map corresponding to the scene illustrated in FIG. 19, and showing the SVFH clear-path bins used by the mobile robot to determine a clear trajectory.
Figure 22:
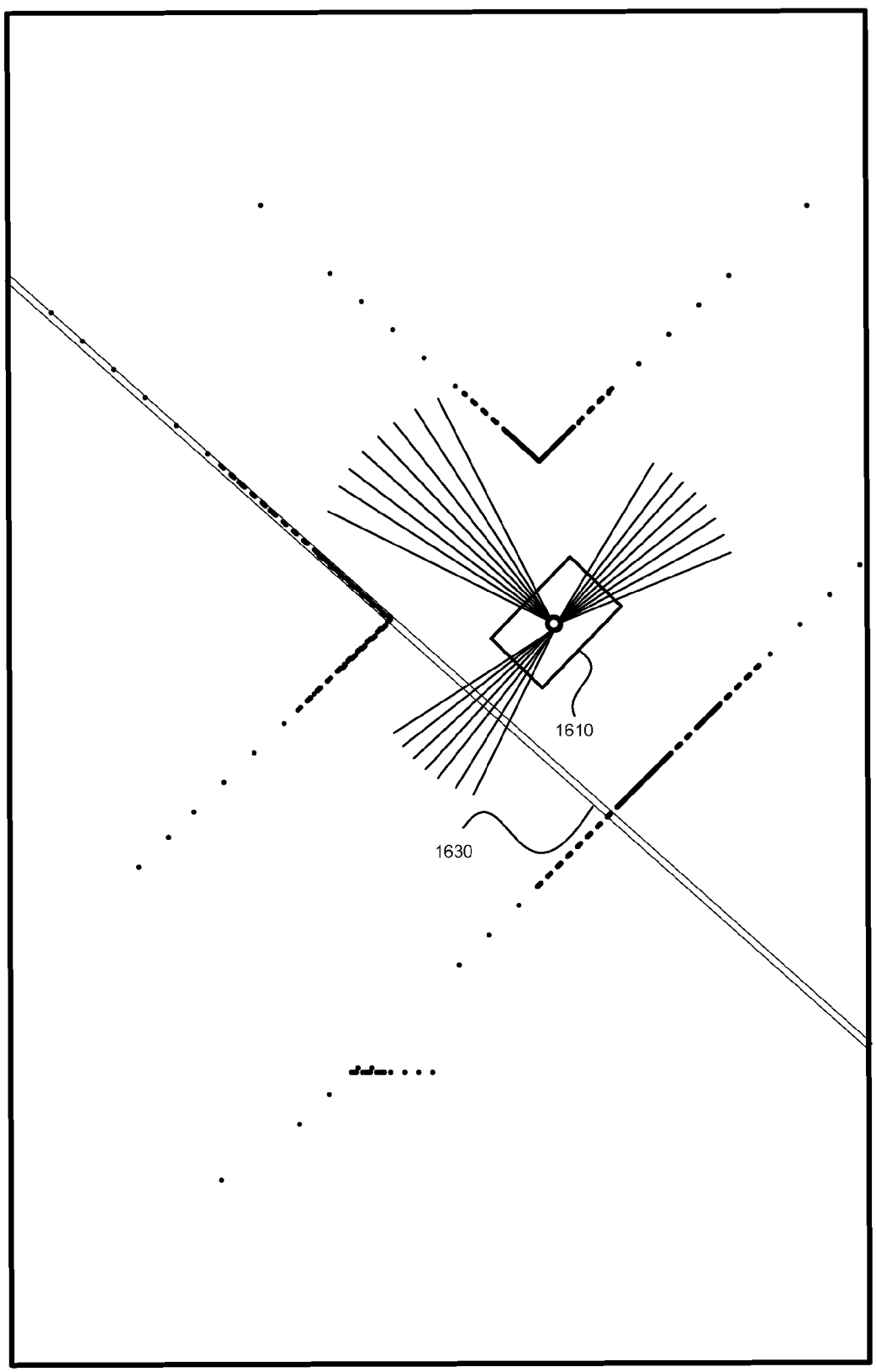
FIG. 22 is an example plan-view occupancy grid map as illustrated in FIG. 21, further showing a strongest-line identified by an SVFH routine on the mobile robot.
Figure 23:
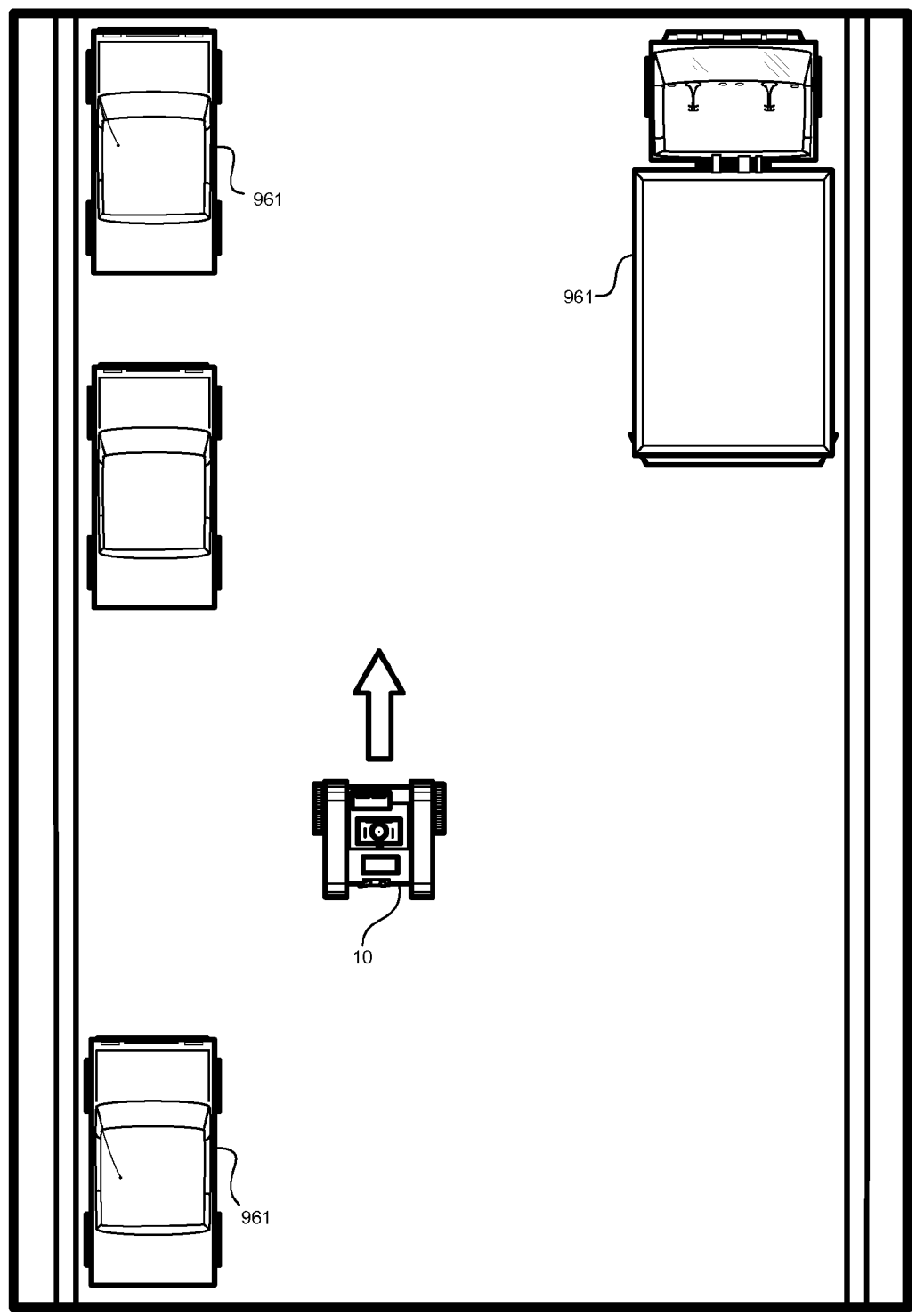
FIG. 23 is a plan view of a street, illustrating a mobile robot performing a follow-street operation in the presence of cars and trucks parked along the sides of the street.
Figure 24:
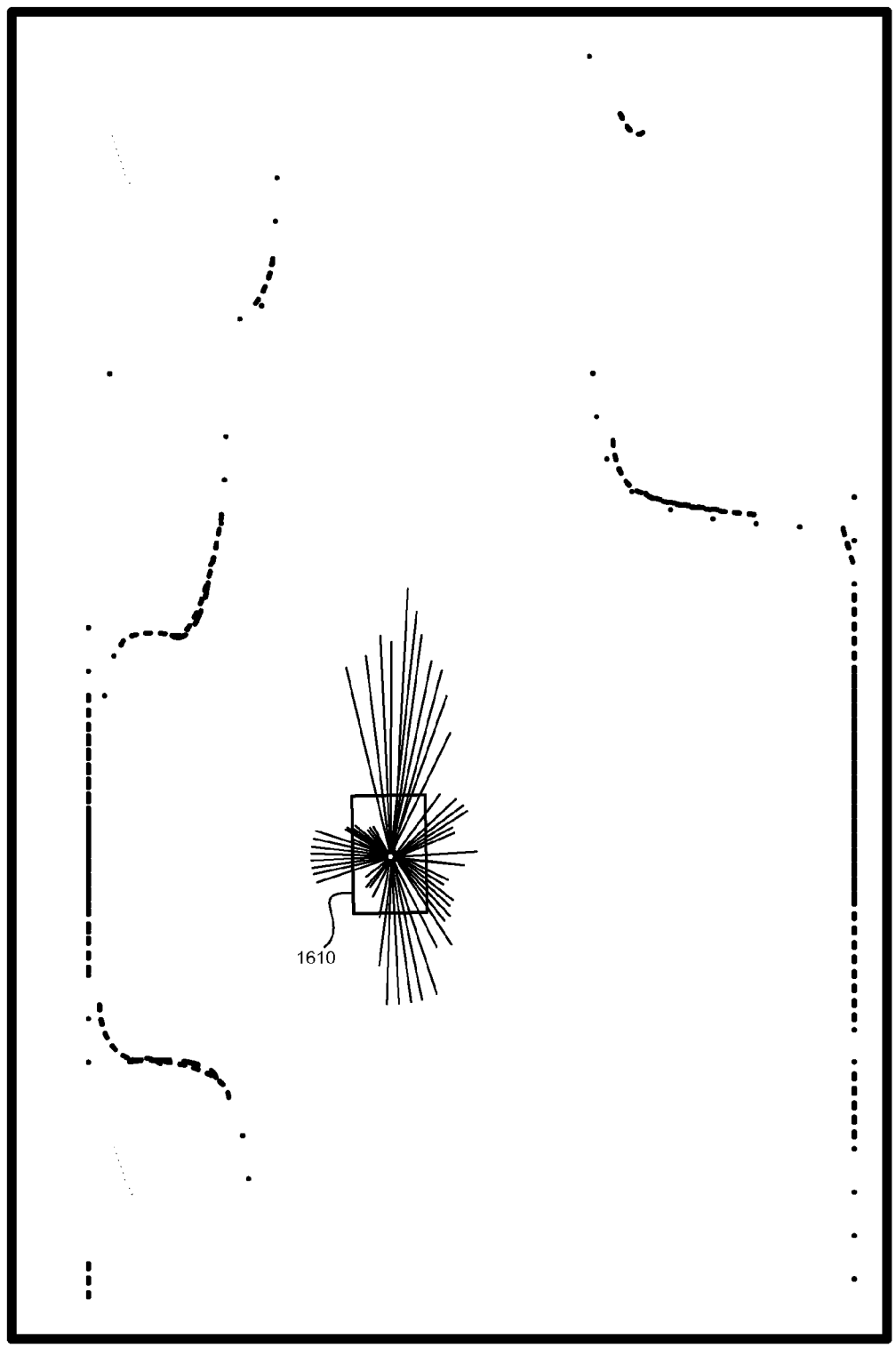
FIG. 24 is an occupancy grid map corresponding to the scene shown in FIG. 23, illustrating the SVFH clear-path bins identified by the mobile robot navigating the street.
Figure 25:
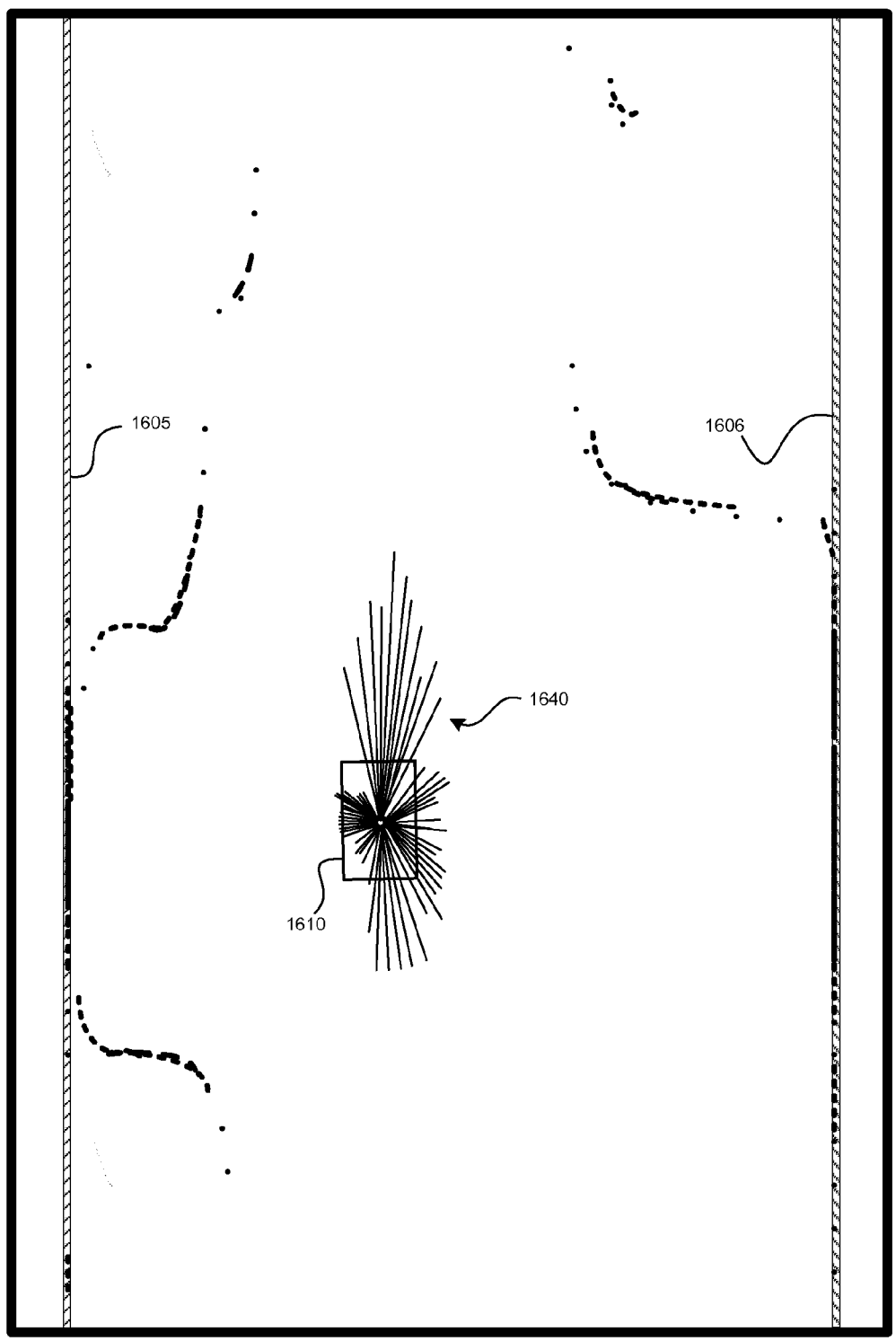
FIG. 25 is an example plan-view occupancy grid map as illustrated in FIG. 24, further showing a right and a left strongest-line identified by an SVFH routine on the mobile robot when performing the follow-street operation.

FIG. 21 shows the corresponding clear directions at the intersection. SVFH clear-path bin vectors 1640 point toward clear directions. If no long vector is present in a given direction, this means that this direction is blocked. The SVFH detects all four of the open passages meeting at the intersection. Wider passages allow a wider range of orientations for the robot, while narrower passages allow a more limited range of orientations.

Out-Door Obstacle Avoidance

In accordance with one non-limiting example, planar range data from a LIDAR range finder 121 is combined with 3D range data from the stereo vision system 125 (or other suitable range-detecting system, such as an optical, sonar, electrostatic or magnetic sensor, inter alia, as non-limiting examples) using the SVFH technique, implemented as a control software routine. Such a system can provide robust navigational control for a mobile robot both indoors and outdoors in a wide range of urban and natural settings.

The avoidance system detects a wide variety of potential obstacles, such as walls (indoor and outdoor), doors, furniture, cars, trucks, trees, bushes, rocks, stairs, metal railings, and chain-link fences. Both the LIDAR and the stereo vision system are positioned so they can detect obstacles that the mobile robot 10 is not able of climbing. Lower obstacles such as curbs, which the mobile robot can climb, are preferably excluded from the range of these obstacle sensors and are not included in the obstacle avoidance map. This allows the obstacle avoidance system to permit the mobile robot 10 to simply proceed over climbable obstacles, while avoiding unsurmountable obstacles at the same time. Moreover, computational and/or memory resources are also conserved because of the reduced amount of sensor information required to be processed, for example.

A sonar sensor may also be employed for detecting obstacles such as glass and/or narrow metal wires, for example, where such obstacles are not readily detected by other sensory devices. The combination of LIDAR, stereo vision, and sonar, for example, may provide the capability to detect virtually all of the obstacles a mobile robot 10 might encounter in an urban environment.

Automatic Flipper Deployment

In some cases, the mobile robot may encounter obstacles that are below the plane of the range finder 121, for example, but are difficult to detect using the vision system 125 (black asphalt curbs, for example). To assist the robot in climbing over such obstacles (such as the curb 966 shown in FIGS. 6A, 6B and 6C), an automatic flipper deployment behavior may be utilized. When the mobile robot 10 attempts to climb an obstacle, but its main treads 110 are unable to lift the mobile robot 10 over the obstacle, the motor currents will rise. The flipper deployment behavior monitors these currents, and when either the left or right drive motor current exceeds a threshold (for example, 15 amps), this behavior extends the flippers 115 forward to assist in surmounting the obstacle (see, for example, FIGS. 6A, 6B and 6C). The flippers remain deployed for a minimum period of time (as a non-limiting example, 10 to 15 seconds). When both drive motor currents drop below a second, lower threshold (2 amps, for example), the flippers are retracted back to their home position.

Cul-De-Sac/Stasis Detection and Avoidance

In some environments, the mobile robot 10 could occasionally become trapped in cul-de-sacs or other dead-end paths. The robot might, for example, follow a wall into a cul-de-sac, then turn around and start to emerge, but end up following the same wall back into the cul-de-sac again, for example.

To prevent this, a stasis detection and avoidance behavior may be provided. This behavior remembers the recent locations of the robot and prevents the robot from getting trapped in a loop. The behavior maintains a trace of the robot's recent positions and treats each point in this trace as an obstacle, which may then be passed to the SVFH obstacle avoidance system (which then regards the traced path as any other obstacle). The robot then can steer away from its recent path and move toward unexplored space, instead.

If the robot were navigating down a very long and narrow cul-de-sac, for example, memory of previous path points could prevent it from initially turning around. In that case, the robot can wait until the path-history memory has expired (when the path-history memory is implemented as a continuously rolling, finite-capacity memory in which previously recorded memories "fall off" the end of the memory after a period of time has passed and as newer memories are recorded, for example) and then obstacle avoidance behavior would lead it back out of the cul-de-sac. When the robot emerges, the cul-de-sac behavior would prevent it from going back into the cul-de-sac, for example.

Furthermore, when the mobile robot 10 operates very close to obstacles in cluttered environments, it could get stuck on a low obstacle adjacent to the rear treads 110, for example—which may occur, when the mobile robot 10 attempts to turn and then abuts an obstacle that was too low to be detected by the robot's LIDAR 121 and vision 125 system, but too high for the tracks 110 to simply slide over sideways during the robot's rotation, inter alia. This is an example of the general problem of behavioral stasis, which occurs when the robot is attempting an action, but is "stuck" and unable to move.

To increase the general robustness and capability of the system, a general stasis-escape behavior may be utilized. This behavior detects when the robot is stuck and then attempts random (or semi-random, or pre-programmed, for example) motions until the robot becomes unstuck.

In a non-limiting example, the stasis-escape behavior maintains a stasis level variable. This variable is increased whenever the behavior system is sending a translation or rotation command, but the robot's treads are not moving (as determined by odometry). Conversely, the stasis level is reduced whenever the robot is moving. When the stasis level exceeds a threshold, an escape action is triggered, for example. The escape action may command the robot to move at a random speed (for example, −0.25 to +0.25 m/sec) and a random rotation (for example, −1.0 to +1.0 radians/sec).

Alternatively, for example, the robot's commanded speed (or direction of rotation of the wheels, treads, or other drive system, such as to alternative between forward and reverse) and/or steering may be caused to alternate in a rythmic pattern, such as in a manner similar to "rocking" a quagmired automobile out of a snowy parking spot or mud pit (in which the driver rythmically alternates the automobile transmission from forward to reverse and back). In such a case, the robot may take advantage of self-reinforcing oscillation such that each successive cycle "rocks" the mobile robot further and further out of its stuck position. Sensors and/or analysis routines may be employed to detect whether a certain rhythm or motion pattern is producing self-reinforcing oscillation, for example, and may change the stasis avoidance behavior to another method when no progress is detected after a particular number of attempts.

If the mobile robot 10 starts moving, the stasis level begins to fall, and when it falls below threshold, the escape action is terminated, and control is returned to the robot's regular behaviors. If the robot does not start moving, then after a specified period of time (2 seconds), another random escape action is generated, and the new translation and rotation commands are sent to the robot. The stasis-escape behavior may repeat this process until the robot starts moving.

Obstacle Classification and Visualization using 3D Stereo Vision

Figure 30:
FIG. 30 is a 3D depth map provided by a 3D stereo vision system corresponding to the view shown in the upper left corner of FIG. 29.

In accordance with at least one non-limiting example, an obstacle classification system analyzes the set of 3D return points from the stereo vision sensor by converting the depth map information back into 3D point information. As illustrated in FIG. 30, for example, this information is then projected to a 2D grid where statistics are kept on all the points that "hit" each 2D grid cell. The algorithm keeps track of the minimum and maximum height of all points that hit a cell as well as a count of the number of points that hit a cell. This quantized processing allows for very efficient and low-latency handling of the 3D information which is suitable for OD/OA systems.

Once the statistics grid is computed to filter out spurious readings, false short depth-readings a set of heuristic rules are used to classify grid cells as obstacles based on the properties of the robot system. These are:

Grid-to-Grid Slope Threshold:
This threshold is applied to detect obstacles too steep for the robot to climb. Surfaces that appear to change at a slope>45 degrees are considered to be obstacles fro this system. This allows the strereo vision to report trees, walls and posts as obstacles, but to omit kerbs and gentle slopes from the obstacle map even if they are within range.

Grid Minimum Height Threshold:
This threshold is applied to detect "overhanging" obstacles that don't touch the ground. Thus, the system won't report a high truck body as an obstacle since it can pass under the truck, but the slope threshold will report the tires as obstacles to drive between.

The combination of these two heuristic classification approaches yield good 3D obstacle perception that is matched to the vehicle mobility characteristics. In accordance with at least one exemplary implementation, as a non-limiting example, the system including stereo processing, data transmission, obstacle classification and conversion to range data operates at 15 Hz with speed being limited by stereo processing throughput at the moment. This allows robot speeds of over 1 m/s with a fairly good safety margin, given the ~5 m detection range of the stereo obstacle system.

Conversion to Range Scan Data Using 3D Stereo Vision Input

In accordance with another non-limiting example, once the data have been classified as obstacles, these obstacles are then integrated into the SVFH map. The laser range data is used for obstacle avoidance and map building in the mobile robot's autonomous behavior modes. In addition, the laser data can provide augmented spatial awareness in tele-operated modes.

Conversion of 3d Stereo Vision Data to Range Scan Data

Figure 31:
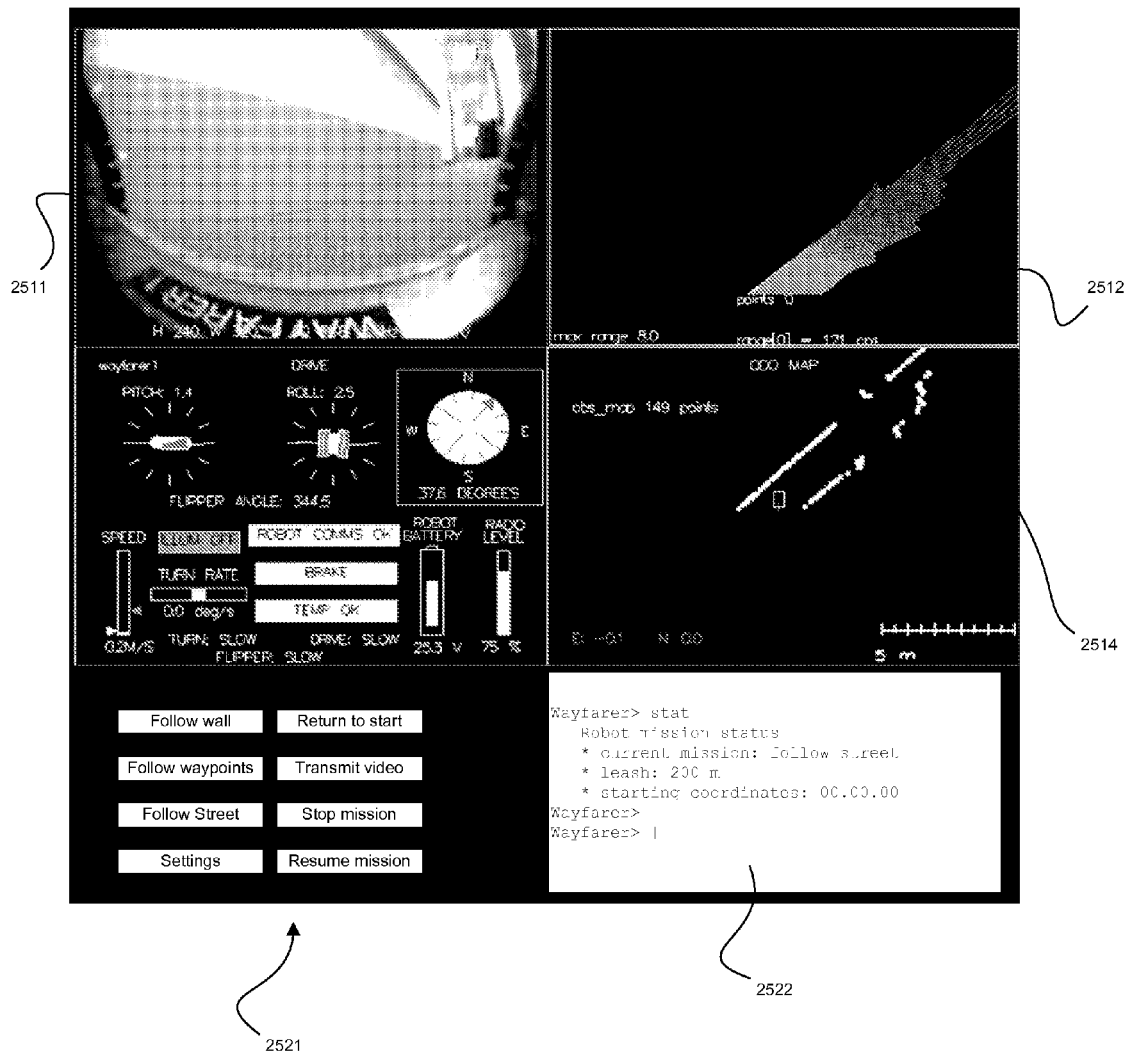
FIG. 31 is another example screen shot from a computer-based teleoperation console presenting a graphical user interface to the operator and displaying a video feed, LIDAR map, occupancy grid map, robot sensor readout, and command line interface.

Once the data have been classified as obstacles, these obstacles are then converted into the range/bearing scan format used by the obstacle avoidance software. The mobile robot's control software can build a temporary Local Perceptual Space (LPS) map based thereon that represents the region of space near to the mobile robot 10. This map preferably includes a quantized point cloud that represents all recent range readings in the mobile robot's local coordinate frame. FIG. 31 shows the mobile robot operator's control unit's (OCU's) real-time graphical display of the LPS map 2514.

The pattern of points on the LPS map 2514 represent recent range returns in the robot's current local coordinate frame. As the robot translates or rotates, previously detected points are transformed into the current reference frame. These points decay over time (on the order of seconds) as they are no longer detected. This means that moving obstacles can be dynamically represented in the map as their position changes in the world.

An advantage of this map over a purely reactive approach is that recently detected obstacles can be used in path planning, even if they are no longer visible. So if the robot moves past an obstacle or around a corner, what it saw previously can be used to plan its path.

Each robot navigation behavior (such as the follow-perimeter, follow-street or follow-waypoint behaviors, inter alia) may output a set of desired trajectories that fan out around the most desired path. For example: a behavior may want to move forward at 2 meters per second while turning right at 1 radian per second. The behavior then provides a set of adjacent trajectories at 2 m/sec and 0.6 rad/sec, 0.8 rad/sec, 1.0 rad/sec, 1.2 rad/sec, 1.4 rad/sec, et cetera.

The obstacle detection and avoidance behavior projects these trajectory arcs through the LPS and detects potential collisions. A robot motion model including information regarding the mobile robot's physical size and shape are used to determine the template that is swept through the LPS searching for obstacle collisions.

The trajectories are then scored based on time-to-collision (higher is better) and deviation from the optimal path (lower is better). The combined score is used to select the best turn command. In addition, the robot's speed may also be reduced to slow down for nearby obstacles.

Group Robot Control and Integration

Figure 41:
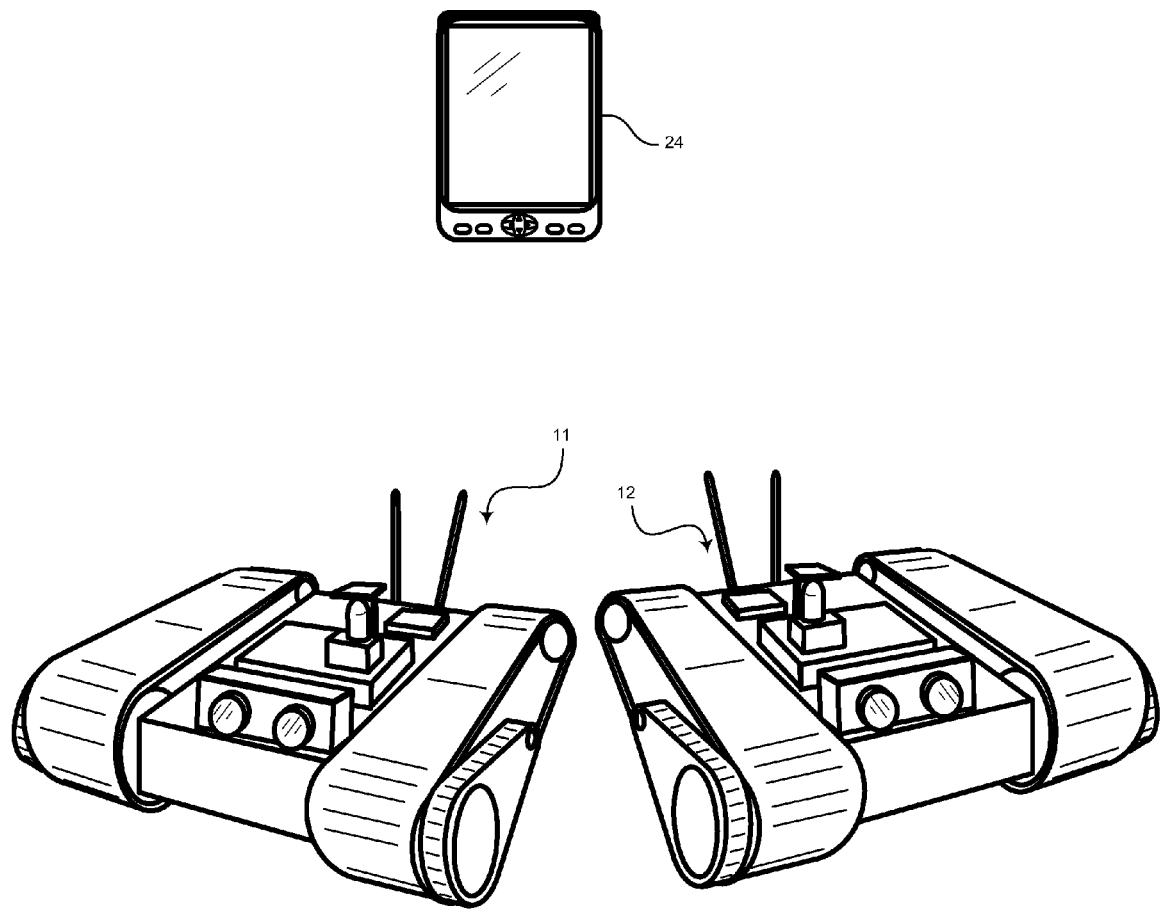
FIG. 41 is a diagram illustrating parts of a team robot control system.

In accordance with another embodiment, a team of two or more mobile robots 10 may be integrally controlled so as to perform joint operations. Furthermore, a tablet computer may be used to facilitate control of the team of mobile robots, by presenting map and location information for the robots comprising the team and accepting commands through a touch-sensitive screen. As shown in FIG. 41, for example, first and second mobile robots 11, 12 are controlled as a team through wireless interface with a tablet-type teleoperation console (also referred to herein as an operator control unit or OCU) 24. The Tablet PC is an excellent platform as an OCU as it allows the operator to be mobile even while controlling a team of robots, and provides a simple and intuitive interface.

The hardware and many of the software features of the team robots 11, 12 may be substantially similar to any of the embodiments of the mobile robot 10 discussed hereinabove, for example. Also, the team robots 11, 12 may include additional hardware or software features to facilitate team operation. For example, the team robot control system may include extended vector field histogram/scaled vector field histogram functionality, and may include additional behavior routines for performing "assemblage"-type group robot behaviors (for example, "formation" behaviors, a follow-the-leader behavior, a caravaning behavior, distributed landscape exploration behaviors, etc., inter alia). Using an appropriate software platform and software object model, such as the AWARE system, group sensors and behaviors may be abstracted as network services accessible to OCU client software, as a non-limiting example. The system may further include features such as visual landmark modeling or group tasking, for example.

Figure 46:
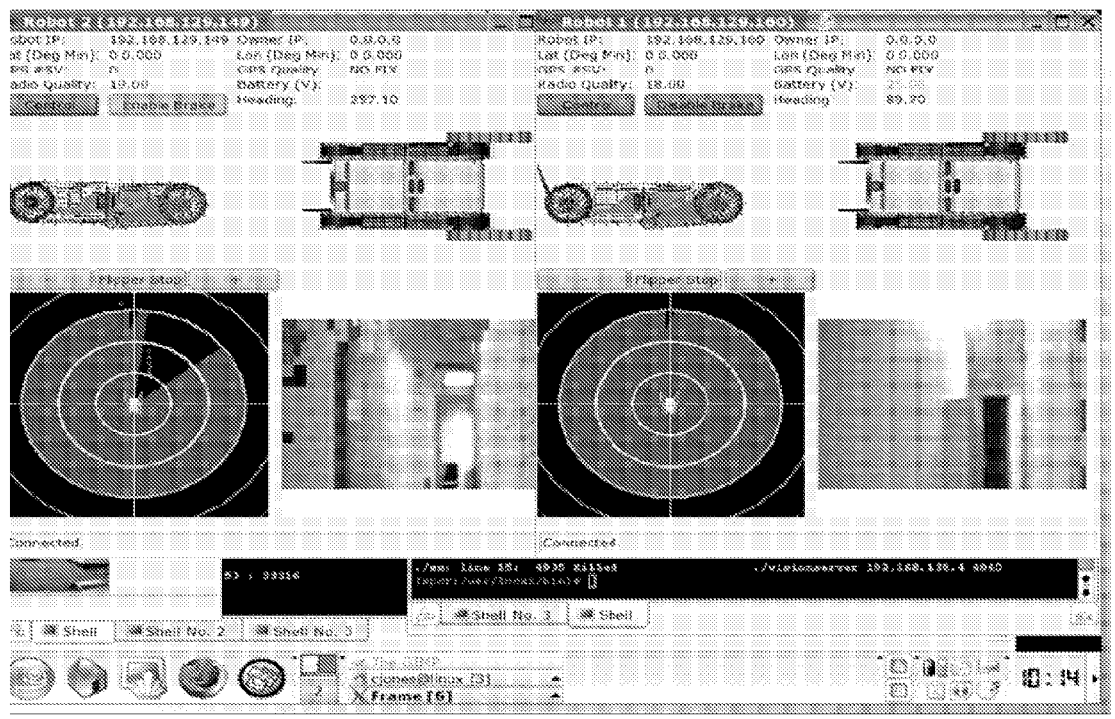
FIGS. 46 and 47 are example screen shots of an OCU in a team robot control system.
Figure 47:
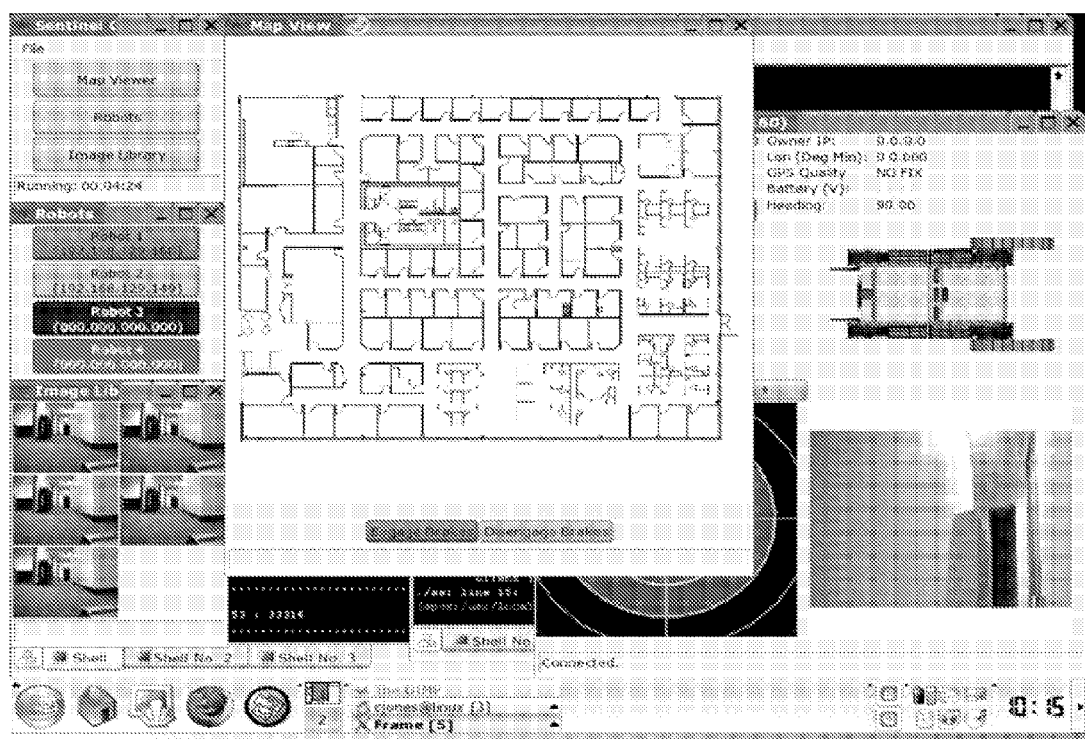

FIG. 46 shows an example of OCU screens for controlling team robots 11, 12, in which the windows on the left and right relate to robot 11 and 12, respectively. Also, FIG. 47 shows a further example of OCU control screen windows for the team robots 11, 12.

As an advantage, the team control software permits each mobile robot 10 in a team a high degree of local autonomy, offloading robot-specific details such as obstacle avoidance to the onboard obstacle avoidance behavior on each robot. Accordingly, the team control system need only send high-level navigational goals to the team robots 11, 12, and then each team robot 11, 12 will take care of any necessary path adjustments or obstacle avoidance issues on its own as it proceeds toward the high-level navigational goal.

Figure 44:
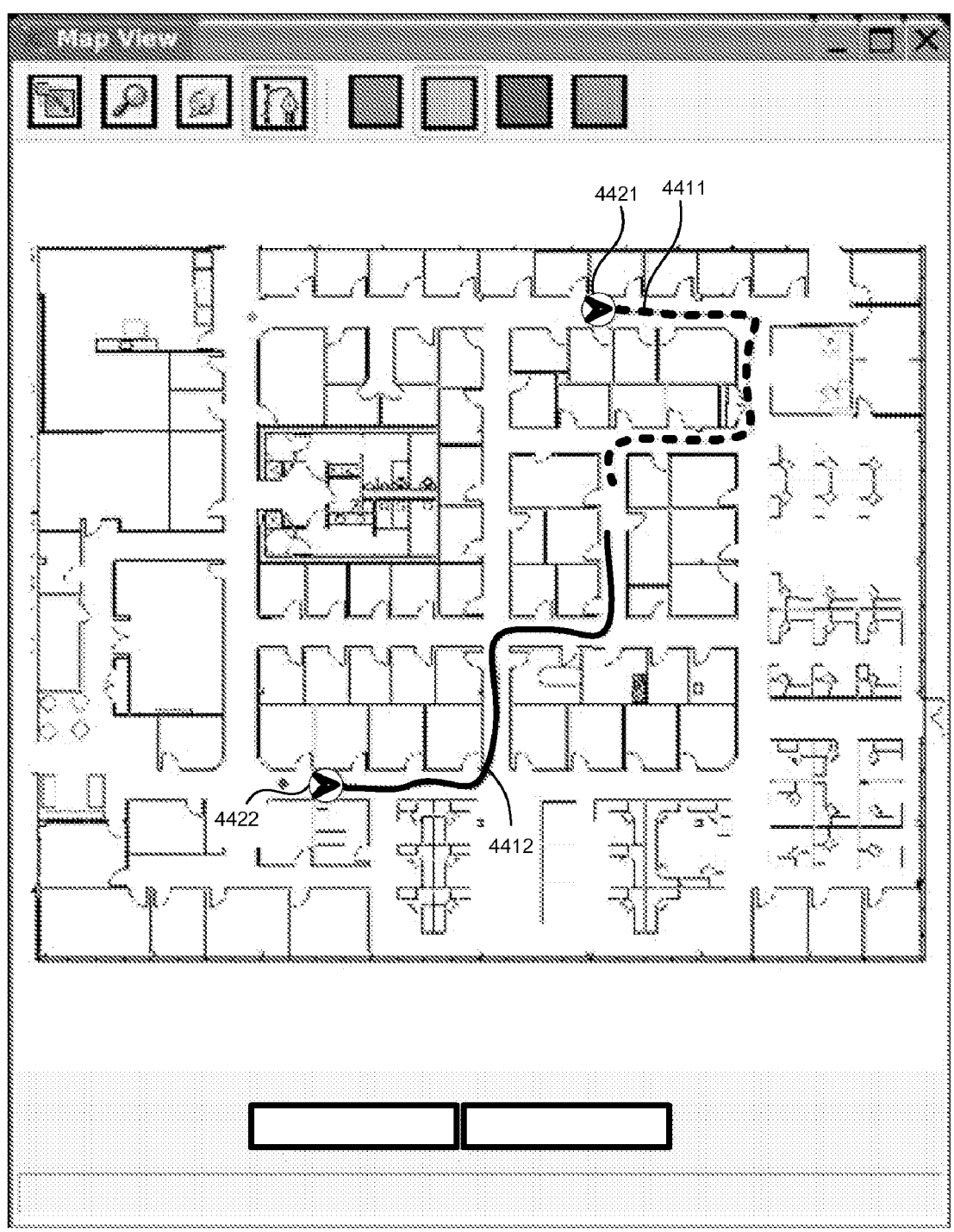
FIG. 44 is an example screen shot of an OCU showing path trails for two team robots in relation to a map.

During a team navigation operation, the OCU 24 may display a map of the vicinity of the team robots 11, 12, and superimposed representations of the robots' respective positions in the map. For example, FIG. 44 shows a screenshot from an OCU 24 controlling first and second team robots 11, 12, in which the dotted line 4411 indicates the path traversed by the first team robot 11 and the solid line 4412 shows the path traversed by the second team robot 12. Stylized arrows 4421, 4422 represent the location and orientation of the team robots 11, 12 on the map. Also, by selecting one of the robots by tapping it with a stylus, and then tapping the control buttons at the bottom of the screen, the operator can command the selected robot to engage or disengage its brakes, for example.

With these and other situational awareness representations, the operator can quickly gain an overview of the entire system with only a quick glance. If an anomaly is detected, the operator can then tunnel down into more detailed information, including full telemetry from each team robot 11, 12, to diagnose and respond to any issues.

The system may include an interface for designating waypoints for the team robots 11, 12. A complete path can be specified for each robot, by providing a number of waypoints. The interface may use a single mode of operation for simplicity, which preferably allows operation with only a stylus, for example. The interface is to click on a location the robot is either at or a waypoint the robot is already scheduled to reach and then drag to the location the robot should go to and release. Any path that was previously specified past the start waypoint/robot is erased. This interface allows for any path to be specified and modified using only the stylus. Additionally, a patrol loop can be specified by adding a path segment that ends on a previous waypoint. The robot interprets this as a designation of a loop that should be continually traversed until the robot is given other orders.

Another interface feature may be included which permits one team robot 11 to follow another team robot 12. This feature requires that both team robots 11, 12 know their current accurate position. Linking robots in this way sets up a goal for the following robot to get near the leading robot. Robots linked in this way form a leader-follower structure. Robots can be chained together in this method into a single file line, for example.

Figure 42:
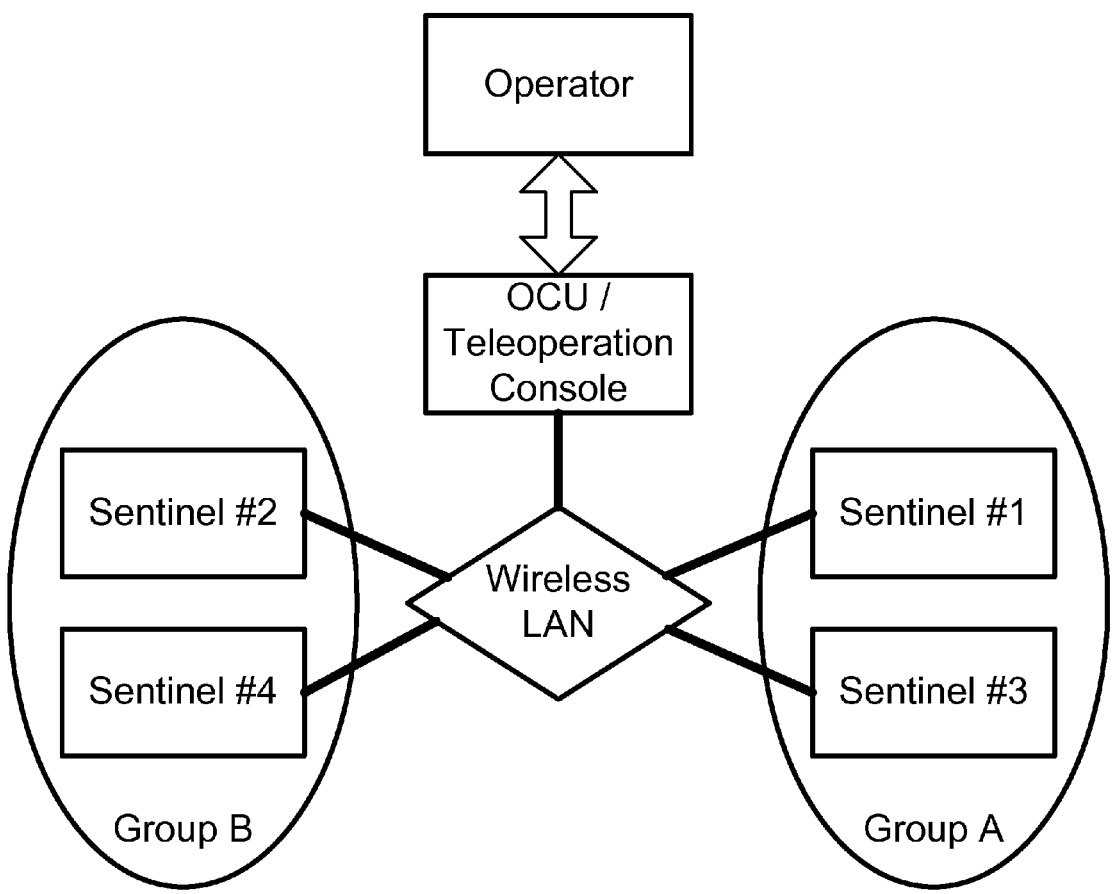
FIG. 42 is a block diagram of a team robot control system communication scheme.

FIG. 42 illustrates the communication organization between the constituent elements of the robot team control system, in which the operator interacts with the OCU, and the OCU communicates wirelessly with groups of team robots through a wireless LAN.

Figure 43:
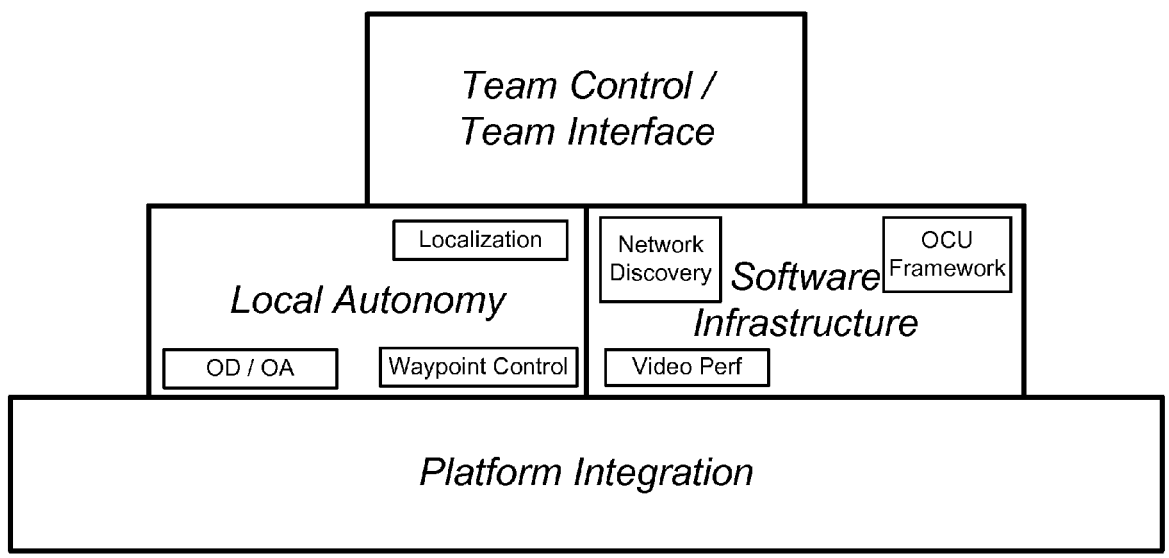
FIG. 43 is a block diagram of conceptual building blocks of the team robot control system.

FIG. 43 illustrates the building blocks of system organization used in the team robot control system.

Local Perceptual Space (Local Obstacle Memory)

A key part of the OD/OA system is the local perceptual space (LPS) which stores a representation of obstacles in the immediate vicinity of the robot. The local perceptual space is stored as an occupancy grid. The grid covers a 4 m×4 m area with 0.12 m×0.12 m cells. Each grid cell stores a simple exponentially weighted sum of evidence for/against an obstacle in that grid cell. The data in the grid cells decays exponentially (which leads to an efficient implementation) with a half life of 0.4 seconds.

In accordance with one embodiment, the grid is centered on the robot in an efficient manner. The grid is generally oriented in the same direction which is aligned with odometric coordinates (a coordinate frame updated solely based on odometry). The robot's current position and orientation in odometric coordinates is also stored. Each grid cell covers a range of odometric coordinates. The exact coordinates covered are not fixed, however, but can change occasionally as the robot moves. The grid acts like a window into the world in the vicinity of the robot. Everything beyond the grid edges is treated as unknown. As the robot moves, the area covered by the grid also moves. The position of the robot has an associated grid cell that the robot is currently inside. This cell acts as the center of the LPS. The grid is wrapped around in both x and y directions (giving the grid a toroidal topology) to provide a space of grid cells that moves with the robot (whenever the robot crosses a cell boundary) and stays centered on the robot. Cells directly opposite from the position of the robot in this grid are ambiguous as to which direction from the robot they represent. These cells are actively cleared to erase old information and are dormant until they are no longer directly opposite from the robot. This structure provides for a fast, efficient, and constant memory space LPS.

To use the LPS in behaviors, a virtual range scan is computed to the nearest obstacles. This virtual range scan represents what a range scanner would return based on the contents of the LPS. Converting to this form allows the same behaviors that were developed with SICK LIDAR data to also be used with data that originates from a SwissRanger which has a significantly smaller field of view.

Heading and speed control to achieve the desired location in odometry coordinates are calculated at the same time. First, for every direction the robot could go (maximum of •45 degrees away from goal), the maximum safe speed in that direction is calculated. Maximum safe speed is calculated proportional to distance to closest obstacle in that direction that the robot would hit with an upper and lower bound. The heading which results in the fastest speed in the direction of the goal is chosen, i.e., the effective speed is based off of the actual speed when projected onto the goal direction.

Localization/Mapping for Team Robot Control

For controlling multiple team robots 11, 12, it is important that the operator can communicate his intentions to the robots as easily as possible. For this communication to be effective, it is important that the operator and the robots share a common reference frame to which commands and instructions can be related. The most common reference frame is the physical world. Humans naturally build an internal map with a notion of places and the ways in which they are connected. Robots do not automatically have this ability, but they can be programmed to have this ability. The process of determining the position of a robot within a map is known as localization. When location and mapping are done at the same time, the process is known as Simultaneous Localization and Mapping (SLAM).

By having a shared notion of a map of the geography of the environment, it makes it easy for the operator to communicate intent in a language that the team robots 11, 12 can understand. For example, by having a map that is shared between operator and team robots, the operator can direct a robot to go to a particular location simply by clicking where on the map the robot should go. Having a shared map also makes it easy to express desires such as explore this area, patrol this area, follow this path, and take pictures from these locations just to name a few possible tasks.

To enable this kind of natural communication and shared understanding, we localization capability is provided for the team robots 11, 12. The algorithm used for localization may be, for example, Monte Carlo Localization. The algorithm works by maintaining a probability distribution over robot positions. At any point in time, the robot has a notion of the probability of being at a particular location and orientation. For computational efficiency reasons, the probability distribution is represented as a set of discrete guesses of possible locations that the robot might be in. These guesses are commonly called particles or samples. Each particle represents a single, exact position that the robot might be at. For example, a particle might represent the hypothesis that the robot is at exactly at (23.452, 10.024) with an angle of −45.32 degrees relative to the origin.

As the robot moves, the particles are moved in the same fashion. So if the robot moves forward 1 meter, each particle moves forward approximately 1 meter with some error introduced to represent error in the robot's motion. As sensor readings become available, each particle is evaluated to determine how likely it is that the robot would have seen those sensor readings from the position at which the particle is located. This evaluation requires that the robot have a map of its environment. The particles are then weighted based on these likelihoods. Based on these weights, some particles are duplicated and others are removed to produce a new set of samples with uniform weights. Particles with higher weights are more likely to be duplicated and particles with lower weights are more likely to be dropped. All of these updates are done based on a probabilistic foundation which provides proof that the algorithm behaves properly under a set of assumptions, although not all of these assumptions are met in practice. In practice, the algorithm performs well in real world settings and has been extensively used and studied over the last 6 years.

Figure 45A:
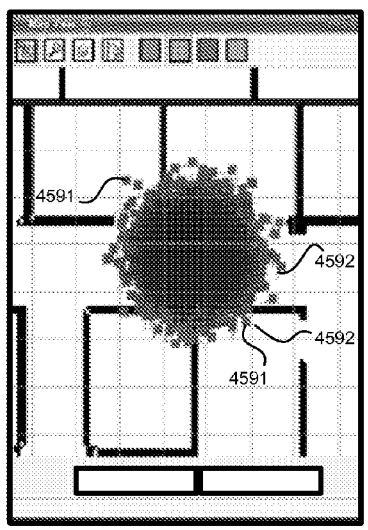
FIGS. 45A, 45B and 45C are example screen shots of an OCU showing a progression of improving localization/position estimates for a mobile robot as sensor input improves.
Figure 45B:
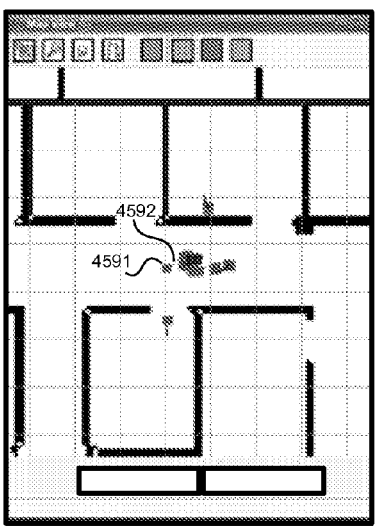
Figure 45C:
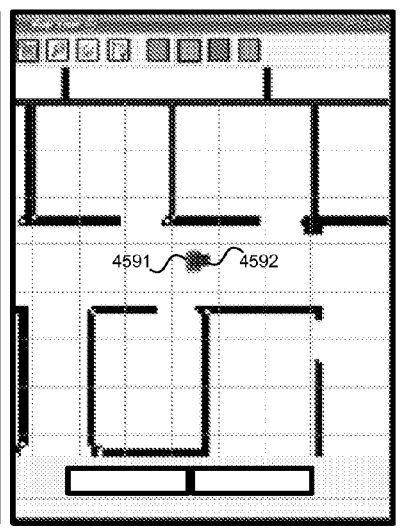

A pictorial representation of the workings of the algorithm is shown in FIGS. 45A. 45B and 45C. In FIG. 45A, the robot's position is initialized to an unknown position near an office. Each small square particle 4591 shows one possible location of the robot (the location of a particle). The thin orientation lines 4592 extending from the center of each square shows the orientation of the particle. Toward the edge of the circular region you can see the individual particles 4591. In the center figure, the robot has received more information, primarily about a wall to the robot's left. At this point, you can see that the robot has been able to eliminate many positions as possibilities, but multiple distinct possibilities remain. In the figure on the right, the robot has obtained additional information and has converged to the correct position of the robot, with the particles 4591 and orientation lines 4592 all substantially in alignment.

CONCLUSION

Although the above-noted discussion describes components and functions implemented in the embodiments with reference to particular standards and protocols, the invention is not limited to such standards and protocols. The terms "standard" or "protocol" are not limited in meaning to public or publicly promulgated concepts, and are inclusive of proprietary and private systems or rules. Standards for Internet and other packet switched network transmission, for public telephone networks, for wireless communication, for buses and interfaces, or for cellular telephone networks represent examples of the state of the art. Such standards are periodically superseded by faster, more capable, or more efficient equivalents having essentially the same functions.

In most cases such standards coexist with similar competing and complementary standards and variations of each. Accordingly, competing and complementary standards (as well as variations of explicitly discussed standards and variations of competitor and complementary standards) having the same role in a network are considered to fall within the literal claim language, or alternatively as equivalents of the literal claim language. Superseding standards, files types, protocols, directory structures, language variations, and/or new generations of each, are also considered to fall within the literal claim language, or alternatively to be equivalents of the literal claim language.

It should be noted that not all of the functions and features described in detail herein are necessary for a complete and functional expression of the invention. For example, the mobile robot can be used without a teleoperation console; the teleoperation console can likewise be operated without a robot; a different mobility platform provided for the robot, or for any permutation or combination thereof. No one (or more) described element or feature is implicitly, explicitly, or inherently critical or necessary to the operation of the invention, except as explicitly described herein.

What is claimed is:

1. A mobile robot for autonomously performing reconnaissance, comprising:
    a drive system configured to propel the mobile robot across terrain;
    a range sensor configured to detect a distance between the mobile robot and one or more objects in an environment of the mobile robot;
    a position reckoner including one or more of the group consisting of a global positioning satellite receiver, an odometer, or an inertial navigation system;
    a processor communicatively connected to the range sensor, to the position reckoner, and to the drive system, and configured to execute software instructions; and
    a memory store communicatively connected to the processor, the memory store having stored thereon a plurality of software instructions configured to be executed by the processor, the software instructions including:
    a mapping routine configured to maintain an occupancy grid map of the environment of the mobile robot,
    a linear feature routine configured to detect one or more linear patterns in the occupancy grid map and to determine a strongest line among the one or more linear patterns,
    a navigational routine configured to control the drive system to move the mobile robot in a direction aligned with the strongest line among the one or more linear patterns, and
    a localization routine configured to update the occupancy grid map using a scaled vector field histogram based on input from the range sensor and the position reckoner integrated using a Kalman filter with a motion model corresponding to the mobile robot.

2. The mobile robot reconnaissance system according to claim 1, wherein the software instructions stored by the memory store further include a perimeter-following routine corresponding to a perimeter-following mission,
    wherein the perimeter-following routine, when executed by the processor, is configured to cause the mobile robot to circumnavigate a reconnaissance target identified using a Hough transform, to record the occupancy grid map when circumnavigating the reconnaissance target, and to transmit the recorded occupancy grid map to the teleoperation console in the teleoperation mode.

3. The mobile robot reconnaissance system according to claim 1, wherein the software instructions stored in the memory store further include a street-following routine corresponding to a street-following robot mission,
    wherein the street-following routine, when executed by the processor, is configured to cause the mobile robot to navigate to a first location selected by the operator in the teleoperation mode, to identify a street using a scaled vector field histogram in the autonomous mode, to traverse the identified street to a specified distance from the initial location in the autonomous mode, to record the occupancy grid map when traversing the identified street in the autonomous mode, to return to the first location in the autonomous mode, and to transmit the recorded occupancy grid map to the teleoperation console in the teleoperation mode.

4. The mobile robot reconnaissance system according to claim 1, wherein the mobile robot further includes an operator interface disposed on the mobile robot and configured to be operated by the operator,
    wherein the mobile robot is further configured to perform at least one of the robot missions in the autonomous mode starting from an initial location of the mobile robot when the operator interface is operated.

5. A mobile robot for autonomously performing reconnaissance, comprising:
    a drive system configured to propel the mobile robot across terrain;
    a range sensor configured to detect a distance between the mobile robot and one or more objects in an environment of the mobile robot;
    a processor communicatively connected to the range sensor and to the drive system, and configured to execute software instructions; and
    a memory store communicatively connected to the processor, the memory store having stored thereon a plurality of software instructions configured to be executed by the processor, the software instructions including:
    a mapping routine configured to maintain an occupancy grid map of the environment of the mobile robot,
    a linear feature routine configured to detect one or more linear patterns in the occupancy grid map and to determine a strongest line among the one or more linear patterns, and
    a navigational routine configured to control the drive system to move the mobile robot in a direction aligned with the strongest line among the one or more linear patterns, wherein a location of the mobile robot when the mapping routine begins maintaining the occupancy grid map is designated as an initial location, and wherein the navigational routine prevents the drive system from moving the mobile robot farther than 250 meters from the initial location.

6. The mobile robot reconnaissance system according to claim 5, wherein the software instructions stored by the memory store further include a perimeter-following routine corresponding to a perimeter-following mission, wherein the perimeter-following routine, when executed by the processor, is configured to cause the mobile robot to circumnavigate a reconnaissance target identified using a Hough transform, to record the occupancy grid map when circumnavigating the reconnaissance target, and to transmit the recorded occupancy grid map to the teleoperation console in the teleoperation mode.

7. The mobile robot reconnaissance system according to claim 5, wherein the software instructions stored in the memory store further include a street-following routine corresponding to a street-following robot mission, wherein the street-following routine, when executed by the processor, is configured to cause the mobile robot to navigate to a first location selected by the operator in the teleoperation mode, to identify a street using a scaled vector field histogram in the autonomous mode, to traverse the identified street to a specified distance from the initial location in the autonomous mode, to record the occupancy grid map when traversing the identified street in the autonomous mode, to return to the first location in the autonomous mode, and to transmit the recorded occupancy grid map to the teleoperation console in the teleoperation mode.

8. The mobile robot reconnaissance system according to claim 5, wherein the mobile robot further includes an operator interface disposed on the mobile robot and configured to be operated by the operator, wherein the mobile robot is further configured to perform at least one of the robot missions in the autonomous mode starting from an initial location of the mobile robot when the operator interface is operated.

9. A mobile robot reconnaissance system, comprising:

a mobile robot configured to perform autonomous reconnaissance, including:

a drive system configured to propel the mobile robot across terrain, a range sensor configured to detect a distance between the mobile robot and one or more objects in an environment of the mobile robot, a processor communicatively connected to the range sensor and to the drive system, and configured to execute software instructions, a memory store communicatively connected to the processor, the memory store having stored thereon a plurality of software instructions configured to be executed by the processor, the software instructions including:

a mapping routine configured to maintain an occupancy grid map of the environment of the mobile robot, a linear feature routine configured to detect one or more linear patterns in the occupancy grid map and to determine a strongest line among the one or more linear patterns, and a navigational routine configured to control the drive system to move the mobile robot in a direction aligned with the strongest line among the one or more linear patterns, and a transceiver configured to transmit the occupancy grid map and to receive a mission command; and a teleoperation console configured to remotely communicate with the mobile robot, the teleoperation console including:

a display configured to present the occupancy grid map transmitted by the mobile robot to an operator and to present a mission command menu to the operator, the mission command menu including a plurality of visual items each corresponding to at least one of a plurality of robot missions performable by the mobile robot, an input unit configured to receive a mission command selection from the operator corresponding to at least one of the robot missions, and a transmitter configured to transmit the mission command to the mobile robot corresponding to the mission command selection received by the input unit, wherein the robot missions each include a teleoperation mode and an autonomous mode, wherein the mobile robot is further configured to communicate with the teleoperation console in the teleoperation mode and to function autonomously in the autonomous mode even without communication with the teleoperation console.

10. The mobile robot reconnaissance system according to claim 9, wherein the software instructions stored by the memory store further include a circumnavigation routine corresponding to a circumnavigation robot mission, wherein the circumnavigation routine, when executed by the processor, is configured to cause the mobile robot to navigate to a location selected by the operator in the teleoperation mode, to circumnavigate a reconnaissance target identified using a scaled vector field histogram in the autonomous mode, to record the occupancy grid map when circumnavigating the reconnaissance target, and to transmit the recorded occupancy grid map to the teleoperation console in the teleoperation mode.

11. The mobile robot reconnaissance system according to claim 9, wherein the software instructions stored in the memory store further include a street-following routine corresponding to a street-following robot mission, wherein the street-following routine, when executed by the processor, is configured to cause the mobile robot to navigate to a first location selected by the operator in the teleoperation mode, to identify a street using a scaled vector field histogram in the autonomous mode, to traverse the identified street to a specified distance from the initial location in the autonomous mode, to record the occupancy grid map when traversing the identified street in the autonomous mode, to return to the first location in the autonomous mode, and to transmit the recorded occupancy grid map to the teleoperation console in the teleoperation mode.

12. The mobile robot reconnaissance system according to claim 9, wherein the mobile robot further includes an operator interface disposed on the mobile robot and configured to be operated by the operator, wherein the mobile robot is further configured to perform at least one of the robot missions in the autonomous mode starting from an initial location of the mobile robot when the operator interface is operated.

13. The mobile robot reconnaissance system according to claim 9, wherein the software instructions stored by the memory store further include a rallying routine,
- wherein the mobile robot is configured to execute the rallying routine when communication with the teleoperation console fails when the mobile robot is operating in the teleoperation mode, and
- wherein the rallying routine, when executed by the processor, is configured to cause the mobile robot to move toward a predetermined location and/or to reverse a heading of the mobile robot until communication is established with the teleoperation console.

* * * * *

UNITED STATES PATENT AND TRADEMARK OFFICE
CERTIFICATE OF CORRECTION

| | |
|---|---|
| PATENT NO. | : 7,539,557 B2 |
| APPLICATION NO. | : 11/618742 |
| DATED | : May 26, 2009 |
| INVENTOR(S) | : Brian Yamauchi |

It is certified that error appears in the above-identified patent and that said Letters Patent is hereby corrected as shown below:

In the Specification

Column 1, Line 9, please insert,

--STATEMENT AS TO FEDERALLY SPONSORED RESEARCH

This invention was made with Government support under contract Nos. W56HZV-04-C-0684, awarded by the U.S. Army (TACOM/TARDEC). The Government has certain rights in the invention.--

Signed and Sealed this
Seventeenth Day of December, 2013

Margaret A. Focarino
*Commissioner for Patents of the United States Patent and Trademark Office*